(12) United States Patent
Choi et al.

(10) Patent No.: US 11,902,554 B2
(45) Date of Patent: Feb. 13, 2024

(54) SIGNALING OF CONSTRAINT FLAGS USING GATE FLAG IN CODED VIDEO STREAM

(71) Applicant: Tencent America LLC, Palo Alto, CA (US)

(72) Inventors: Byeongdoo Choi, Palo Alto, CA (US); Shan Liu, San Jose, CA (US); Stephan Wenger, Hillsborough, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/888,026

(22) Filed: Aug. 15, 2022

(65) Prior Publication Data

US 2023/0032818 A1    Feb. 2, 2023

Related U.S. Application Data

(63) Continuation of application No. 17/220,672, filed on Apr. 1, 2021, now Pat. No. 11,451,811.
(Continued)

(51) Int. Cl.
*H04N 19/70* (2014.01)
*H04N 19/46* (2014.01)
(Continued)

(52) U.S. Cl.
CPC .......... *H04N 19/44* (2014.11); *H04N 19/176* (2014.11); *H04N 19/46* (2014.11); *H04N 19/70* (2014.11); *H04N 19/93* (2014.11)

(58) Field of Classification Search
CPC ...... H04N 19/44; H04N 19/176; H04N 19/46; H04N 19/70; H04N 19/93
(Continued)

(56) References Cited

U.S. PATENT DOCUMENTS

2018/0077411 A1    3/2018   Gisquet et al.
2021/0176475 A1    6/2021   Hsu et al.
(Continued)

FOREIGN PATENT DOCUMENTS

WO    2020057572 A1    3/2020

OTHER PUBLICATIONS

Naser K et al, AhG 9: Cleanup of Constraint Flags, 130. MPEG Meeting; Apr. 20, 2020-Apr. 24, 2020; Alpbach; (Motion Picture Expert Group or ISO/IEC JTC1/SC29/WG11), No. m53148 ; JVET-R0173, Apr. 8, 2020, 7 pages.
(Continued)

*Primary Examiner* — Albert Kir
(74) *Attorney, Agent, or Firm* — ARENTFOX SCHIFF LLP

(57) ABSTRACT

A method of video encoding includes determining whether a plurality of constraint flags of a constraint information group are to be signaled for a subset of coding blocks, and signaling a gate flag indicating whether the plurality of constraint flags of the constraint information group are signaled. The gate flag is signaled in constraint information in a syntax structure of a coded video bitstream. In accordance with the signaled gate flag indicating that the plurality of constraint flags of the constraint information group are signaled, the method further includes signaling the plurality of constraint flags of the constraint information group in the constraint information in the syntax structure of the coded video bitstream. In accordance with the plurality of constraint flags being signaled in the constraint information, the method further includes encoding the subset of coding blocks based on the plurality of constraint flags.

20 Claims, 43 Drawing Sheets

Related U.S. Application Data

(60) Provisional application No. 63/028,222, filed on May 21, 2020, provisional application No. 63/027,848, filed on May 20, 2020, provisional application No. 63/024,140, filed on May 13, 2020, provisional application No. 63/010,272, filed on Apr. 15, 2020, provisional application No. 63/005,345, filed on Apr. 5, 2020.

(51) Int. Cl.
*H04N 19/176* (2014.01)
*H04N 19/44* (2014.01)
*H04N 19/93* (2014.01)

(58) Field of Classification Search
USPC .................................................. 375/240.25
See application file for complete search history.

(56) References Cited

U.S. PATENT DOCUMENTS

| | | | |
|---|---|---|---|
| 2021/0176491 A1 | 6/2021 | Wu | |
| 2021/0258598 A1 | 8/2021 | Hendry et al. | |
| 2021/0314623 A1* | 10/2021 | Chang | H04N 19/186 |
| 2021/0321138 A1 | 10/2021 | Samuelsson et al. | |
| 2022/0086473 A1* | 3/2022 | Wang | H04N 19/70 |
| 2022/0353495 A1* | 11/2022 | Zhu | H04N 19/176 |
| 2022/0394304 A1* | 12/2022 | Deng | H04N 19/117 |
| 2023/0027478 A1* | 1/2023 | Deng | H04N 19/139 |
| 2023/0085304 A1* | 3/2023 | Naser | H04N 19/82 |
| | | | 375/240.26 |
| 2023/0096533 A1* | 3/2023 | De Lagrange | H04N 19/124 |
| | | | 375/240.03 |
| 2023/0156196 A1* | 5/2023 | Park | H04N 19/176 |
| | | | 375/240.02 |

OTHER PUBLICATIONS

Supplementary European Search Report dated Apr. 13, 2022 in Application No. 21782626.2.
Bross et al., Benjamin; Versatile Video Coding (Draft 8), Document: JVET-Q2001-vE, Jan. 7-17, 2020, 514 pages.
Benjamin Bross et al., Versatile Video Coding (Draft 9), Document: JVET-R2001-v8; Joint Video Experts Team (JVET) of ITU-T SG 16 WP 3 and ISO/IEC JTC 1/SC 29/WG 11, 18th Meeting: by teleconference, Apr. 15-24, 2020, 528 pages.
Benjamin Bross et al., Versatile Video Coding (Draft 9), Document: JVET-R2001-vA; Joint Video Experts Team (JVET) of ITU-T SG 16 WP 3 and ISO/IEC JTC 1/SC 29/WG 11, 18th Meeting: by teleconference, Apr. 15-24, 2020, 528 pages.
Japanese Office Action dated Dec. 12, 2022 in Application No. 2021-563119 with English Translation, pp. 1-19.
Indian Office Action dated Nov. 9, 2022 in Application No. 202137049168, pp. 1-5.
Robert Skupin, et al., "AHG12: On CBR subpicture extraction", Document: JVET-Q0404, [online], Joint Video experts Team (JVET) of ITU-T SG16 WP 3 and ISO/IEC JTC 1/SC 29/WG 11, JVET-Q0404 (version 1), Dec. 31, 2019, pp. 1-5.
Benjamin Bross, et al., "Versatile Video Coding (Draft 4)", Document: JVET-M1001-v7, [online], Joint Video experts Team (JVET) of ITU-T SG16 WP 3 and ISO/IEC JTC 1/SC 29/WG 11, JVET-M1001 (version 7), Mar. 17, 2019, pp. 1-7.
Lulin Chen, et al., "AHG9: On picture identification and ph repetition", Document: JVET-Q0177-v1, [online], Joint Video experts Team (JVET ITU-T SG 16 WP 3 and ISO/IEC JTC 1/SC 29/WG 11, JVET-Q0177 (version 1), Dec. 31, 2019, pp. 1-9.

\* cited by examiner

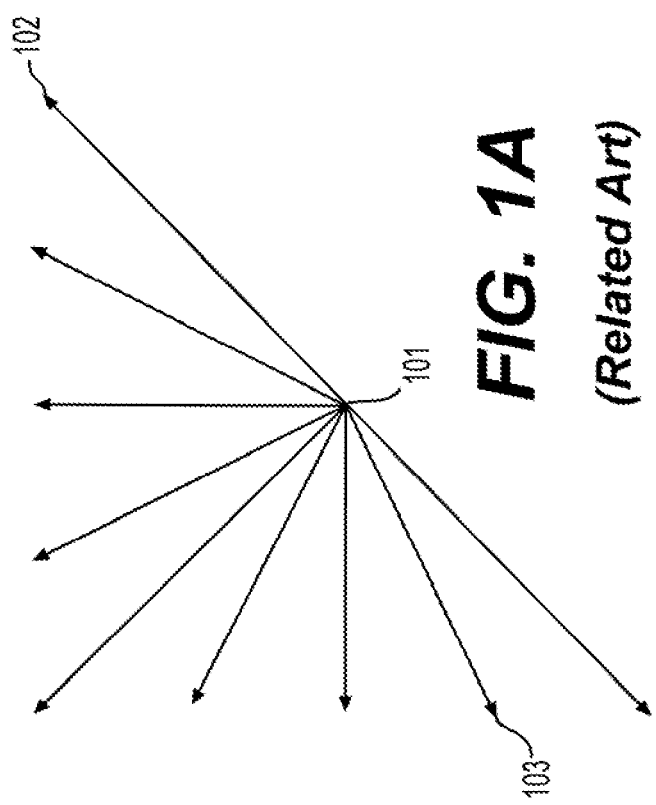
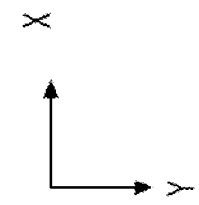
FIG. 1A (Related Art)

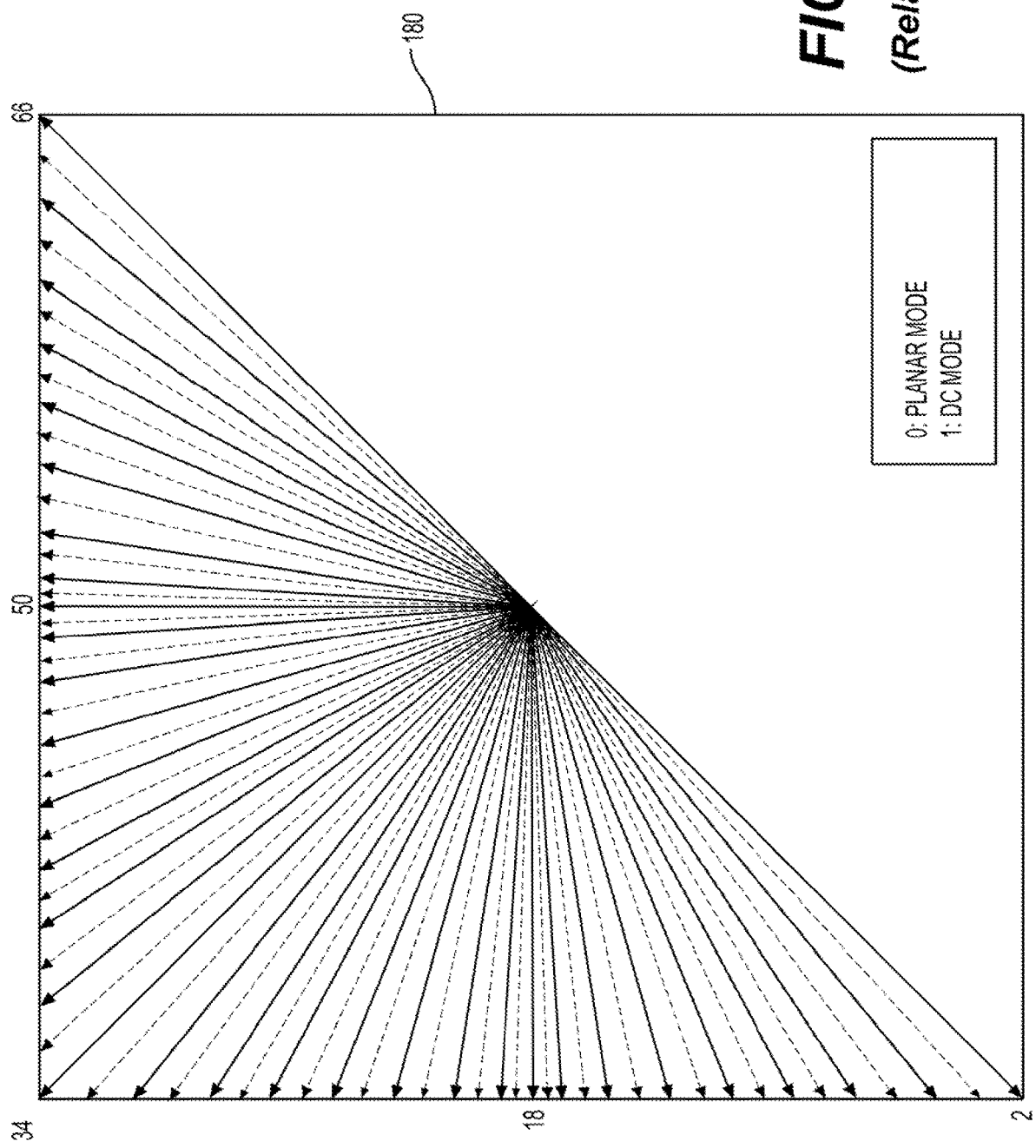

| | |
|---|---|
| 1001 → tile_group_header( ) { | |
| ... | |
| 1003 → if(adaptive_pic_resolution_change_flag) { | |
| 1002 →    dec_pic_size_idx | u(1) |
| } | |
| ... | |
| } | |

| | Descriptor |
|---|---|
| 1010 → seq_parameter_set_rbsp( ) { | |
| ... | |
| 1011 →   adaptive_pic_resolution_change_flag | u(1) |
| 1012 →   if(adaptive_pic_resolution_change_flag) { | |
| 1013 →     output_pic_width_in_luma_samples | ue(v) |
|     output_pic_height_in_luma_samples | ue(v) |
| 1014 →     reference_pic_size_present_flag | u(1) |
|     if(reference_pic_size_present_flag) | |
|     { | |
| 1015 →       reference_pic_width_in_luma_samples | ue(v) |
|       reference_pic_height_in_luma_samples | ue(v) |
|     } | |
| 1016 →     num_dec_pic_size_in_luma_samples_minus1 | ue(v) |
|     for( i = 0; i <= <br>       num_dec_pic_size_in_luma_samples_minus1;<br>       i++ ) { | |
| 1017 →       dec_pic_width_in_luma_samples[ i ] | ue(v) |
|       dec_pic_height_in_luma_samples[ i ] | ue(v) |
|     } | |
|   } | |
| ... | |
| } | |

*FIG. 10*

| | Descriptor |
|---|---|
| profile_tier_level( profileTierPresentFlag, maxNumSubLayersMinus1 ) { | |
|   if( profileTierPresentFlag ) { | |
|     general_profile_idc | u(7) |
|     general_tier_flag | u(1) |
|     general_constraint_info() | |
|   } | |
|   general_level_idc | u(8) |
|   if( profileTierPresentFlag ) { | |
|     num_sub_profiles | u(8) |
|     for( i = 0; i < num_sub_profiles; i++ ) | |
|       general_sub_profile_idc[ i ] | u(32) |
|   } | |
|   for( i = 0; i < maxNumSubLayersMinus1; i++ ) | |
|     sublayer_level_present_flag[ i ] | u(1) |
|   while( !byte_aligned( ) ) | |
|     ptl_alignment_zero_bit | f(1) |
|   for( i = 0; i < maxNumSubLayersMinus1; i++ ) | |
|     if( sublayer_level_present_flag[i] ) | |
|       sublayer_level_idc[ i ] | u(8) |
| } | |

*FIG. 11*

| | Descriptor |
|---|---|
| general_constraint_info( ) { | |
|   general_non_packed_constraint_flag | u(1) |
|   general_frame_only_constraint_flag | u(1) |
|   general_non_projected_constraint_flag | u(1) |
|   general_one_picture_only_constraint_flag | u(1) |
|   no_lossless_coding_tool_constraint_flag | u(1) |
|   no_lossy_coding_tool_constraint_flag | u(1) |
|   intra_only_constraint_flag | u(1) |
|   max_bitdepth_constraint_idc | u(4) |
|   max_chroma_format_constraint_idc | u(2) |
|   single_layer_constraint_flag | u(1) |
|   all_layers_independent_constraint_flag | u(1) |
|   no_ref_pic_resampling_constraint_flag | u(1) |
|   no_res_change_in_clvs_constraint_flag | u(1) |
|   one_tile_per_pic_constraint_flag | u(1) |
|   pic_header_in_slice_header_constraint_flag | u(1) |
|   one_slice_per_pic_constraint_flag | u(1) |
|   one_subpic_per_pic_constraint_flag | u(1) |
| ... | |
|   no_partition_constraints_override_constraint_flag | u(1) |
|   no_sao_constraint_flag | u(1) |
|   no_alf_constraint_flag | u(1) |
|   no_radl_constraint_flag | u(1) |
|   no_idr_constraint_flag | u(1) |
|   no_cra_constraint_flag | u(1) |
|   no_gdr_constraint_flag | u(1) |
|   no_aps_constraint_flag | u(1) |
|   while( !byte_aligned( ) ) | |
|     gci_alignment_zero_bit | f(1) |
|   gci_num_reserved_bytes | u(8) |
|   for( i = 0; i < gci_num_reserved_bytes; i++ ) | |
|     gci_reserved_byte[ i ] | u(8) |
| } | |

| | Descriptor |
|---|---|
| profile_tier_level( profileTierPresentFlag, maxNumSubLayersMinus1 ) { | |
|   if( profileTierPresentFlag ) { | |
|     general_profile_idc | u(7) |
|     general_tier_flag | u(1) |
|     num_available_constraint_flags | u(8) |
|     general_constraint_info( num_available_constraint_flags ) | |
|   } | |
|   general_level_idc | u(8) |
|   if( profileTierPresentFlag ) { | |
|     num_sub_profiles | u(8) |
|     for( i = 0; i < num_sub_profiles; i++ ) | |
|       general_sub_profile_idc[ i ] | u(32) |
|   } | |
|   for( i = 0; i < maxNumSubLayersMinus1; i++ ) | |
|     sublayer_level_present_flag[ i ] | u(1) |
|   while( !byte_aligned( ) ) | |
|     ptl_alignment_zero_bit | f(1) |
|   for( i = 0; i < maxNumSubLayersMinus1; i++ ) | |
|     if( sublayer_level_present_flag[ i ] ) | |
|       sublayer_level_idc[ i ] | u(8) |
| } | |

1301

Continued from FIG. 13A

| | Descriptor |
|---|---|
| general_constraint_info( num_available_constraint_flags ) { | |
|   count = 0 | |
|   if( count < num_available_constraint_flags ) | |
|     general_non_packed_constraint_flag | u(1) |
|   count++ | |
|   if( count < num_available_constraint_flags ) | |
|     general_frame_only_constraint_flag | u(1) |
|   count++ | |
|   if( count < num_available_constraint_flags ) | |
|     general_non_projected_constraint_flag | u(1) |
|   count++ | |
|   ... | |
|   while( !byte_aligned( ) ) | |
|     gci_alignment_zero_bit | f(1) |
|   gci_num_reserved_bytes | u(8) |
|   for( i = 0; i < gci_num_reserved_bytes; i++ ) | |
|     gci_reserved_byte[ i ] | u(8) |
| } | |

| general_constraint_info( ) { | Descriptor |
|---|---|
| general_frame_structure_constraint_group_flag | u(1) |
| high_level_functionality_constraint_group_flag | u(1) |
| scalability_constraint_group_flag | u(1) |
| partitioning_constraint_group_flag | u(1) |
| intra_coding_tool_constraint_group_flag | u(1) |
| inter_coding_tool_constraint_group_flag | u(1) |
| transform_constraint_group_flag | u(1) |
| inloop_filtering_constraint_group_flag | u(1) |
| ... | |
| if( general_frame_structure_constraint_group_flag ) { | |
|   general_non_packed_constraint_flag | u(1) |
|   general_frame_only_constraint_flag | u(1) |
|   general_non_projected_constraint_flag | u(1) |
|   general_one_picture_only_constraint_flag | u(1) |
| } | |

FIG. 14A

Continued from FIG. 14A

| | | |
|---|---|---|
| if( high_level_functionality_constraint_group_flag ) { — 1420 | | |
|   pic_header_in_slice_header_constraint_flag | | u(1) |
|   no_radl_constraint_flag | | u(1) |
|   no_idr_constraint_flag | | u(1) |
|   no_cra_constraint_flag | | u(1) |
|   no_gdr_constraint_flag | | u(1) |
|   no_aps_constraint_flag | | u(1) |
|   ... | | |
| if( intra_coding_tool_constraint_group_flag ) { | | |
|   ... | | |
| } | | |
| if( inter_coding_tool_constraint_group_flag ) { | | |
|   ... | | |
| } — 1430 | | |
| while( !byte_aligned( ) ) | | |
|   gci_alignment_zero_bit | | f(1) |
|   gci_num_reserved_bytes | | u(8) |
| for( i = 0; i < gci_num_reserved_bytes; i++ ) | | |
|   gci_reserved_byte[ i ] | | u(8) |
| } | | |

| | Descriptor |
|---|---|
| general_constraints_info() { | |
|   gci_present_flag | u(1) |
|   if( gci_present_flag ) { | |
|     /* general */ | |
|     gci_intra_only_constraint_flag | u(1) |
|     gci_all_layers_independent_constraint_flag | u(1) |
|     gci_one_au_only_constraint_flag | u(1) |
|     /* picture format */ | |
|     gci_sixteen_minus_max_bitdepth_constraint_idc | u(4) |
|     gci_three_minus_max_chroma_format_constraint_idc | u(2) |
|     /* NAL unit type related */ | |
|     gci_no_mixed_nalu_types_in_pic_constraint_flag | u(1) |
|     gci_no_trail_constraint_flag | u(1) |
|     gci_no_stsa_constraint_flag | u(1) |
|     gci_no_rasl_constraint_flag | u(1) |
|     gci_no_radl_constraint_flag | u(1) |
|     gci_no_idr_constraint_flag | u(1) |
|     gci_no_cra_constraint_flag | u(1) |
|     gci_no_gdr_constraint_flag | u(1) |
|     gci_no_aps_constraint_flag | u(1) |
|     gci_no_idr_rpl_constraint_flag | u(1) |

Continued from FIG. 15A

| | |
|---|---|
| /* tile, slice, subpicture partitioning */ | |
| gci_one_tile_per_pic_constraint_flag | u(1) |
| gci_pic_header_in_slice_header_constraint_flag | u(1) |
| gci_one_slice_per_pic_constraint_flag | u(1) |
| gci_no_rectangular_slice_constraint_flag | u(1) |
| gci_one_slice_per_subpic_constraint_flag | u(1) |
| gci_no_subpic_info_constraint_flag | u(1) |
| /* CTU and block partitioning */ | |
| gci_three_minus_max_log2_ctu_size_constraint_idc | u(2) |
| gci_no_partition_constraints_override_constraint_flag | u(1) |
| gci_no_mtt_constraint_flag | u(1) |
| gci_no_qtbtt_dual_tree_intra_constraint_flag | u(1) |
| /* intra */ | |
| gci_no_palette_constraint_flag | u(1) |
| gci_no_ibc_constraint_flag | u(1) |
| gci_no_isp_constraint_flag | u(1) |
| gci_no_mrl_constraint_flag | u(1) |
| gci_no_mip_constraint_flag | u(1) |
| gci_no_cclm_constraint_flag | u(1) |

*FIG. 15B*

Continued from FIG. 15B

| | |
|---|---|
| /* inter */ | |
| gci_no_ref_pic_resampling_constraint_flag | u(1) |
| gci_no_res_change_in_clvs_constraint_flag | u(1) |
| gci_no_weighted_prediction_constraint_flag | u(1) |
| gci_no_ref_wraparound_constraint_flag | u(1) |
| gci_no_temporal_mvp_constraint_flag | u(1) |
| gci_no_sbtmvp_constraint_flag | u(1) |
| gci_no_amvr_constraint_flag | u(1) |
| gci_no_bdof_constraint_flag | u(1) |
| gci_no_smvd_constraint_flag | u(1) |
| gci_no_dmvr_constraint_flag | u(1) |
| gci_no_mmvd_constraint_flag | u(1) |
| gci_no_affine_motion_constraint_flag | u(1) |
| gci_no_prof_constraint_flag | u(1) |
| gci_no_bcw_constraint_flag | u(1) |
| gci_no_ciip_constraint_flag | u(1) |
| gci_no_gpm_constraint_flag | u(1) |

| | |
|---|---|
| /* transform_quantization_residual */ | |
| gci_no_luma_transform_size_64_constraint_flag | u(1) |
| gci_no_transform_skip_constraint_flag | u(1) |
| gci_no_bdpcm_constraint_flag | u(1) |
| gci_no_mts_constraint_flag | u(1) |
| gci_no_lfnst_constraint_flag | u(1) |
| gci_no_joint_cbcr_constraint_flag | u(1) |
| gci_no_sbt_constraint_flag | u(1) |
| gci_no_act_constraint_flag | u(1) |
| gci_no_explicit_scaling_list_constraint_flag | u(1) |
| gci_no_dep_quant_constraint_flag | u(1) |
| gci_no_sign_data_hiding_constraint_flag | u(1) |
| gci_no_cu_qp_delta_constraint_flag | u(1) |
| gci_no_chroma_qp_offset_constraint_flag | u(1) |
| /* loop filter */ | |
| gci_no_sao_constraint_flag | u(1) |
| gci_no_alf_constraint_flag | u(1) |
| gci_no_ccalf_constraint_flag | u(1) |
| gci_no_lmcs_constraint_flag | u(1) |
| gci_no_ladf_constraint_flag | u(1) |
| gci_no_virtual_boundaries_constraint_flag | u(1) |
| gci_num_reserved_bits | u(8) |
| for( i = 0; i < gci_num_reserved_bits; i++ ) | |
|   gci_reserved_zero_bit[ i ] | u(1) |
| } | |
| while( !byte_aligned( ) ) | |
|   gci_alignment_zero_bit | f(1) |
| } | |

Continued from FIG. 15C

| | Descriptor |
|---|---|
| profile_tier_level( profileTierPresentFlag, MaxNumSubLayersMinus1 ) { | |
|   if( profileTierPresentFlag ) { | |
|     general_profile_idc | u(7) |
|     general_tier_flag | u(1) |
|   } | |
|   general_level_idc | u(8) |
|   ptl_frame_only_constraint_flag | u(1) |
|   ptl_multilayer_enabled_flag | u(1) |
|   if( profileTierPresentFlag ) | |
|     general_constraints_info( ) | |
|   for( i = MaxNumSubLayersMinus1 − 1; i >= 0; i− − ) | |
|     ptl_sublayer_level_present_flag[ i ] | u(1) |
|   while( !byte_aligned( ) ) | |
|     ptl_reserved_zero_bit | u(1) |
|   for( i = MaxNumSubLayersMinus1 − 1; i >= 0; i− − ) | |
|     if( ptl_sublayer_level_present_flag[ i ] ) | |
|       sublayer_level_idc[ i ] | u(8) |
|   if( profileTierPresentFlag ) { | |
|     ptl_num_sub_profiles | u(8) |
|     for( i = 0; i < ptl_num_sub_profiles; i++ ) | |
|       general_sub_profile_idc[ i ] | u(32) |
|   } | |
| } | |

| seq_parameter_set_rbsp( ) { | Descriptor |
|---|---|
| sps_seq_parameter_set_id | u(4) |
| ... | |
| sps_field_seq_flag | u(1) |
| ... | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

FIG. 18

| video_parameter_set_rbsp() { | Descriptor |
|---|---|
| ... | |
| vps_field_seq_flag | u(1) |
| ... | |
| } | |

| video_parameter_set_rbsp() { | Descriptor |
|---|---|
|   vps_video_parameter_set_id | u(4) |
|   vps_max_layers_minus1 | u(8) |
|   for( i = 0; i <= vps_max_layers_minus1; i++) { | |
|     vps_included_layer_id[ i ] | u(7) |
|     vps_reserved_zero_bit | u(1) |
|   } | |
|   vps_constraint_info_present_flag | u(1) |
|   vps_constant_poc_cycle_per_au | u(1) |
|   if(vps_constant_poc_cycle_per_au) | |
|     vps_poc_cycle_au | u(8) |
|   ... | |
| } | |

| slice_header() { | Descriptor |
|---|---|
|   slice_pic_parameter_set_id | ue(v) |
|   if( rect_slice_flag \|\| NumBricksInPic > 1 ) | |
|     slice_address | u(v) |
|   if( !rect_slice_flag && !single_brick_per_slice_flag ) | |
|     num_bricks_in_slice_minus1 | ue(v) |
|   slice_type | ue(v) |
|   if( NalUnitType == GRA_NUT ) | |
|     recovery_poc_cnt | se(v) |
|   slice_pic_order_cnt_lsb | u(v) |
|   ... | |
|   if(!vps_constant_poc_cycle_per_au) | |
|     slice_poc_cycle_au | u(8) |
| | |
| | |
| } | |

FIG. 20

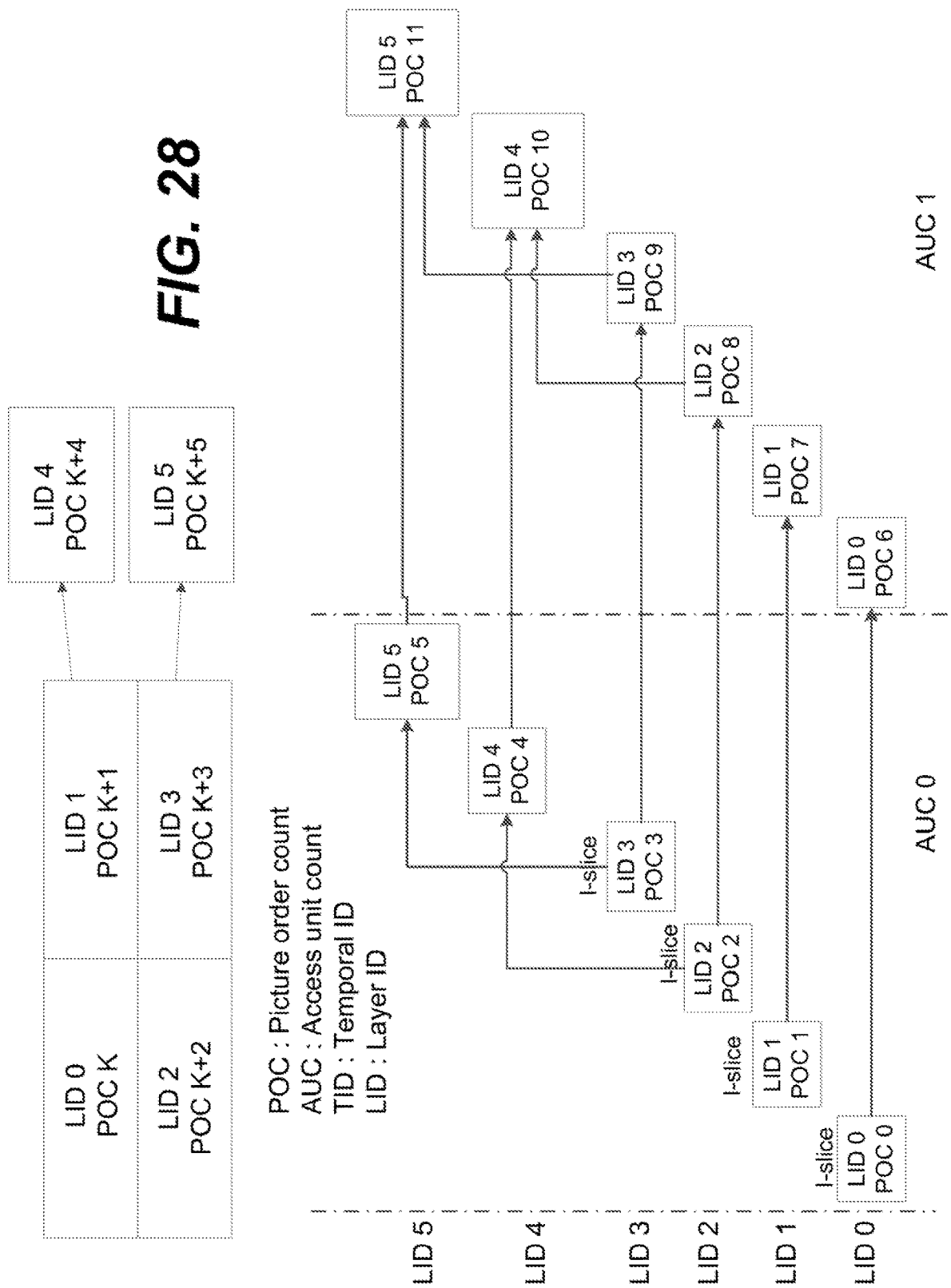

| | Descriptor |
|---|---|
| video_parameter_set_rbsp() { | |
|   vps_video_parameter_set_id | u(4) |
|   vps_max_layers_minus1 | u(8) |
|   for(i = 0; i <= vps_max_layers_minus1; i++) { | |
|     vps_included_layer_id[ i ] | u(7) |
|     vps_reserved_zero_bit | u(1) |
|   } | |
|   ... | |
|   vps_sub_picture_dividing_flag | u(1) |
|   if(vps_sub_picture_dividing_flag) { | |
|     vps_full_pic_width_in_luma_samples | ue(v) |
|     vps_full_pic_height_in_luma_samples | ue(v) |
|   } | |
|   ... | |
| } | |

*FIG. 29A*

Continued from FIG. 29A

| | Descriptor |
|---|---|
| seq_parameter_set_rbsp() { | |
|   sps_decoding_parameter_set_id | u(4) |
|   sps_video_parameter_set_id | u(4) |
|   sps_max_sub_layers_minus1 | u(3) |
|   ... | |
|   pic_width_in_luma_samples | ue(v) |
|   pic_height_in_luma_samples | ue(v) |
|   if(vps_sub_picture_dividing_flag) { | |
|     pic_offset_x | ue(v) |
|     pic_offset_y | ue(v) |
|   } | |
|   ... | |
| } | |

*FIG. 29B*

| | Descriptor |
|---|---|
| sub_region_partitioning_info( payloadSize ) { | |
| num_sub_region | ue(v) |
| num_layers | ue(v) |
| for( i = 0; i <= num_layers; i++ ) | |
| layer_id [i] | ue(v) |
| for( i = 0; i < num_layers; i++ ) | |
| for( j = 0; j<i; j++ ) | |
| direct_dependency_flag[i][j] | u(1) |
| for( i = 0; i<num_sub_region; i++ ) { | |
| num_layers_for_region[i] | ue(v) |
| for( j = 0; j<num_layers_for_region[i]; j++ ) | |
| sub_region_layer_id[i][j] | ue(v) |
| sub_region_offset_x[i] | ue(v) |
| sub_region_offset_y[i] | ue(v) |
| sub_region_width[i] | ue(v) |
| sub_region_height[i] | ue(v) |
| } | |
| ... | |
| } | |

*FIG. 30*

| | Descriptor |
|---|---|
| video_parameter_set_rbsp() { | |
| ... | |
| vps_max_layers_minus1 | u(6) |
| num_output_layer_sets | ue(v) |
| num_profile_tier_level | ue(v) |
| for( i = 0; i < num_profile_tier_level; i++ ) | |
|   profile_tier_level( vps_max_sub_layers_minus1 ) | |
| for( i = 0; i < num_output_layer_sets; i++ ) { | |
|   for( j = 0; j < NumLayersInIdList[ i ]; j++ ) | |
|     output_layer_flag[ i ][ j ] | u(1) |
|   profile_tier_level_idx[ i ][ j ] | u(v) |
|   } | |
| ... | |
| } | |

*FIG. 31*

| | Descriptor |
|---|---|
| video_parameter_set_rbsp() { | |
| ... | |
| vps_max_layers_minus1 | u(6) |
| if(vps_max_layers_minus1 > 0) { | |
| num_output_layer_sets | ue(v) |
| num_profile_tier_level | ue(v) |
| } | |
| for( i = 0; i < num_profile_tier_level; i++ ) | |
| profile_tier_level( vps_max_sub_layers_minus1 ) | |
| for( i = 0; i < num_output_layer_sets; i++ ) { | |
| vps_output_layers_mode[ i ] | u(2) |
| vps_ptl_signal_flag[ i ] | u(1) |
| for( j = 0; j < NumLayersInIdList[ I ]; j++ ) { | |
| if(vps_output_layers_mode[ i ] == 2 ) | |
| output_layer_flag[ i ][ j ] | u(1) |
| if( vps_ptl_signal_flag[i] ) | |
| profile_tier_level_idx[ i ][ j ] | u(v) |
| } | |
| } | |
| ... | |
| } | |

| video_parameter_set_rbsp() { | Descriptor |
|---|---|
| ... | |
| vps_max_layers_minus1 | u(6) |
| if(vps_max_layers_minus1 > 0) { | |
| num_output_layer_sets | ue(v) |
| num_profile_tier_level | ue(v) |
| } | |
| max_subpics_minus1 | u(8) |
| for( i = 0; i < max_subpics_minus1; i++ ) { | |
| sub_pic_id[i] | u(8) |
| } | |
| for( i = 0; i < num_profile_tier_level; i++ ) | |
| profile_tier_level( vps_max_sub_layers_minus1 ) | |
| for( i = 0; i < num_output_layer_sets;i++ ) { | |
| vps_output_layers_mode[ i ] | u(2) |
| vps_ptl_signal_flag[ i ] | u(1) |
| for( i = 0; i < NumLayersInIdList[ i ]; i++ ) { | |
| num_output_subpic_layer[i][i] | ue(v) |
| for( k = 0; k < num_output_subpic_layer[i][i]; k++ ) | |
| sub_pic_id_layer[i][i][ k ] | u(8) |
| if(vps_output_layers_mode[ i ] == 2) | |
| output_layer_flag[i][i] | u(1) |
| if( vps_ptl_signal_flag[i] ) | |
| profile_tier_level_idx[ i ][i] | u(v) |
| } | |
| } | |
| ... | |
| } | |

FIG. 34

| video_parameter_set_rbsp( ) { | Descriptor |
|---|---|
|    vps_video_parameter_set_id | u(4) |
|    vps_max_layers_minus1 | u(6) |
|    vps_max_sublayers_minus1 | u(3) |
|    if( vps_max_layers_minus1 > 0 && vps_max_sublayers_minus1 > 0 ) | |
|       vps_all_layers_same_num_sublayers_flag | u(1) |
|    if( vps_max_layers_minus1 > 0 ) | |
|       vps_all_independent_layers_flag | u(1) |
|    for( i = 0; i <= vps_max_layers_minus1; i++ ) { | |
|       vps_layer_id[ i ] | u(6) |
|       if( i > 0 && !vps_all_independent_layers_flag ) { | |
|          vps_independent_layer_flag[ i ] | u(1) |
|          if( !vps_independent_layer_flag[ i ] ) { | |
|             for( j = 0; j < i; j++ ) | |
|                vps_direct_ref_layer_flag[ i ][ j ] | u(1) |
|             max_tid_ref_present_flag[ i ] | u(1) |
|             if( max_tid_ref_present_flag[ i ] ) | |
|                max_tid_il_ref_pics_plus1[ i ] | u(3) |
|          } | |
|       } | |
|    } | |
|    if( vps_max_layers_minus1 > 0 ) { | |
|       if( vps_all_independent_layers_flag ) | |
|          each_layer_is_an_ols_flag | u(1) |
|       if( !each_layer_is_an_ols_flag ) { | |
|          if( !vps_all_independent_layers_flag ) | |
|             ols_mode_idc | u(2) |
|          if( ols_mode_idc == 2 ) { | |
|             num_output_layer_sets_minus1 | u(8) |
|             for( i = 1; i <= num_output_layer_sets_minus1; i++) | |
|                for( j = 0; j <= vps_max_layers_minus1; j++ ) | |
|                    ols_output_layer_flag[ i ][ j ] | u(1) |
|             } | |
|          } | |
|       } | |
|    ... | |
| } | |

FIG. 35

| video_parameter_set_rbsp( ) { | Descriptor |
|---|---|
|   vps_video_parameter_set_id | u(4) |
|   vps_max_layers_minus1 | u(6) |
|   vps_max_sublayers_minus1 | u(3) |
|   if( vps_max_layers_minus1 > 0 && vps_max_sublayers_minus1 > 0 ) | |
|     vps_all_layers_same_num_sublayers_flag | u(1) |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) { | |
|         for( j = 0; j < i; j++ ) | |
|           vps_direct_ref_layer_flag[ i ][ j ] | u(1) |
|         max_tid_ref_present_flag[ i ] | u(1) |
|         if( max_tid_ref_present_flag[ i ] ) | |
|           max_tid_il_ref_pics_plus1[ i ] | u(3) |
|       } | |
|     } | |
|   } | |
|   if( vps_max_layers_minus1 > 0 ) { | |
|     if( vps_all_independent_layers_flag ) | |
|       each_layer_is_an_ols_flag | u(1) |
|     if( !each_layer_is_an_ols_flag ) { | |
|       if( !vps_all_independent_layers_flag ) | |
|         ols_mode_idc | u(2) |
|       if( ols_mode_idc == 2 && vps_max_layers_minus1 > 1 ) { | |
|         num_output_layer_sets_minus1 | u(8) |
|         for( i = 1; i <= num_output_layer_sets_minus1; i++) | |
|           for( j = 0; j <= vps_max_layers_minus1; j++ ) | |
|             ols_output_layer_flag[ i ][ j ] | u(1) |
|       } | |
|     } | |
|   } | |
|   ... | |
| } | |

SIGNALING OF CONSTRAINT FLAGS USING GATE FLAG IN CODED VIDEO STREAM

INCORPORATION BY REFERENCE

The present application is a continuation of U.S. Ser. No. 17/220,672, filed on Apr. 1, 2021, which claims the benefit of priority to U.S. Provisional Application No. 63/005,345, "Method for signaling of subpicture and slice partitioning in coded video stream" filed on Apr. 5, 2020, U.S. Provisional Application No. 63/010,272, "Method for signaling picture header and slice header in coded video stream" filed on Apr. 15, 2020, U.S. Provisional Application No. 63/024,140, "Techniques for coding tool control with constraint flags in coded video stream" filed on May 13, 2020, U.S. Provisional Application No. 63/027,848, "Techniques for signaling field coding information in multilayered video stream" filed on May 20, 2020, and U.S. Provisional Application No. 63/028,222, "Techniques for conditional signaling of constraint flags in coded video stream" filed on May 21, 2020, which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry is configured to obtain a gate flag for each of at least one constraint information group in constraint information signaled in a coded video bitstream. Each gate flag can indicate whether a constraint information group of the at least one constraint information group corresponding to the respective gate flag is present in the constraint information. The constraint information can be for a subset of coding blocks in the coded video bitstream. The processing circuitry is configured to determine, based on the gate flag of the constraint information group of the at least one constraint information group, whether the constraint information group of the gate flag is present in the constraint information, the constraint information group of the gate flag including at least one constraint flag for the subset of coding blocks. The processing circuitry is configured to determine prediction information for the subset of coding blocks based on whether the constraint information group of the gate flag is present in the constraint information. The processing circuitry is configured to reconstruct the subset of coding blocks based on the prediction information.

In an embodiment, the constraint information group of the gate flag is determined to be present in the constraint information. The processing circuitry is configured to determine the prediction information for the subset of coding blocks based on the at least one constraint flag in the constraint information group of the gate flag.

In an embodiment, the constraint information group of the gate flag is determined not to be present in the constraint information.

In an embodiment, each gate flag indicates that the constraint information group corresponding to the respective gate flag is not present in the constraint information, and no constraint flags are present in the constraint information.

In an embodiment, the constraint information is present in a high level syntax for at least one picture, and the subset of coding blocks includes coding blocks in the at least one picture.

In an embodiment, one or more of the at least one constraint information group are present in the coded video bitstream. A plurality of constraint flags in the one or more of the at least one constraint information group is signaled according to a predetermined order. The processing circuitry is configured to run-decode the plurality of constraint flags, and determine the prediction information for the subset of coding blocks based on the plurality of constraint flags.

In an embodiment, the at least one constraint flag in the constraint information group of the gate flag includes a plurality of constraint flags signaled according to a predetermined order. The processing circuitry is configured to run-decoding the plurality of constraint flags.

In an embodiment, an offset and a length are present in the constraint information indicating that the at least one constraint flag in the constraint information group of the gate flag is present in the constraint information.

In an embodiment, one or more of the at least one constraint information group are present in the coded video bitstream. For each of the one or more of the at least one constraint information group, an offset and a length are present in the constraint information indicating that at least one constraint flag in the respective one of the one or more of the at least one constraint information group is present in the constraint information. A number of the offsets is signaled in the coded video bitstream.

In an embodiment, one or more of the at least one constraint information group are present in the coded video bitstream. One or more syntax elements in the constraint information are byte aligned. The one or more syntax elements can include the gate flag for each of the at least constraint information group and a plurality of constraint flags in the one or more of the at least one constraint information group.

Aspects of the disclosure also provide a non-transitory computer-readable medium storing instructions which when executed by a computer for video decoding cause the computer to perform the methods for video decoding.

BRIEF DESCRIPTION OF THE DRAWINGS

Further features, the nature, and various advantages of the disclosed subject matter will be more apparent from the following detailed description and the accompanying drawings in which:

FIG. 1A is a schematic illustration of an exemplary subset of intra prediction modes.

FIG. 1B is an illustration of exemplary intra prediction directions.

FIG. 10 shows examples of ARC parameters signaling according to embodiments of the disclosure.

FIG. 11 shows an example of a set of profile tile layer (PTL) syntax elements according to an embodiment of the disclosure.

FIG. 12 shows an example of general constraint information according to an embodiment of the disclosure.

FIGS. 13A-13B show an example of a set of PTL syntax elements according to an embodiment of the disclosure.

FIGS. 14A-14B show an exemplary general constraint information syntax structure according to an embodiment of the disclosure.

FIGS. 15A-15D show an exemplary general constraint information syntax structure according to an embodiment of the disclosure.

FIG. 16 shows an example of a set of PTL syntax elements in a PTL syntax structure according to an embodiment of the disclosure.

FIG. 17 shows an example of a syntax table to indicate field coding information in a sequence parameter set according to an embodiment of the disclosure.

FIG. 18 shows an example of a syntax table to indicate field coding information in a video parameter set according to an embodiment of the disclosure.

FIG. 20 show examples of syntax tables according to embodiments of the disclosure.

FIG. 28 shows an example of layout information of sub-pictures and corresponding layer and picture prediction structure with spatial scalability modality of a local region according to an embodiment of the disclosure.

FIGS. 29A-29B show examples of syntax tables for sub-picture layout information according to an embodiment of the disclosure.

FIG. 30 shows an example of a syntax table of SEI message for sub-picture layout information according to an embodiment of the disclosure.

FIG. 31 shows an example of a syntax table to indicate output layers and PTL information for an output layer set according to an embodiment of the disclosure.

FIG. 32 shows an example of a syntax table to indicate an output layer mode on for an output layer set according to an embodiment of the disclosure.

FIG. 33 shows an example of a syntax table to indicate a present subpicture of each layer for each output layer set according to an embodiment of the disclosure.

FIG. 34 shows an example of a syntax table of a video parameter set according to an embodiment of the disclosure.

FIG. 35 shows an example of a syntax table to indicate an output layer set with an output layer set mode according to an embodiment of the disclosure.

DETAILED DESCRIPTION OF EMBODIMENTS

Figure 2:
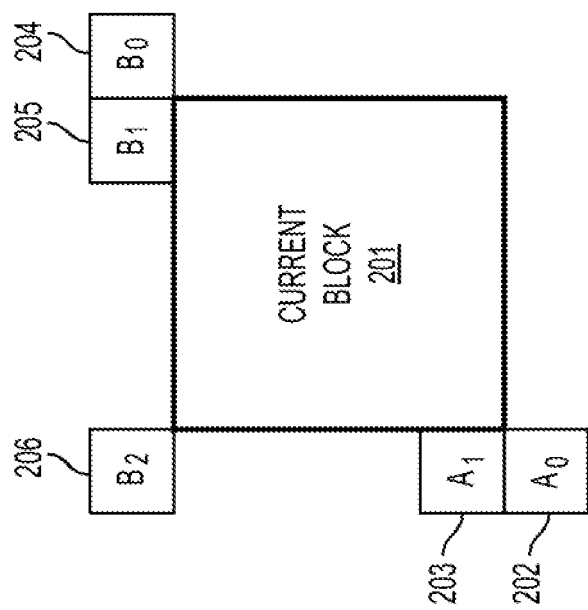
FIG. 2 is a schematic illustration of a current block and its surrounding spatial merge candidates in one example.
Figure 3:
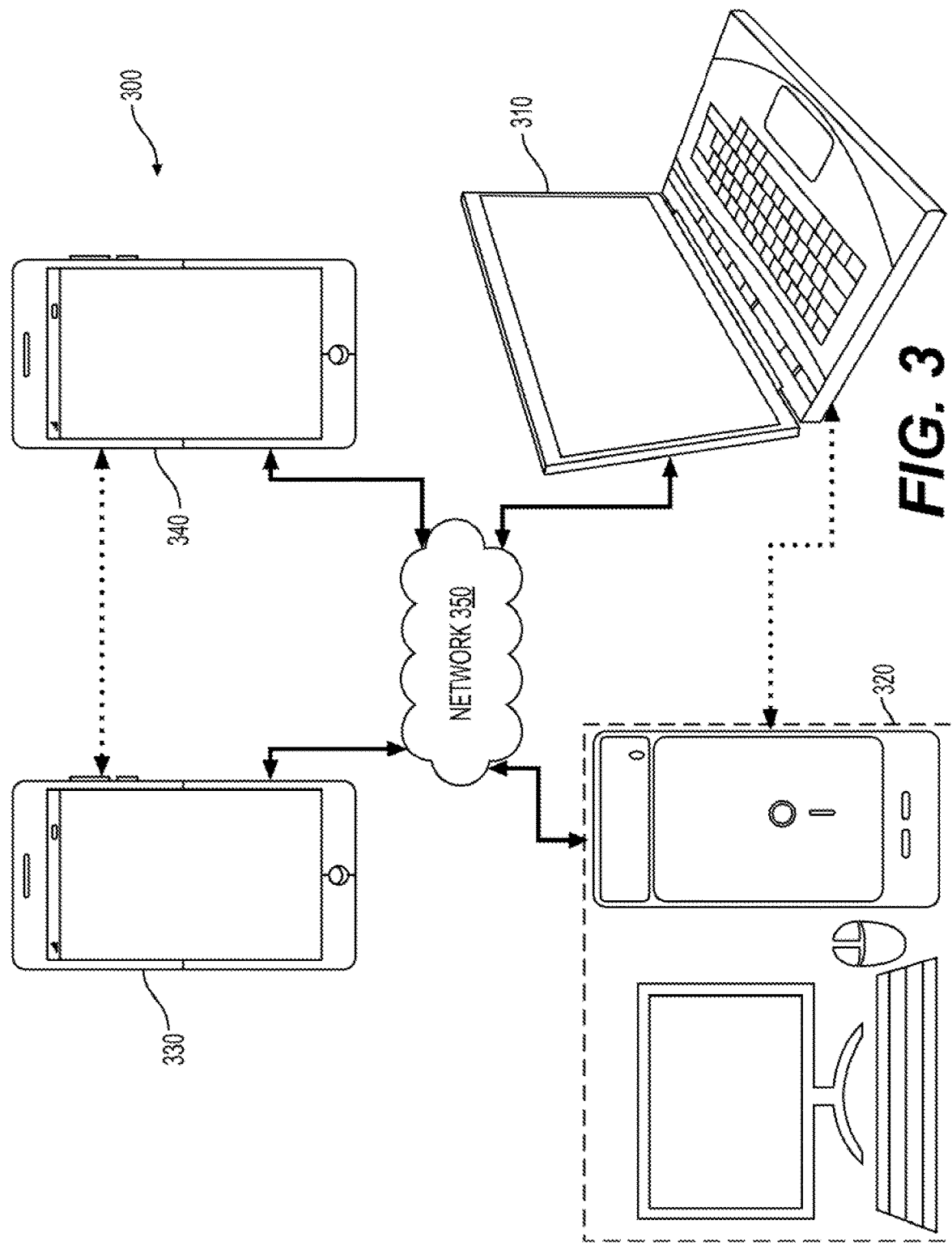
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
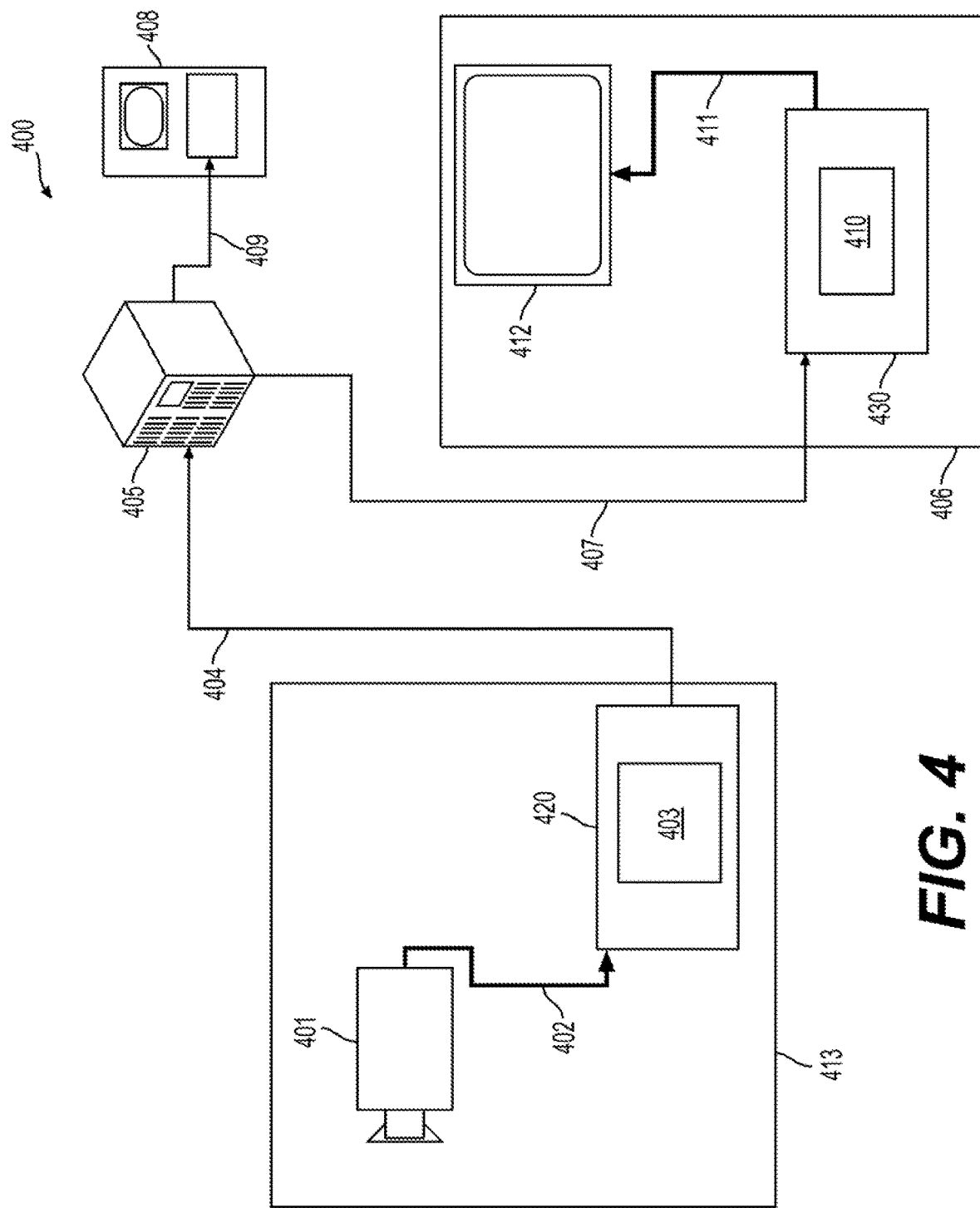
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
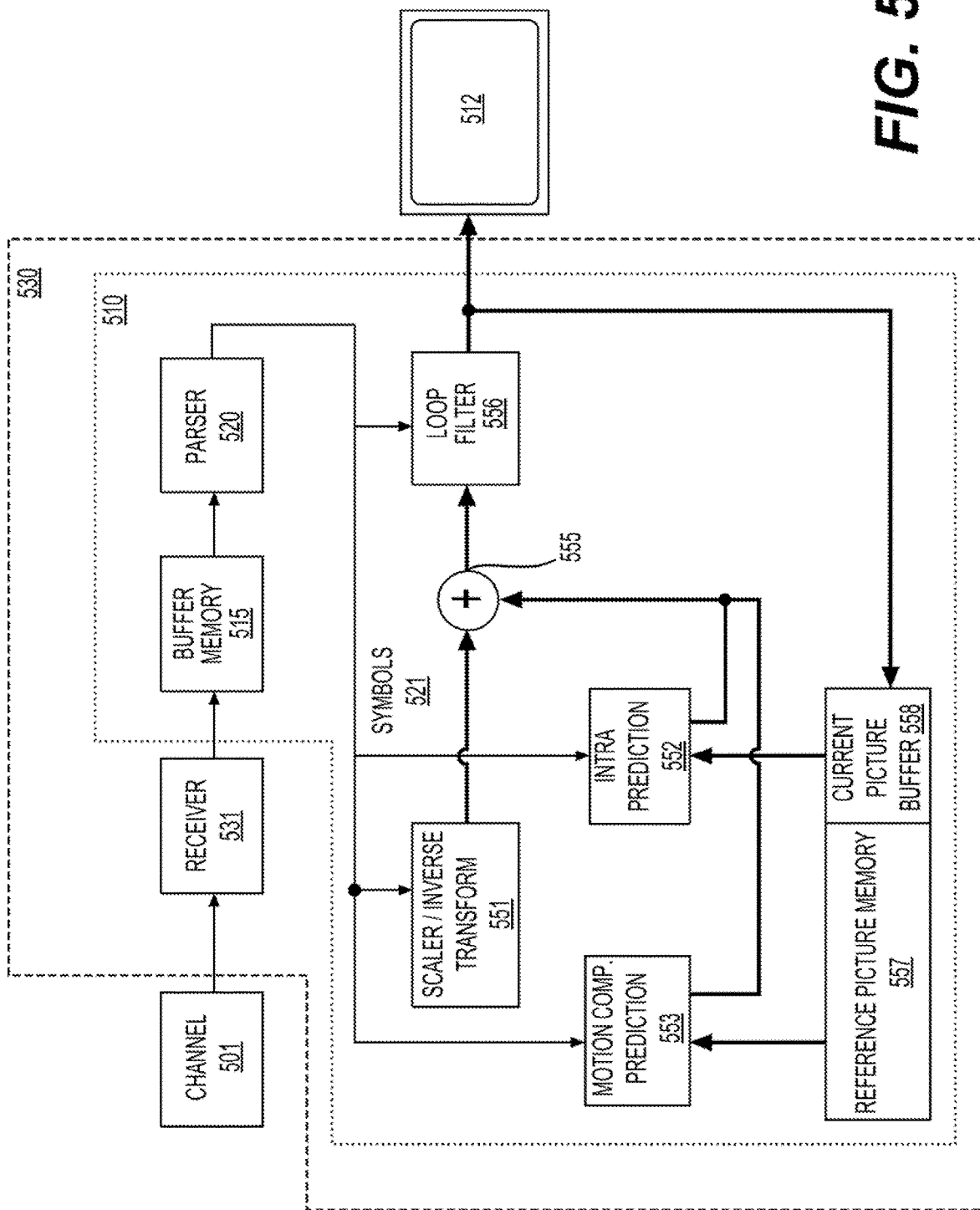
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
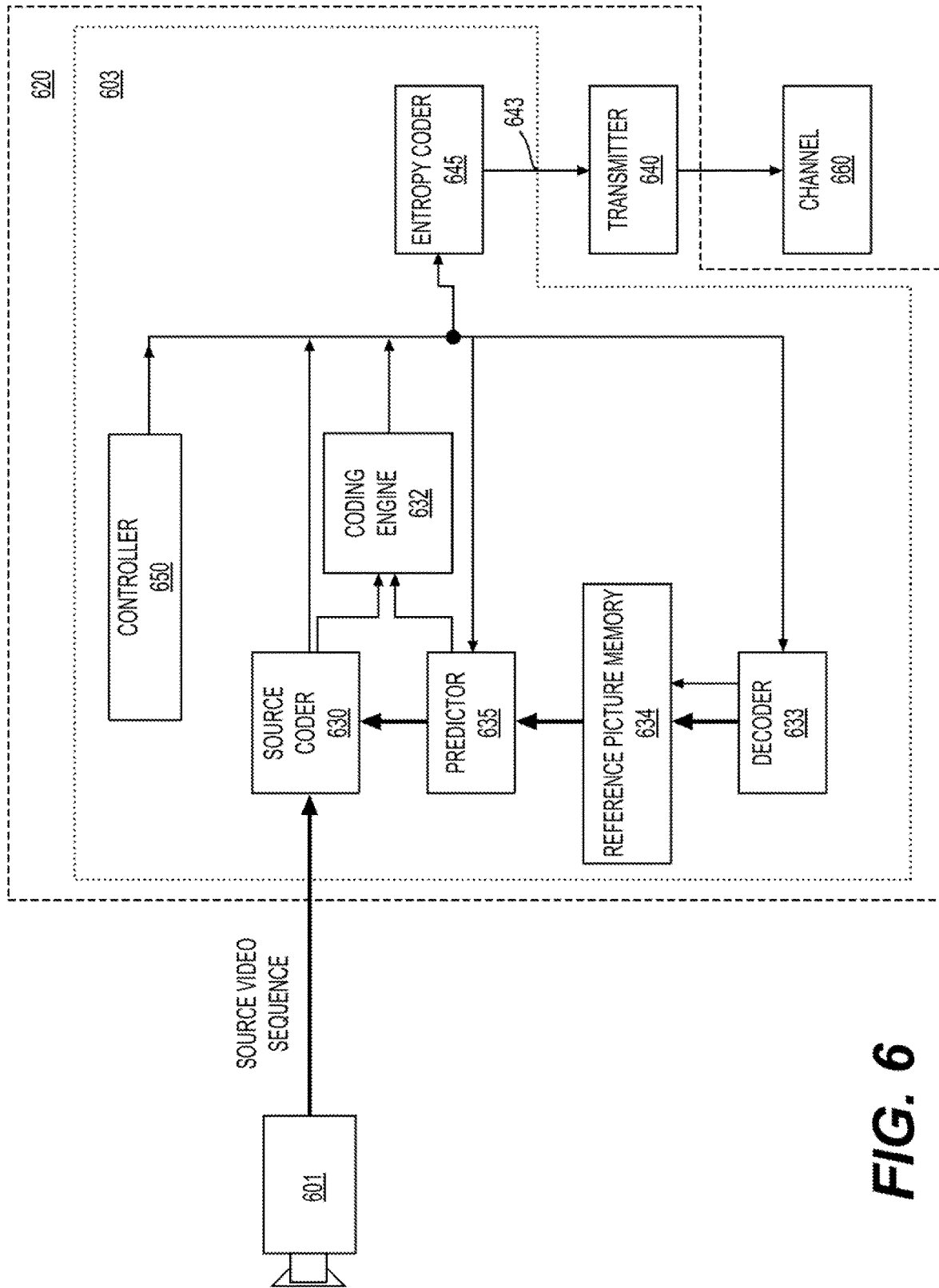
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by losslessly compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
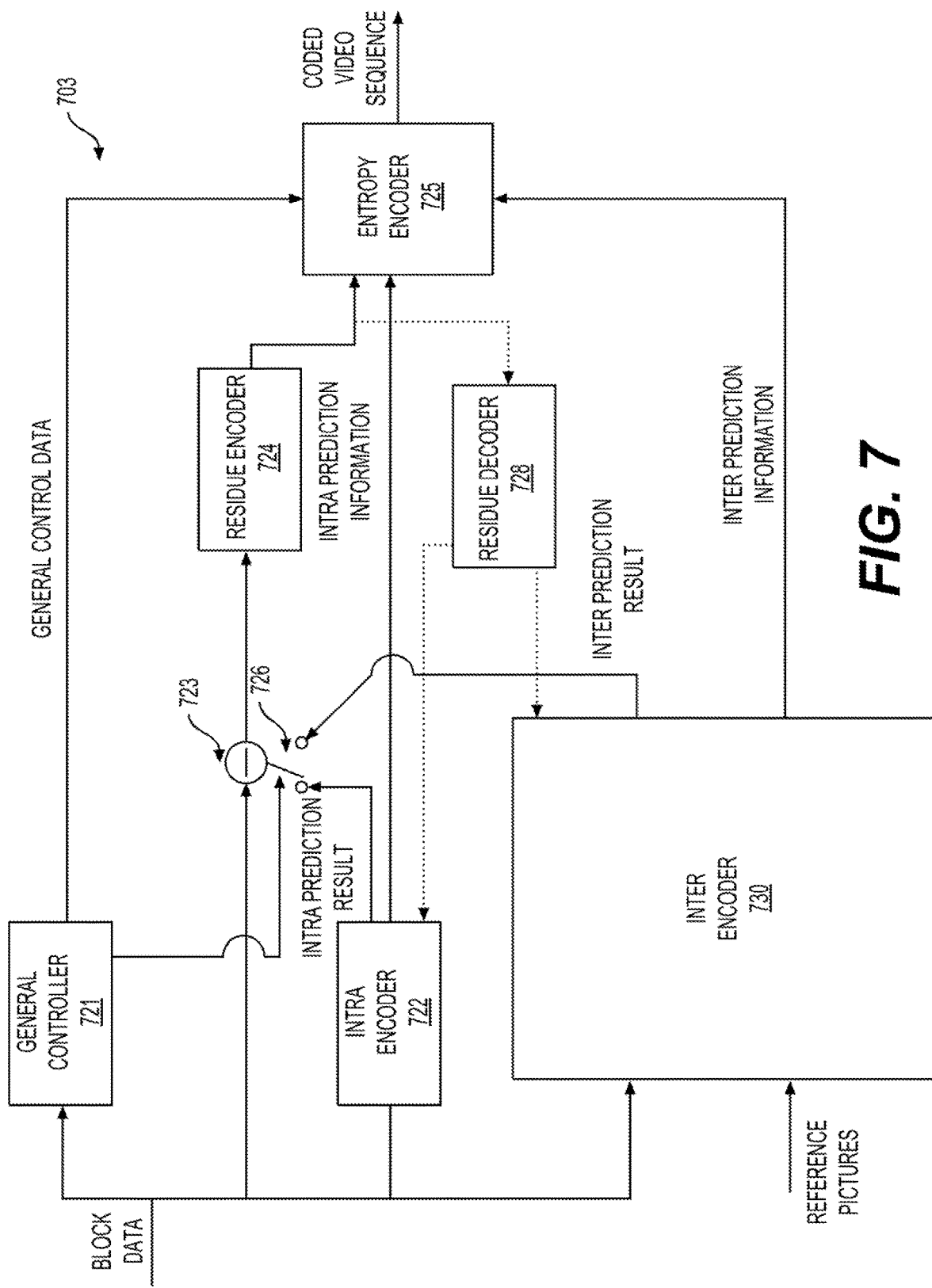
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
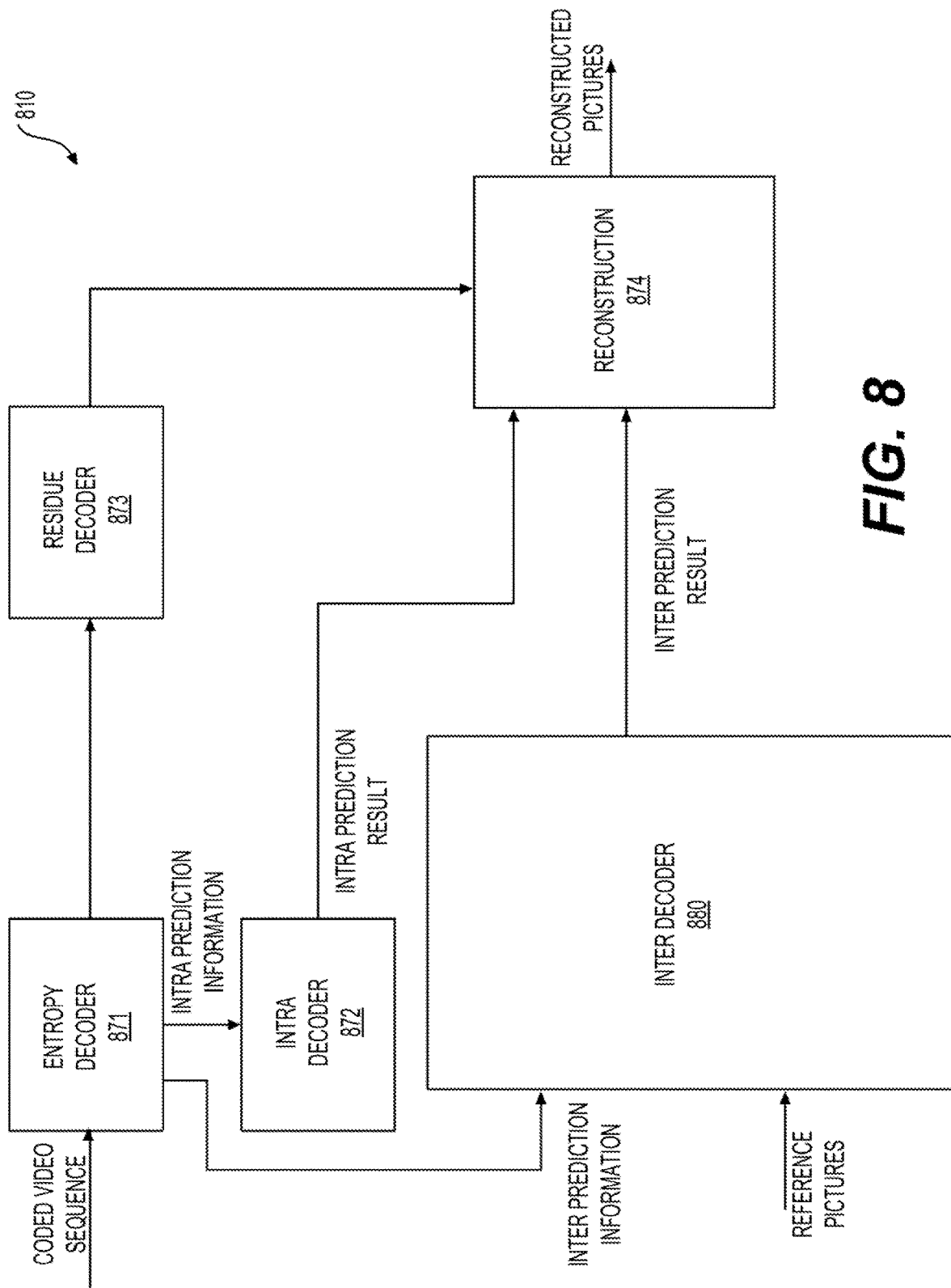
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Aspects of the disclosure include control of coding tool(s) and functionalities with constraint flags in a coded video stream.

Video encoders and decoders can operate on a given picture size that is defined and remains constant for a coded video sequence (CVS), Group of Pictures (GOP), or a similar multi-picture timeframe. In an example, such as in MPEG-2, system designs are known to change a horizontal resolution (and thus a picture size) dependent on factors such as activity of a scene, but only at I pictures, hence typically for a GOP. Resampling of reference pictures for use of different resolutions within a CVS is known, for example, from ITU-T Rec. H.263 Annex P. However, the picture size does not change, only the reference pictures are resampled, resulting potentially in only parts of a picture canvas being used (e.g., in down-sampling), or only parts of a scene being captured (e.g., in up-sampling). In some examples, such as in H.263 Annex Q resampling of an individual macroblock by a factor of two in each dimension (e.g., upward or downward) is allowed. The picture size can remain the same. A size of a macroblock can be fixed, for example, in H.263, and thus does not need to be signaled.

A picture size in predicted pictures can be changed. In an example, such as VP9, reference picture resampling and changing of a resolution for a whole picture are allowed. In an example, (including, for example, Hendry, et. al, "On adaptive resolution change (ARC) for VVC", Joint Video Team document JVET-M0135-v1, Jan. 9-19, 2019, incorporated herein in its entirety) resampling of a whole reference picture to a different resolution (e.g., a higher resolution or a lower resolution) is allowed. Different candidate resolutions can be coded in a sequence parameter set (SPS) and can be referred to by per-picture syntax elements in a picture parameter set (PPS).

Techniques for signaling of an adaptive picture size in a video bitstream are disclosed in the disclosure.

When pictures are encoded into a bitstream that includes one or more layers with different qualities, the bitstream can have syntax elements that specify which layer(s) (or a set of layers) can be output at a decoder side. The set of layers to be output can be defined as an output layer set. In an exemplary video codec that supports multiple layers and scalabilities, one or more output layer sets can be signaled in a video parameter set (VPS). Syntax elements specifying profile tier level (PTL) for the entire bitstream or one or more output layer sets can be signaled in a VPS, a DPS that is identical to Decoder Capability Information (DCI), a SPS, a PPS, a SEI message, or the like. In the PTL information, general constraint information that can specify constraints on coding tools or functionalities can be present. It is desirable to efficiently represent and signal constraint information for various coding tools and functionalities.

A sub-picture can refer to, for example, a rectangular arrangement of samples, blocks, macroblocks, coding units, or similar entities that is semantically grouped and may be independently coded in changed resolution. One or more sub-pictures can form a picture. One or more coded sub-pictures can form a coded picture. One or more sub-pictures can be assembled into a picture, and one or more sub pictures can be extracted from a picture. In some examples, one or more coded sub-pictures can be assembled in a compressed domain without transcoding to a sample level into a coded picture. In some examples, one or more coded sub-pictures can be extracted from a coded picture in the compressed domain.

Adaptive Resolution Change (ARC) can refer to mechanisms that allow a change of a resolution of a picture or a sub-picture in a CVS by, for example, reference picture resampling. ARC parameters can refer to control information used to perform adaptive resolution change. The ARC parameters can include filter parameters, scaling factors, resolutions of an output and/or a reference picture, various control flags, and/or the like.

The above description can be applied to coding and decoding a single and semantically independent coded video picture. Before describing coding/decoding of multiple sub-pictures with independent ARC parameters and its implied additional complexity, signaling ARC parameters is described.

Figure 9:
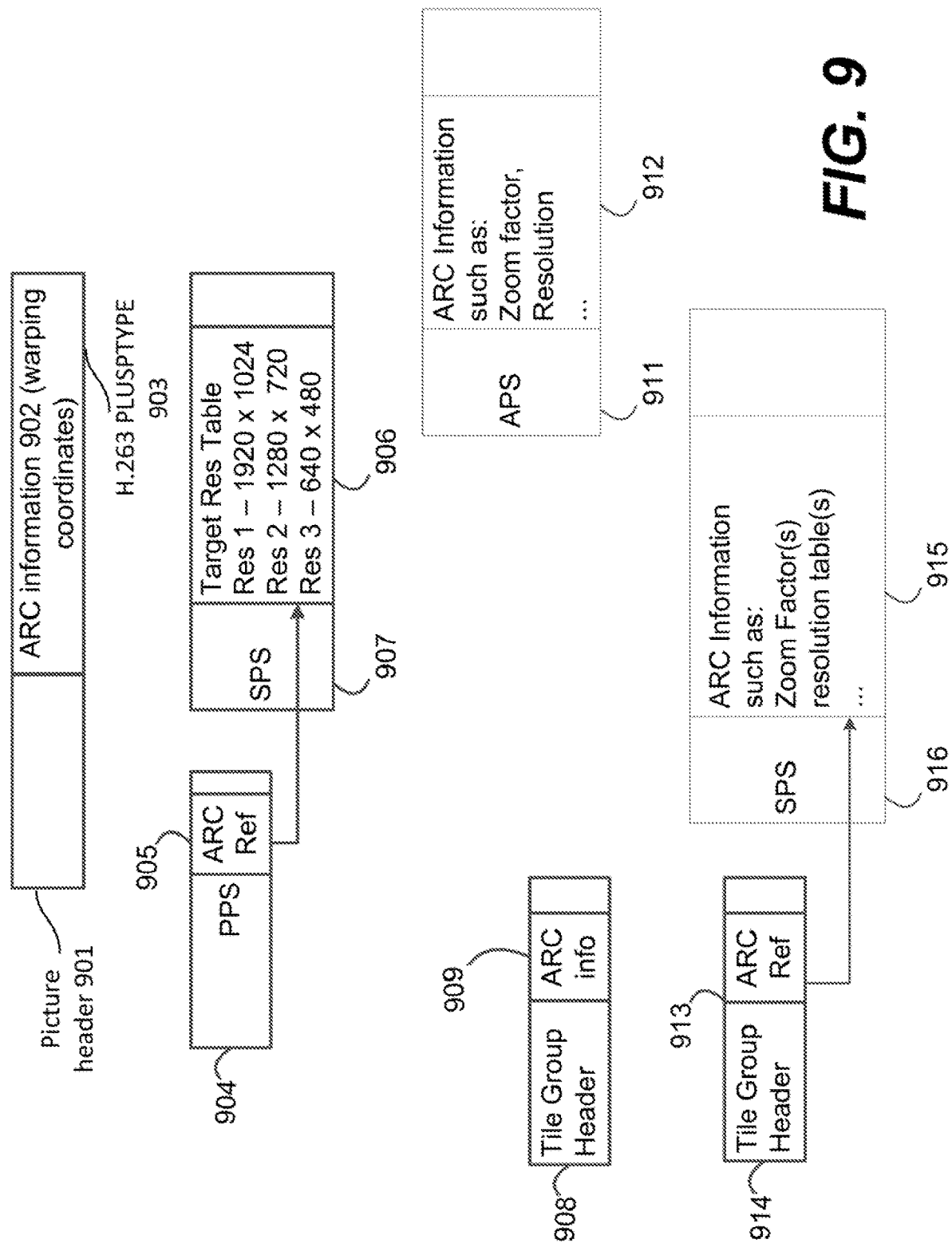
FIG. 9 shows examples for signaling adaptive resolution change (ARC) parameters according to embodiments of the disclosure.

FIG. 9 shows examples (e.g., options) for signaling ARC parameters according to embodiments of the disclosure. Coding efficiency, complexity, and architecture can vary among the examples. A video coding standard or technology may choose one or more of the examples, or other variations, for signaling ARC parameters. The examples may not be mutually exclusive, and may be interchanged based on application needs, standards technologies, choice of an encoder, and/or the like.

Classes of ARC parameters may include:
Upsample and/or downsample factors, separate or combined in an X dimension and a Y dimension where one or more short syntax elements that can point to a table including the upsample and/or downsample factors can be coded;
Upsample and/or downsample factors, with an addition of a temporal dimension, indicating a constant speed zoom in and/or out for a given number of pictures where one or more short syntax elements that can point to a table including the upsample and/or downsample factors with the addition of the temporal dimension can be coded;
A resolution, in the X dimension or the Y dimension, in units of samples, blocks, macroblocks, CUs, or any other suitable granularity, of an input picture, an output picture, a reference picture, a coded picture, combined or separately. If there are more than one resolution (e.g.,
one resolution for the input picture, another resolution for the reference picture), a set of values can be inferred from another set of values, which can be gated, for example, by the use of flags, as described below;
Warping coordinates that are similar to that used in the H.263 Annex P, in a suitable granularity as described above. The H.263 Annex P defines an efficient way to code the warping coordinates. Other efficient ways can be devised. For example, the variable length reversible, Huffman-style coding of warping coordinates of Annex P can be replaced by a suitable length binary coding where the length of the binary code word can be derived from a maximum picture size that is multiplied by a factor and offset by a value to allow for warping outside of boundaries of the maximum picture size;
Upsample and/or downsample filter parameters. In an example, there is only a single filter for upsampling and/or downsampling. In an example, it is advantageous to allow more flexibility in a filter design. In an example, the filter parameters are signaled. The filter parameters can be selected by using an index in a list of possible filter designs. The filter may be fully specified (e.g., by specifying a list of filter coefficients, using suitable entropy coding techniques), the filter may be implicitly selected through upsample or downsample ratios which are signaled according to any of the mechanisms described above, and/or the like.

The description can be applicable to coding of a finite set of upsample or downsample factors (the same factor to be used in both the X dimension and the Y dimension), indicated through a codeword. The codeword can advantageously be variable length coded, for example, using an Ext-Golomb code for certain syntax elements in video coding specifications (e.g., H.264 and H.265). A suitable mapping of values to upsample or downsample factors can, for example, be based on Table 1.

TABLE 1

Mapping upsample or downsample factors, codewords, and Ext-Golomb codes

| Codeword | Ext-Golomb Code | Original/Target resolution |
| --- | --- | --- |
| 0 | 1 | 1/1 |
| 1 | 010 | 1/1.5 (upscale by 50%) |
| 2 | 011 | 1.5/1 (downscale by 50%) |
| 3 | 00100 | 1/2 (upscale by 100%) |
| 4 | 00101 | 2/1 (downscale by 100%) |

Similar mappings can be devised according to an application and capabilities of upscale and downscale mechanisms available in a video compression technology or standard. Table 1 can be suitably extended to additional values. Values may be represented by entropy coding mechanisms other than the Ext-Golomb code, for example, by using a binary coding. In an example, entropy coding mechanisms other than the Ext-Golomb code may have certain advantages when the resampling factors are of interest outside the video processing engines (e.g., an encoder and a decoder), for example, by media-aware network elements (MANEs). When no resolution change is required (e.g., the original/target resolution being 1 in Table 1), a short Ext-Golomb code (e.g., only a single bit shown in Table 1) can be chosen, which can have a coding efficiency advantage, for example, over using binary codes for the most common case.

A number of entries in Table 1, and corresponding semantics can be fully or partially configurable. For example, a basic outline of Table 1 is conveyed in a high level parameter set, such as an SPS or a DPS. Alternatively or in addition, one or more tables similar to Table 1 may be defined in a video coding technology or standard, and may be selected through, for example, an SPS or a DPS.

How an upsample or downsample factor (ARC information) coded as described above, may be included in a video coding technology or standard syntax is described above. Similar considerations may apply to one or a few codewords controlling the upsample or downsample filters. When a comparatively large amount of data is required for a filter or other data structures, the description is below.

Referring to FIG. 9, in an example, such as in H.263 Annex P, ARC information (902) in a form of four warping coordinates is included in a picture header (901), specifically in an H.263 PLUSPTYPE (903) header extension. The picture header (901) including the ARC information (902) and the H.263 PLUSPTYPE (903) header extension can be applied when i) a picture header is available, and ii) frequent changes of the ARC information are expected. However, the overhead when using the H.263-style signaling can be high, and scaling factors may not be applicable among picture boundaries as the picture header can be of a transient nature.

Referring to FIG. 9, in an example such as JVCET-M135-v1, ARC reference information (905) (e.g., an index) located in a PPS (904) can point to a table (or a target resolution table) (906) including target resolutions (e.g., resolutions 1-3) where the table (906) is located inside an SPS (907). Placing the target resolutions in the table (906) in the SPS (907) can be justified by using the SPS as an interoperability negotiation point during capability exchange. A resolution can change, within a limit set by the values (e.g., the resolutions 1-3) in the table (906) from one picture to another picture by referencing the appropriate PPS (904).

Referring back to FIG. 9, additional options or examples may be used to convey ARC information in a video bitstream. A plurality of the options may be simultaneously present in a same video coding technology or standard.

In an embodiment, ARC information (909) such as a resampling factor (or zoom factor) may be present in a header, such as a slice header, a GOB header, a tile header, a tile group header, or the like. A tile group header (908) is illustrated in FIG. 9 for example. The embodiment can be adequate when a memory space for the ARC information (909) is small, such as a single variable length ue(v) or a fixed length codeword of a few bits, as shown above.

Having the ARC information (909) in a header (e.g., the tile group header (908) in FIG. 9, a slice header, or a tile header) directly can have additional advantages in that the ARC information (909) may be applicable to a sub-picture represented by, for example, a corresponding tile group (or a slice, a tile), rather than an entire picture. In addition, in an example, even if a video compression technology or standard envisions only whole picture adaptive resolution changes (in contrast to, for example, a tile group based adaptive resolution changes), putting the ARC information (909) into the tile group header (908) vis a vis putting the ARC information (909) into an H.263-style picture header can have certain advantages from an error resilience viewpoint.

Referring to FIG. 9, ARC information (912) may be present in a parameter set (911) such as a PPS, a header parameter set, a tile parameter set, an adaptation parameter set (APS), or the like. An APS (911) is illustrated in FIG. 9 for example. A scope of the parameter set (911) can advantageously be not larger than a picture, for example, a tile group. The use of the ARC information (e.g., the ARC information (912)) can be implicit through the activation of the relevant parameter set (e.g., the APS (911)). For example, when a video coding technology or standard contemplates only picture-based ARC, a PPS or equivalent may be appropriate.

In some embodiments, ARC reference information (913) may be present in a tile group header (914) or a similar data structure (e.g., a picture header, a slice header, a tile header, or a GOP header) as described above. The tile group header (914) is illustrated in FIG. 9 for example. The ARC reference information (913) can refer to a subset of ARC information (915) available in a parameter set (916) with a scope beyond a single picture, for example an SPS, a DPS, or the like. The SPS (916) is illustrated in FIG. 9 for example.

FIG. 10 shows examples of ARC parameters signaling according to embodiments of the disclosure. FIG. 10 shows syntax diagram examples used in video coding standards. In an example, the notation of the syntax diagrams roughly follows C-style programming. Lines in boldface can indicate syntax elements present in a bitstream, and lines without boldface can indicate control flow(s) or setting of variables.

Referring to FIG. 10, a tile group header (1001) as an exemplary syntax structure of a header applicable to a part (e.g., a rectangular part) of a picture can conditionally contain, a variable length, Exp-Golomb coded syntax element decpic_size_idx (1002) (depicted in boldface). The presence of the syntax element (e.g., the decpic_size_idx (1002)) in the tile group header (1001) can be gated based on an adaptive resolution, for example, represented by a flag (e.g., an adaptive_pic_resolution_change_flag) (1003). A value of the flag (e.g., the adaptive_pic_resolution_change_flag) (1003) is not depicted in boldface, and thus the flag is present in the bitstream at a point where the flag occurs in the syntax diagram. Whether the adaptive resolution is in use for the picture or the part of the picture can be signaled in a high level syntax structure (e.g., a SPS (1010) as described below) inside or outside the bitstream.

Referring to FIG. 10, an excerpt of the SPS (1010) is shown. The first syntax element shown is a flag (e.g., an adaptive_pic_resolution_change_flag) (1011). When the flag is true, the flag can indicate a use of the adaptive resolution which may require certain control information. In an example, the certain control information is conditionally present based on a value of the flag (1011) as shown by an if ( ) statement (1012) in the SPS (1010) and the tile group header (1001).

When the adaptive resolution is in use, such as shown in the example in FIG. 10, an output resolution in units of samples (or a resolution of an output picture) (1013) can be coded. The output resolution (1013) can refer to both a width resolution (e.g., an output_pic_width_in_luma_samples) and a height resolution (e.g., an output_pic_height_in_luma_samples). The width resolution and the height resolution can define the output resolution (1013). In a video coding technology or standard, certain restrictions to value(s) of the output resolution (1013) can be defined. For example, a level definition may limit a number of total output samples (e.g., a product of the output_pic_width_in_luma_samples and the output_pic_height_in_luma_samples). A video coding technology or standard, or an external technology or standard (e.g., a system standard) can limit a range (e.g., the width resolution and/or the height resolution are divisible by a power of 2), an aspect ratio (e.g., a ratio of the width resolution over the height resolution is 4:3 or 16:9), or the like. In an example, the above restrictions may be introduced to facilitate hardware implementations.

In certain applications, an encoder can instruct a decoder to use a certain reference picture size rather than implicitly assume that a size is the output picture size. For example, a syntax element (e.g., a reference_pic_size_present_flag) (1014) gates a conditional presence of reference picture dimensions (1015). The reference picture dimensions (1015) can refer to both a width (e.g., a reference_pic_width_in_luma_samples) and a height (e.g., a reference_pic_height_in_luma_samples).

FIG. 10 shows a table of applicable decoding picture widths and heights. The table can be expressed by a table indication (e.g., a syntax element num_decpic_size_in_luma_samples_minus1) (1016). The "minus1" can refer to the interpretation of the value of the syntax element (1016). For example, if the coded value is zero, one table entry is present. If the coded value is five, six table entries are present. For each line in the table, the decoded picture width and height are included in syntax elements (1017).

The table entries represented by the syntax elements (1017) can be indexed using the syntax element decpic_size_idx (1002) in the tile group header (1001), and thus allowing different decoded sizes and zoom factors per tile group.

Certain video coding technologies or standards (e.g., VP9) can support spatial scalability by implementing certain forms of reference picture resampling in conjunction with temporal scalability, and thus can enable spatial scalability. In an embodiment, a reference picture is upsampled using ARC-style technologies to a higher resolution to form the base of a spatial enhancement layer. The upsampled picture can be refined, using normal prediction mechanisms (e.g., motion-compensated prediction for inter-prediction from reference pictures) at the high resolution for example to add detail.

The disclosure can be used in such an environment. In some examples, a value in a Network Abstraction Layer (NAL) unit header, for example, a Temporal ID field, is used to indicate a temporal and a spatial layer. The advantages can include existing Selected Forwarding Units (SFUs) can be used without modification for scalable environments. The SFUs can be, based on the NAL unit header Temporal ID value, created and optimized for the temporal layer selected forwarding. To enable that, a mapping can be performed between a coded picture size and the temporal layer as indicated by the temporal ID field in the NAL unit header.

When pictures are encoded into a bitstream that includes one or more layers with different qualities, the bitstream can have syntax elements that specify which layer(s) may be output at a decoder side. A set of layers to be output can be defined as an output layer set. In a video codec supporting multiple layers and scalabilities, one or more output layer sets can be signaled in one or more VPSs. One or more syntax elements that specify PTL information for the entire bitstream, a CVS, each output layer set, and/or the like can be signaled in a high-level syntax structure, such as a VPS, a DPS, DCI, a SPS, a PPS, an APS, a GOP, a sequence, a header, an SEI message, or the like.

Block-level coding tools can be used to decode pixels or samples in a picture to reconstruct the picture. The block-level coding tools can include any suitable coding tools used in reconstruction of a coding block, such as coding tools for inter prediction (or inter coding tools), coding tool(s) for intra prediction (or intra coding tools), an adaptive loop filter (ALF), a deblocking filter (DBF), entropy coding, a transform, and the like.

High-level syntax (HLS) can specify information on functionality, system-interface, picture-level control of tools and buffer control, and the like. For example, the HLS can specify partition (e.g., a tile, a slice, a subpicture), buffer management, random access (e.g., IDR, clean random access (CRA)), parameter set(s) (e.g., a VPS, an SPS, a PPS, an APS), reference picture resampling (RPR), scalability, and/or the like. The high-level syntax can be above a block-level.

Control information can include SPS level tool control information, PPS level tool control information, sequence level control information, bitstream level control information, and/or the like.

Constraint flags can be part of an HLS structure.

In an example, constraint flags indicate control of tools. The constraint flags can be provided in one of: sequence level control information and bitstream level control information. In an example, if certain tools are disabled by constraint flags, no control information is present in the HLS and the tools are not used, for example, for coding blocks in a scope corresponding to the HLS.

Constraint flags can be signaled in a profile syntax structure.

Constraint information can indicate whether a specific tool, functionality or syntax elements are present or used in a corresponding video stream or coded video bitstream. For example, constraint flags can indicate whether inter coding tools, intra coding tools, a DBF, entropy coding, a transform, partitioning (e.g., a tile, a slice), buffer management, random access (e.g., IDR), a parameter set (e.g., an SPS, a PPS), and/or the like are present or used in the coded video bitstream. The constraint information can be signaled in parameter sets (e.g., an SPS, a VPS, or DCI). The constraint flags can be signaled in a high-level syntax structure (e.g., an SPS, a VPS, DCI).

FIG. 11 shows an example of a set of PTL syntax elements according to an embodiment of the disclosure. The set of PTL syntax elements can include general_profile_idc, general_tier_flag, general_level_idc, num_sub_profiles, general_sub_profile_idc, sublayer_level_present_flag, ptl_alignment_zero_bit, sublayer_level_idc, and general constraint information.

The general constraint information can include constraint information on a video source type, coding tools, functionalities, and/or the like. FIG. 12 shows an example of the general constraint information according to an embodiment of the disclosure. The general constraint information can include a plurality of constraint flags, as shown in FIG. 12. Referring to FIG. 12, a constraint flag (e.g., an intra_only_constraint_flag) (1205) equal to 1 is indicative of a sh_slice_type being I (i.e., a slice being an intra slice). The constraint flag (e.g., the intra_only_constraint_flag) (1205) equal to 0 does not impose the constraint (e.g., the sh_slice_type being I) for all coded pictures within the scope of the PTL information where other information (e.g., a profile_idc) can allow non intra-slices. In an example, a constraint flag (e.g., a no_alf_constraint_flag) (1206) equal to 1 can indicate that an sps_alf_enabled_flag is equal to 0 for all CVSs within the scope of the PTL information, and thus adaptive loop filtering is not in use even if the adaptive loop filtering is allowed based, for example, on the profile_idc. The constraint flag (e.g., the no_alf_constraint_flag) (1206) equal to 0 does not impose the above constraint.

A constraint flag (e.g., a no_lossless_coding_tool_constraint_flag) (1201) can be signaled in the general constraint information, as shown in FIG. 12. The constraint flag (e.g., the no_lossless_coding_tool_constraint_flag) (1201) equal to 1 can indicate that coding tool(s) related to lossless coding cannot be used within the scope of the PTL information including the constraint flag (1201). The constraint flag (e.g., the no_lossless_coding_tool_constraint_flag) (1201) equal to 0 does not impose the above constraint.

A constraint flag (e.g., a no_lossy_coding_tool_constraint_flag) (1202) can be signaled in the general constraint information, as shown in FIG. 12. The constraint flag (e.g., the no_lossy_coding_tool_constraint_flag) (1202) equal to 1 can indicate that coding tool(s) related to lossy coding cannot be used within the scope of the PTL information including the constraint flag (1202). The constraint flag (e.g., the no_lossy_coding_tool_constraint_flag) (1202) equal to 0 does not impose the above constraint.

In an embodiment, the constraint flag (e.g., the no_lossless_coding_tool_constraint_flag) (1201) may not be equal to 1 when the constraint flag (e.g., the no_lossy_coding_tool_constraint_flag) (1202) is equal to 1. Alternatively, the constraint flag (e.g., the no_lossy_coding_tool_constraint_flag) (1202) may not be equal to 1 when the constraint flag (e.g., the no_lossless_coding_tool_constraint_flag) (1201) is equal to 1.

The plurality of constraint flags in the general constraint information can be sorted in certain orders. The order can be set based on, for example, likelihoods of respective mechanisms and/or tools not being used in a scope of a PTL. The order can be referred to as a priority order. The order can be presented in the general constraint information syntax structure from a high priority to a low priority where the high priority indicates that non-use of a tool (or a mechanism) has a high likelihood and the low priority indicates that non-use of the tool (or the mechanism) has a low likelihood. Additional factors affecting the order can include tools likely being used only for specific use cases (e.g., tools for sub-pictures, scalability, and/or interlace support), impact of the tool for encoder/decoder/implementation complexity, and the like.

FIGS. 13A-13B show an example of PTL information (including for example a set of PTL syntax elements) according to an embodiment of the disclosure. A syntax element indicating a number of constraint flags (e.g., a num_available_constraint_flags) (1301) can be signaled in the PTL information. For example, the number of constraints flag can be signaled outside of a general constraint information bracket, as shown in FIG. 13A. Alternatively, the syntax element indicating the number of constraint flags can be signaled in a beginning of the general constraint information syntax structure. When the syntax element (e.g., the num_available_constraint_flags) is present and a value of the syntax element (e.g., the num_available_constraint_flags) is equal to N, the first N constraint flags may be present in the general constraint information syntax structure. Further, other constraint flags may not be present and can be inferred to be equal to a specific value. N can be a non-negative integer.

In an embodiment, the value N (e.g., the num_available_constraint_flags) is in a range of 0 to a maximum number of constraint flags (e.g., MaxNumConstraintFlags). The maximum number of constraint flags can be any positive integer. The value of the maximum number of constraint flags (e.g., MaxNumConstraintFlags) can be predefined to be 16, 32, 64, 128, or the like. When the value N (e.g., num_available_constraint_flags) is equal to 0, no constraint flags are present in the general constraint information syntax structure. Coding of the value N (e.g., num_available_constraint_flags) can be chosen such that a corresponding entropy-coded representation for the value N and the constraint flags can add up to a number divisible by 8 to ensure byte alignment.

According to aspects of the disclosure, constraint flags can be categorized into one or more constraint information groups. Each constraint information group can include one or more constraint flags and can have a corresponding gate flag. A gate flag of a corresponding constraint information group can indicate whether constraint flag(s) in the corresponding constraint information group may be present. In an example, the gate flag can be referred to as a constraint group present flag. In general, the gate flag is associated with the corresponding constraint information group, and is associated with constraint flag(s) in the corresponding constraint information group. In an embodiment, the gate flag gates whether the constraint flag(s) in the corresponding constraint information group are present (or signaled) in constraint information. For example, if the gate flag of the corresponding constraint information group is equal to 1, the constraint flag(s) corresponding to the constraint information group can be present, for example, in the constraint information. If the gate flag of the corresponding constraint information group is equal to 0, the constraint flag(s) corresponding to the constraint information group may not be present, for example, in the constraint information. In an example, if all the gate flags are equal to 0, no constraint flags are present.

Constraint flags can have different copes. For example, a scope of constraint flags in DCI can be a coded video bitstream. A scope of constraint flags in a VPS can be CLVSs with multiple layers. A scope of constraint flags in an SPS can be a single CLVS.

A flag (e.g., a gate_flag_all) can indicate whether the gate flag(s) are present. In an example, the flag is false indicating that no gate flags(s) are present. In an example, when no gate flag(s) are present, no constraint flags are present in the constraint information. In an example, the flag is true indicating that one or more of the gate flags(s) are present.

According to aspects of the disclosure, a gate flag for each of at least one constraint information group in constraint information signaled in a coded video bitstream can be obtained. Each gate flag can indicate whether a constraint information group of the at least one constraint information group corresponding to the respective gate flag is present in the constraint information. The constraint information can be for a subset of coding blocks in the coded video bitstream. Whether the constraint information group of the gate flag is present in the constraint information can be determined based on the gate flag of a constraint information group of the at least one constraint information group. The constraint information group of the gate flag can include at least one constraint flag for the subset of coding blocks. Prediction information for the subset of coding blocks can be determined based on whether the constraint information group of the gate flag is present in the constraint information. The subset of coding blocks can be reconstructed based on the prediction information.

In an embodiment, the constraint information group of the gate flag is determined to be present in the constraint information. The prediction information for the subset of coding blocks can be determined based on the at least one constraint flag in the constraint information group of the gate flag. In an embodiment, the constraint information group of the gate flag is determined not to be present in the constraint information.

In an embodiment, each gate flag indicates that the constraint information group corresponding to the respective gate flag is not present in the constraint information, and no constraint flags are present in the constraint information.

In an embodiment, the constraint information is present in a high-level syntax for at least one picture, and the subset of coding blocks includes coding blocks in the at least one picture. The high-level syntax can be a VPS, a DPS, DCI, a SPS, a PPS, an APS, a GOP, a sequence, or the like. In an example, the high-level syntax is DCI or a DPS, a scope of the constraint information includes the coded video bitstream, and thus includes coding blocks in the coded video bitstream. In an example, the high-level syntax is a VPS, a scope of the constraint information includes CLVSs with multiple layers, and thus includes coding blocks in the CLVSs. In an example, the high-level syntax is a SPS, a scope of the constraint information includes a single CLVS, and thus includes coding blocks in the single CLVS.

In an embodiment, each constraint flag that can be present (or signaled) in constraint information is categorized into one or more constraint information groups, and thus can be gated by a respective gate flag. In an example, the one or more constraint information groups include a first constraint information group and a second constraint information group. The constraint flags include at least one first constraint flag and at least one second constraint flag. The at least one first constraint flag is categorized into the first constraint information group, and the at least one second constraint flag is categorized into the second constraint information group. A first gate flag of the first constraint information group can indicate whether the at least one first constraint flag (or the first constraint information group) is present (e.g., signaled) in the constraint information. A second gate flag of the second constraint information group can indicate whether the at least one second constraint flag (or the second constraint information group) is present (e.g., signaled) in the constraint information. Thus, in the example, the constraint information does not include additional constraint flag(s) to the at least one first constraint flag and the at least one second constraint flag.

In an embodiment, a first subset of constraint flags is categorized into one or more constraint information groups, and thus can be gated by a respective gate flag. Further, a second subset of constraint flags is outside the one or more constraint information groups, and thus is not gated by gate flag(s). In an example, the one or more constraint information groups include a third constraint information group and a fourth constraint information group. The first subset of constraint flags includes at least one third constraint flag and at least one fourth constraint flag. The at least one third constraint flag is categorized into the third constraint information group, and the at least one fourth constraint flag is categorized into the fourth constraint information group. A third gate flag of the third constraint information group can indicate whether the at least one third constraint flag (or the third constraint information group) is present (e.g., signaled) in the constraint information. A fourth gate flag of the fourth constraint information group can indicate whether the at least one fourth constraint flag (or the fourth constraint information group) is present (e.g., signaled) in the constraint information. In addition, the constraint information can include the second subset of constraint flags. In an example, the third gate flag and the fourth gate flag indicate that the third constraint information group and the fourth constraint information group are not signaled in the constraint information, and thus the constraint information includes the second subset of constraint flags and does not include the at least one third constraint flag and the at least one fourth constraint flag. In an example, the third gate flag and the fourth gate flag indicate that the third constraint information group and the fourth constraint information group are signaled in the constraint information, and thus the constraint information includes the second subset of constraint flags, the at least one third constraint flag, and the at least one fourth constraint flag.

FIGS. 14A-14B show an exemplary general constraint information syntax structure (1400) according to an embodiment of the disclosure. The general constraint information syntax structure (1400) can represent constraint information (e.g., referred to as general constraint information). The general constraint information (or the general constraint information syntax structure (1400)) can include one or more gate flags, such as a gate flag (e.g., a general_frame_structure_constraint_group_flag) (1401), a gate flag (e.g., a high_level_functionality_constraint_group_flag) (1402), a gate flag (e.g., a scalability_constraint_group_flag) (1403), a gate flag (e.g., a partitioning_constraint_group_flag) (1404), a gate flag (e.g., an intra_coding_tool_constraint_group_flag) (1405), a gate flag (e.g., an inter_coding_tool_constraint_group_flag) (1406), a gate flag (e.g., a transfom_constraint_group_flag) (1407), a gate flag (e.g., an inloop_filtering_constraint_group_flag) (1408) in FIG. 14A. The one or more gate flags (e.g., the gate flags (1401)-(1408)) can be present at the beginning of the general constraint information syntax structure (1400), as shown in FIG. 14A.

The gate flag (e.g., the general_frame_structure_constraint_group_flag) (1401) is associated with a constraint information group (1410), and is associated with constraint flags (1411)-(1414) that are in the constraint information group (1410). The gate flag (e.g., the general_frame_structure_constraint_group_flag) (1401) being equal to 1 can specify that the constraint flags (1411)-(1414) that are in the constraint information group (1410) may be present.

The constraint information group (1410) (or the constraint flags (1411)-(1414)) can be related to input source and frame packing (e.g. a packed or a projected frame). Referring to FIG. 14A, the constraint flags (1411)-(1414) correspond to a general non_packed_constraint_flag (1411), a general_frame_only_constraint_flag (1412), a general non_projected_constraint_flag (1413), and a general_one_picture_only_constraint_flag (1414). Otherwise, the gate flag (e.g., the general_frame_structure_constraint_group_flag) (1401) being equal to 0 can specify that constraint flags (1411)-(1414) that are in a constraint information group (1410) may not be present.

Referring to FIG. 14B, the gate flag (e.g., the high_level_functionality_constraint_group_flag) (1402) being equal to 1 can specify that constraint flags related to high level functionality (e.g. reference picture resampling) that are in a constraint information group (1420) may be present. Otherwise, the gate flag (e.g., the high_level_functionality_constraint_group_flag) (1402) being equal to 0 can specify that the constraint flags that are in the constraint information group (1420) may not be present.

Referring back to FIG. 14A, the gate flag (e.g., the scalability_constraint_group_flag) (1403) being equal to 1 can specify that constraint flag(s) related to scalability (e.g. interlayer prediction) may be present. Otherwise, the constraint flag(s) related to the scalability may not be present.

The gate flag (e.g., the partitioning_constraint_group_flag) (1404) being equal to 1 can specify that constraint flag(s) related to high level partitioning (e.g. a subpicture or a tile) may be present. Otherwise, the constraint flags related to the high level partitioning may not be present.

The gate flag (e.g., the intra_coding_tool_constraint_group_flag) (1405) being equal to 1 can specify that constraint flag(s) related to intra coding (e.g. intra prediction) may be present. Otherwise, the constraint flag(s) related to the intra coding may not be present.

The gate flag (e.g., the inter_coding_tool_constraint_group_flag) (1406) being equal to 1 can specify that constraint flag(s) related to inter coding (e.g. motion compensation for inter-picture prediction) may be present. Otherwise, the constraint flags related to the inter coding may not be present.

The gate flag (e.g., the transfom_contraint_group_flag) (1407) being equal to 1 can specify that constraint flag(s) related to transform coding (e.g. multiple transform matrices) may be present. Otherwise, the constraint flags related to the transform coding may not be present.

In an embodiment, when all gate flags (e.g., the gate flags (1401)-(1408) in FIG. 14A) are equal to 0, no constraint flags are present in a constraint information syntax structure (e.g., the general constraint information syntax structure (1400)).

According to aspects of the disclosure, syntax can be designed such that control information including gate flags (e.g., the gate flags (1401)-(1408)), associated constraint flags (e.g., the constraint flags (1411)-(1412) and the constraint flags in the constraint information group (1420)), additional control information, and/or the like can be byte aligned, for example, a number of flags is divisible by 8 to preserve the byte alignment. In an example, a number of gate flags and constraint flags in constraint information (e.g., the general constraint information syntax structure (1400)) is divisible by 8. A byte-alignment mechanism can be used to achieve the byte-alignment of the control information. Referring to FIG. 14B, syntax (e.g., a while loop) (1430) can be used for byte-alignment.

In an embodiment, offset information such as an offset (e.g., a syntax element constraint_info_offset[ ])) and length information such as a length (e.g., a syntax element constraint_info_length[ ]) are present in the constraint information (e.g., at the beginning of a general constraint information syntax structure) indicating that the at least one constraint flag in the constraint information group of the gate flag is present in the constraint information. In an embodiment, one or more of the at least one constraint information group are present in the coded video bitstream. An offset and a length can be present in the constraint information indicating that at least one constraint flag in each of the one or more of the at least one constraint information group is present in the constraint information. A number of the offsets can be signaled in the coded video bitstream.

In an embodiment, zero or more offsets (or constraint information offsets) (e.g., indicated by the syntax element constraint_info_offset[ ]) and corresponding zero or more lengths (or constraint information lengths) (e.g., indicated by the syntax element constraint_info_length[ ]) can be present in constraint information, such as at the beginning of a general constraint information syntax structure. A number of the zero or more constraint information offsets and a number of the zero or more constraint information lengths can be explicitly indicated by syntax element(s).

In an example, the number of the zero or more constraint information offsets and the number of the zero or more constraint information lengths are identical, and the number of the zero or more constraint information offsets (represented by M) is explicitly indicated (or signaled) by a syntax element (e.g., a num_constraint_info_set). M can be an integer that is larger than or equal to 0. M being 0 can indicate that no constraint information offsets and no constraint information lengths are present in the constraint information.

In an embodiment, a constraint information offset (e.g., a syntax element constraint_info_offset[i]) and a constraint information length (e.g., a syntax element constraint_info_length[i]) can specify available constraint flags that are present in the constraint information (e.g., the general constraint information syntax structure). In an example, when a value of the constraint information offset (e.g., the syntax element constraint_info_offset[i]) is equal to 5, and a value of the constraint information length (e.g., the syntax element constraint_info_length[i]) is equal to 3, the fifth, the sixth, and the seventh constraint flags are present in the constraint information (e.g., the general constraint information syntax structure).

In an example, if M is equal to 0, no constraint flags are present in the constraint information (e.g., the general constraint information syntax structure).

In an example, a run-length coding can be used to code the constraint flags that are specified in a pre-determined order (or a given order).

In an embodiment, a run-coding can be used where the constraint flags are specified in a pre-determined order (or a given order). Instead of coding the constraint flags directly, a suitably coded list of "skip" values can indicate constraint flags that are equal to zero, with a following constraint flag being implied to be equal to 1. The run-coding described above may be particularly efficient if (i) a number of the constraint flags is large and (ii) a small percentage of the constraint flags is equal to 1.

In an embodiment, one or more of the at least one constraint information group are present in the coded video bitstream. A plurality of constraint flags in the one or more of the at least one constraint information group is signaled according to the predetermined order. Accordingly, the plurality of constraint flags can be run-coded (e.g., run-encoded or run-decoded). Further, the prediction information for the subset of coding blocks can be determined based on the plurality of constraint flags.

In an embodiment, the at least one constraint flag in the constraint information group of the gate flag includes a plurality of constraint flags signaled according to a predetermined order. Accordingly, the plurality of constraint flags can be run-coded (e.g., run-encoded or run-decoded).

In an embodiment, a full list of the constraint flags can be specified in a video coding standard (e.g., a VVC specification), an external table, or the like. In an example, only available constraint flag(s) of the constraint flags are indicated, for example, by one or more of the following: a number of available constraint flags (e.g., a num_available_constraint_flags), gate flag(s) (or constraint group present flag(s)), constraint information offset information and constraint information length information, or the like are present in the coded video stream.

In an example, a full list of the constraint flags is specified and is available to an encoder and a decoder. The full list of the constraint flags can be stored at the decoder. The full list of the constraint flags can include 100 constraint flags. 10 of the 100 constraint flags are present in constraint information for a CLVS and thus are available to the subset of coding blocks in the CLVS. The 10 of the 100 constraint flags are referred to as the 10 available constraint flags. In an example, a number of available constraint flags (e.g., 10) is signaled. In an example, the 10 available constraint flags are in two constraint information groups and are gated by a first gate flag and a second gate flag. Thus, the first gate flag and the second gate flag can be signaled to indicate the 10 available constraint flags.

In an example, a first constraint information offset (e.g., the syntax element constraint_info_offset[0]) and a first constraint information length (e.g., the syntax element constraint_info_length[0]) are signaled. A second constraint information offset (e.g., the syntax element constraint_info_offset[1]) and a second constraint information length (e.g., the syntax element constraint_info_length[1]) are signaled. For example, the syntax element constraint_info_offset[0] is 15 and the syntax element constraint_info_length[0] is 3, and the syntax element constraint_info_offset[1] is 82 and the syntax element constraint_info_length[1] is 7, and thus indicate that the 15th to the 17th constraint flags and the 82th to the 88th constraint flags in the full list (e.g., the 100 constraint flags) are available or present in the constraint information.

In an embodiment, any of the various techniques (or methods, embodiments, examples) for efficient coding of constraint flags can be combined, employing suitable control information. The combination may be a suitable combination of two or more of such techniques. Alternatively, one of the various techniques (or methods, embodiments, examples) can be used independently. Constraint flags can be grouped. In certain group(s), run-coding can be used while other group(s) may employ straightforward binary coding.

The value of the maximum number of constraint flags (e.g., MaxNumConstraintFlags) can be predefined to be 16, 32, 64, 128, or the like.

The value of the maximum number of constraint flags (e.g., MaxNumConstraintFlags) can be determined by the profile information, such as general_profile_idc or general_sub_profile_idc, or a codec version information, so that the range of the number of constraint flags (e.g., the num_available_constraint_flags (1301)) can be restricted by the profile information or the version information. For example, the value of the number of constraint flags (e.g., the num_available_constraint_flags (1301)) in a main profile (e.g., where the MaxNumConstraintFlags=64) can be in the range of 0 to 64, while the value of the number of constraint flags (e.g., the num_available_constraint_flags (1301)) in an advanced profile (e.g., where MaxNumConstraintFlags=128) can be in the range of 0 to 128.

In an embodiment, the value of the number of constraint flags (e.g., the num_available_constraint_flags) can be inferred to be equal to a value predefined by the profile information, such as general_profile_idc or general_sub_profile_idc, or codec version information, so that the value of num_available_constraint_flags can be determined without explicitly signaling.

In an embodiment, in FIG. 12, reserved byte information can be present in the general constraint information syntax structure. For example, the flags gci_num_reserved_bytes (1203) and gci_reserved_bytes[ ] (1204) can be present in the general constraint information syntax structure for extension of the general constraint information syntax structure. The flag gci_num_reserved_bytes can specify a number of reserved constraint bytes. In an example, the reserved constraint bytes are for signaling additional flags (e.g., additional constraint flags). The flag gci_reserved_byte[ ] may have any suitable value.

In an embodiment, a value of gci_num_reserved_bytes may be restricted or determined by the profile information, such as general_profile_idc or general_sub_profile_idc, or codec version information. With a base profile (or the main profile), the value of the flag gci_num_reserved_bytes can be 0. With an extended profile (or the advanced profile), the value of gci_num_reserved_bytes can be greater than 0.

A field sequence flag can be signaled in a coded video bitstream. The field sequence flag can indicate whether pictures in an output layer are coded with field coding. The field sequence flag can be signaled in an SPS as an sps_field_seq_flag. In an embodiment, the flag sps_field_seq_flag may be present in an SPS. The flag sps_field_seq_flag being equal to 1 can indicate that a CLVS conveys pictures that represent fields. The flag sps_field_seq_flag being equal to 0 can indicate that the CLVS conveys pictures that represent frames.

In the general constraint information syntax structure in FIG. 12, the flag general_frame_only_constraint_flag may be present. The flag general_frame_only_constraint_flag being equal to 1 can specify that a scope for an output layer set (e.g., OlsInScope) conveys pictures that represent frames. The flag general_frame_only_constraint_flag being equal to 0 specifies that the scope for the output layer set (e.g., the OlsInScope) conveys pictures that may or may not represent frames. In an embodiment, the flag general_frame_only_constraint_flag indicates whether pictures in an output layer set is coded with field coding. The output layer set can include the subset of coding blocks. The flag sps_field_seq_flag can be false based on the flag general_frame_only_constraint_flag (e.g., being 1) indicating that a subset of the pictures is not coded with field coding. The subset of the pictures can be in one layer of the output layer set.

When the flag general_frame_only_constraint_flag is equal to 1, the value of the flag sps_field_seq_flag may be equal to 0.

In an embodiment, the flag pps_mixed_nalu_types_in_pic_flag may be present in a PPS. The flag pps_mixed_nalu_types_in_pic_flag being equal to 1 can specify that each picture referring to the PPS has more than one VCL NAL unit and the VCL NAL units do not have the same value of nal_unit_type. The flag pps_mixed_nalu_types_in_pic_flag being equal to 0 can specify that each picture referring to the PPS has one or more VCL NAL units and the VCL NAL units of each picture referring to the PPS have the same value of nal_unit_type. In the general constraint information syntax structure in FIG. 12, the flag no_mixed_nalu_types_in_pic_constraint_flag may be present. The flag no_mixed_nalu_types_in_pic_constraint_flag being equal to 1 can specify that the value of pps_mixed_nalu_types_in_pic_flag shall be equal to 0. The flag no_mixed_nalu_types_in_pic_constraint_flag being equal to 0 does not impose such a constraint.

In an embodiment, the flag general_one_picture_only_constraint_flag may be present in the general constraint information syntax structure in FIG. 12. The general_one_picture_only_constraint_flag being equal to 1 can specify that there is only one coded picture in a bitstream. The flag general_one_picture_only_constraint_flag being equal to 0 does not impose such a constraint.

In an embodiment, the flag single_layer_constraint_flag may be present in the general constraint information syntax structure in FIG. 12. The flag single_layer_constraint_flag being equal to 1 can specify that a sps_video_parameter_set_id shall be equal to 0. The flag single_layer_constraint_flag being equal to 0 does not impose such a constraint. When the flag general_one_picture_only_constraint_flag is equal to 1, the value of the flag single_layer_constraint_flag may be equal to 1.

In an embodiment, the flag all_layers_independent_constraint_flag may be present in the general constraint information syntax structure in FIG. 12. The flag all_layers_independent_constraint_flag being equal to 1 can specify that a flag vps_all_independent_layers_flag may be equal to 1. The flag all_layers_independent_constraint_flag being equal to 0 does not impose such a constraint. When the flag single_layer_constraint_flag is equal to 1, the value of the flag all_layers_independent_constraint_flag may be equal to 1.

In an embodiment, the flag no_res_change_in_clvs_constraint_flag may be present in the general constraint information syntax structure in FIG. 12. The flag no_res_change_in_clvs_constraint_flag being equal to 1 can specify that a flag sps_res_change_in_clvs_allowed_flag may be equal to 0. The flag no_res_change_in_clvs_constraint_flag being equal to 0 does not impose such a constraint. When the flag no ref_pic resampling constraint flag to 1, the value of the flag no_res_change_in_clvs_constraint_flag may be equal to 1.

In an embodiment, the flag no_mixed_nalu_types_in_pic_constraint_flag may be present in the general constraint information syntax structure in FIG. 12. The flag no_mixed_nalu_types_in_pic_constraint_flag being equal to 1 specifies that the value of the flag pps_mixed_nalu_types_in_pic_flag may be equal to 0. The flag no_mixed_nalu_types_in_pic_constraint_flag being equal to 0 does not impose such a constraint. When a flag one_subpic_per_pic_constraint_flag is equal to 1, the value of the flag no_mixed_nalu_types_in_pic_constraint_flag may be equal to 1.

In an embodiment, the flag no_trail_constraint_flag may be present in the general constraint information syntax structure in FIG. 12. The flag no_trail_constraint_flag being equal to 1 can specify that there may be no NAL unit with a nuh_unit_type equal to TRAIL_NUT present in OlsInScope. The flag no_trail_constraint_flag being equal to 0 does not impose such a constraint. When the flag general_one_picture_only_constraint_flag is equal to 1, the flag no_trail_constraint_flag may be equal to 1.

In an embodiment, the flag no_stsa_constraint_flag may be present in general constraint information syntax structure in FIG. 12. The flag no_stsa_constraint_flag being equal to 1 can specify that there may be no NAL unit with the nuh_unit_type equal to STSA_NUT present in OlsInScope. The flag no_stsa_constraint_flag being equal to 0 does not impose such a constraint. When the flag general_one_picture_only_constraint_flag is equal to 1, the flag no_stsa_constraint_flag may be equal to 1.

In an embodiment, the flag no_trail_constraint_flag may be present in the general constraint information syntax structure in FIG. 12. The flag no_trail_constraint_flag being equal to 1 can specify that there may be no NAL unit with the nuh_unit_type equal to TRAIL_NUT present in OlsInScope. The flag no_trail_constraint_flag being equal to 0 does not impose such a constraint. When the flag general_one_picture_only_constraint_flag is equal to 1, the flag no_trail_constraint_flag may be equal to 1.

In an embodiment, the flag no_stsa_constraint_flag may be present in the general constraint information syntax structure in FIG. 12. The flag no_stsa_constraint_flag being equal to 1 can specify that there may be no NAL unit with the nuh_unit_type equal to STSA_NUT present in OlsInScope. The flag no_stsa_constraint_flag being equal to 0 does not impose such a constraint. When the flag general_one_picture_only_constraint_flag is equal to 1, the flag no_stsa_constraint_flag may be equal to 1.

In an embodiment, the flag no_idr_constraint_flag may be present in the general constraint information syntax structure in FIG. 12. The no_idr_constraint_flag being equal to 1 can specify that there may be no NAL unit with the nuh_unit_type equal to IDR_W_RADL or IDR_N_LP present in OlsInScope. The flag no_idr_constraint_flag being equal to 0 does not impose such a constraint.

In an embodiment, the flag no_cra_constraint_flag may be present in the general constraint information syntax structure in FIG. 12. The flag no_cra_constraint_flag being equal to 1 can specify that there may be no NAL unit with the nuh_unit_type equal to CRA_NUT present in OlsInScope. The flag no_cra_constraint_flag being equal to 0 does not impose such a constraint.

In an embodiment, the flag no_rasl_constraint_flag may be present in the general constraint information syntax structure in FIG. 12. The flag no_rasl_constraint_flag being equal to 1 can specify that there may be no NAL unit with the nuh_unit_type equal to RASL_NUT present in OlsInScope. The flag no_rasl_constraint_flag being equal to 0 does not impose such a constraint. When the flag no_cra_constraint_flag is equal to 1, the value of the flag no_rasl_constraint_flag may be equal to 1.

In an embodiment, the flag no_radl_constraint_flag may be present in the general constraint information syntax structure in FIG. 12. The flag no_radl_constraint_flag being equal to 1 can specify that there may be no NAL unit with the nuh_unit_type equal to RADL_NUT present in OlsInScope. The flag no_radl_constraint_flag being equal to 0 does not impose such a constraint. When the flag no_idr_constraint_flag is equal to 1 and the flag no_cra_constraint_flag is equal to 1, the value of the flag no_rasl_constraint_flag may be equal to 1.

FIGS. 15A-15D show an exemplary general constraint information syntax structure (1500) according to an embodiment of the disclosure. The general constraint information syntax structure (1500) can represent constraint information (e.g., referred to as general constraint information). The general constraint information (or the general constraint information syntax structure (1500)) can include a flag (e.g., a gci_present_flag) indicating whether constraint flags are present in the general constraint information syntax structure (1500). In an example, if the flag (e.g., the gci_present_flag) is true, one or more of the constraint flags can be present in the general constraint information syntax structure (1500). If the flag (e.g., the gci_present_flag) is false, no constraint flags can be present in the general constraint information syntax structure (1500).

As described above with reference to FIGS. 14A-14B, the constraint flags in FIGS. 15A-15D can be categorized into groups (e.g., constraint information groups). Whether constraint flags in a constraint information group can be present in the general constraint information syntax structure (1500) can be controlled, for example, by a corresponding gate flag for the constraint information group.

The general constraint information syntax structure (1500) can include any suitable number of constraint information groups. In an example, the general constraint information syntax structure (1500) can further include constraint flag(s) that are not included in the constraint information groups, and thus the constraint flag(s) are outside the constraint information groups.

In an example shown in FIGS. 15A-15D, the general constraint information syntax structure (1500) includes nine constraint information groups (1510)-(1518). The constraint information group (1510) is related to general constraint information and includes three constraint flags (e.g., a gci_intra_only_constraint_flag, a gci_all_layers_indepedent_constraint_flag, a gci_one_au_only_constraint_flag). In an example, a gate flag can gate or control whether the constraint information group (1510) is present in the general constraint information syntax structure (1500).

The constraint information group (1511) and corresponding constraint flags are related to picture format constraint information. In an example, a gate flag can gate or control whether the constraint information group (1511) is present in the general constraint information syntax structure (1500).

The constraint information group (1512) and corresponding constraint flags are related to NAL unit type constraint information. In an example, a gate flag can gate or control whether the constraint information group (1512) is present in the general constraint information syntax structure (1500).

The constraint information group (1513) and corresponding constraint flags are related to tile, slice, or subpicture partitioning constraint information. In an example, a gate flag can gate or control whether the constraint information group (1513) is present in the general constraint information syntax structure (1500).

The constraint information group (1514) and corresponding constraint flags are related to CTU and block partitioning constraint information. In an example, a gate flag can gate or control whether the constraint information group (1514) is present in the general constraint information syntax structure (1500).

The constraint information group (1515) and corresponding constraint flags are related to intra coding constraint information. In an example, a gate flag can gate or control whether the constraint information group (1515) is present in the general constraint information syntax structure (1500).

The constraint information group (1516) and corresponding constraint flags are related to inter coding constraint information. In an example, a gate flag can gate or control whether the constraint information group (1516) is present in the general constraint information syntax structure (1500).

The constraint information group (1517) and corresponding constraint flags are related to transform, quantization, and residual constraint information. In an example, a gate flag can gate or control whether the constraint information group (1517) is present in the general constraint information syntax structure (1500).

The constraint information group (1518) and corresponding constraint flags are related to loop filter constraint information. In an example, a gate flag can gate or control whether the constraint information group (1518) is present in the general constraint information syntax structure (1500).

In an embodiment, in FIG. 15D, syntax elements gci_num_reserved_bits and gci_reserved_zero_bit[ ] can be present in the general constraint information syntax structure (1500) for extension of the general constraint information syntax structure. The syntax element gci_num_reserved_bits can specify a number of reserved constraint bits. The syntax element gci_reserved_zero_bit[ ] may have any suitable value. In an example, the presence of the syntax element gci_reserved_zero_bit[ ] and the value of gci_reserved_zero_bit[ ] do not affect a decoding process specified in certain video coding standard (e.g., the VVC specification). The presence of the syntax element gci_reserved_zero_bit[ ] and the value of gci_reserved_zero_bit[ ] may be used for some video coding standard.

FIG. 16 shows an example of a set of PTL syntax elements in a PTL syntax structure according to an embodiment of the disclosure. The set of PTL syntax elements can include general_profile_idc, general_tier_flag, general_level_idc, ptl_frame_only_constraint_flag, ptl_multilayer_enabled_flag, plt_sublayer_level_present_flag[ ], ptl_reserved_zero_bit, sublayer_level_idc[ ], ptl_num_sub_profiles, general_sub_profile_idc, and/or general constraint information. Whether some (e.g., the general_profile_idc, the general_tier_flag, the general constraint information, the ptl_num_sub_profiles) of the set of PTL syntax elements can be present can be based on values of a flag (e.g., a profileTierPresentFlag).

A video sequence with one or more layers may be coded as field coding structure where two or more consecutive field pictures may comprise the full frame picture. The field coding information may be signaled in high-level syntax structure, such as parameter sets or SEI messages.

In an embodiment, every interlaced video frame has two fields for each frame. In some examples, a three-two pull down (a 3:2 pull down) can be used to convert 24 frames per second into 29.97 or 30 frames per second. The 3:2 pull down can convert four frames into five frames plus a slight slow down in speed, approximately.

In an embodiment, the flag (e.g., the sps_field_seq_flag) may be signaled in an SPS, as shown in FIG. 17, to indicate whether field coding is used or not. The flag (e.g., the sps_field_seq_flag) being equal to 1 can indicate that a CLVS conveys pictures that represent fields. The flag (e.g., the sps_field_seq_flag) being equal to 0 can indicate that the CLVS conveys pictures that represent frames. When the flag (e.g., the general_frame_only_constraint_flag) is equal to 1, the value of the flag (e.g., the sps_field_seq_flag) may be equal to 0. In an example, the flag (e.g., the general_frame_only_constraint_flag) being equal to 1 indicates that the value of the flag (e.g., the sps_field_seq_flag) is 0.

In an embodiment, when the flag (e.g., the sps_field_seq_flag) is equal to 1, a frame-field information SEI message may be present for every coded picture in the CLVS. A video coding standard or technology may require such presence.

In an embodiment, a decoding process may not treat pictures that represent fields or frames differently from other pictures. A sequence of pictures that represent fields can be coded with picture dimensions of an individual field. For example, pictures that represent 1080i fields can have cropped output dimensions of 1920×540, while a sequence picture rate can express a rate of source fields (e.g., typically between 50 and 60 Hz), instead of a source frame rate (e.g., typically between 25 and 30 Hz).

In an embodiment, the value of the flag (e.g., the sps_field_seq_flag) may be the same across layers. In an example, the value of the flag (e.g., the sps_field_seq_flag) can be the same in all SPSs that are referred to by CLVSs in a CVS, for example, because all layers can have the same field structure or the same frame structure.

In an embodiment, the value of the flag (e.g., the sps_field_seq_flag) of a layer A is equal to the value of the flag (e.g., the sps_field_seq_flag) of a dependent layer of the layer A in an output layer set.

In an embodiment, when the flag (e.g., the sps_field_seq_flag) is equal to 1, all fields that include a same frame may refer to the same PPS so that all fields of the same frame can have the same picture size, conformance window and tile partitioning.

In an embodiment, two fields of a frame may have a same partitioning structure with same tile syntax elements or same subpicture syntax elements.

In an embodiment, two fields of a frame can have an identical layer structure with a same number of layers and sublayers.

In an embodiment, as shown in FIG. 18, a flag (e.g., a vps_field_seq_flag) may be signaled in a VPS to indicate whether the layers referring to the VPS are coded as field or frame. The flag (e.g., the vps_field_seq_flag) being equal to 1 can indicate that the CVS referring to the VPS conveys pictures that represent fields. The flag (e.g., the vps_field_seq_flag) being equal to 0 can indicate that the CVS referring to the VPS conveys pictures that represent frames. When the flag (e.g., the general_frame_only_constraint_flag) is equal to 1, the value of the flag (e.g., the sps_field_seq_flag) shall be equal to 0.

When the flag (e.g., the vps_field_seq_flag) is present in the VPS, the value of the flag (e.g., the sps_field_seq_flag) in the SPS referring the VPS may be equal to the value of the flag (e.g., the vps_field_seq_flag).

High Level Syntax Clean-Ups in an SPS

The following high level syntax (HLS) clean-ups may be performed in Sequence Parameter Set (SPS) according to embodiments of the present disclosure: (1) Signaling sps_picture_header_in_slice_header_flag; (2) Alignment on subpic_treated_as_pic_flag value across layers; (3) Constraint on Number of subpictures for small picture; (4) Correction on the value range of sps_subpic_id_len_minus1.

1. Signaling Picture_Header_in_Slice_Header Flag

When the picture header is contained in a slice header, it is assumed that the subpicture information is not used and only one slice is present per picture in the CLVS referring to the sequence parameter set (SPS). This assumption was hypothetically agreed, but not clearly described. To make HTTP live streaming clean-ups, a new flag sps_picture_header_in_slice_header_flag may be defined and used in the SPS. sps_picture_header_in_slice_header_flag equal to 1 specifies that the picture header (PH) syntax structure is present in the slice header and only one slice is present per picture in the CLVS. In addition, no subpicture information is present when sps_picture_header_in_slice_header_flag equal to 1.

The following are example semantic and syntax definitions for the new flag sps_picture_header_in_slice_header_flag:

seq_parameter set rbsp( )) {Descriptor
...
sps_picture_header_in_slice_header_flag u(1)
if(!sps_picture_header_in_slice_header_flag)
  subpic_info_present_flag u(1)
if(subpic_info_present_flag) {
  ...
}
...
} sps_picture_header_in_slice_header_flag equal to 1 specifies that the PH syntax structure is present in the slice header and only one slice is present per picture in the CLVS. sps_picture_header_in_slice_header_flag equal to 0 specifies that the PH syntax structure is not present in the slice header in the CLVS.

subpic_info_present_flag equal to 1 specifies that subpicture information is present for the CLVS and there may be one or more than one subpicture in each picture of the CLVS. subpic_info_present_flag equal to 0 specifies that subpicture information is not present for the CLVS and there is only one subpicture in each picture of the CLVS. When not present, the value of subpic_info_present_flag is inferred to be equal to 0.

When res_change_in_clvs_allowed_flag is equal to 1, the value of subpic_info_present_flag shall be equal to 0.

In one embodiment, picture_header_in_slice_header flag is signaled in picture header.

picture_header_in_slice_header_flag equal to 1 specifies that the PH syntax structure is present in the slice header. picture_header_in_slice_header flag equal to 0 specifies that the PH syntax structure is not present in the slice header.

The value of picture_header_in_slice_header flag shall be equal to sps_picture_header_in_slice_header_flag.

When picture_header_in_slice_header flag is equal to 1 for a coded slice, it is a requirement of bitstream conformance that no VCL NAL unit with nal_unit_type equal to PH_NUT shall be present in the CLVS.

When picture_header_in_slice_header flag is equal to 0, all coded slices in the current picture shall have picture_header_in_slice_header flag is equal to 0, and the current PU shall have a PH NAL unit.

Furthermore, the constraint flag pic_header_in_slice_header_constraint_flag may be added in general constraint info( ). When pic_header_in_slice_header_constraint_flag is equal to 1, the value of picture_header_in_slice_header flag in PH shall be equal to 1.

| | Descriptor |
|---|---|
| general_constraint_info( ) { | |
| ... | |
| one_tile_per_pic_constraint_flag | u(1) |
| one_slice_per_pic_constraint_flag | u(1) |
| one_subpic_per_pic_constraint_flag | u(1) |
| pic_header_in_slice_header_constraint_flag | u(1) |
| ... | |
| } | | pic_header_in_slice_header_constraint_flag equal to 1 specifies that PH syntax structure is present in slice header. pic_header_in_slice_header_constraint_flag equal to 0 does not impose such a constraint. When pic_header_in_slice_header_constraint_flag shall be equal to 1, the value of picture_header_in_slice_header flag shall be equal to 1.

When pic_header_in_slice_header_constraint_flag is equal to 1, rpl_info_in_ph_flag, dbf_info_in_ph_flag, sao_info_in_ph_flag, wp_info_in_ph_flag, qp_delta_info_in_ph_flag shall be equal to 0.

When pic_header_in_slice_header_constraint_flag is equal to 1, rect_slice_flag shall be equal to 1.

When pic_header_in_slice_header_constraint_flag is equal to 1, subpic_info_present_flag shall be equal to 0.

When pic_header_in_slice_header_constraint_flag is equal to 1, separate_colour_plane_flag shall be equal to 0.

The following is an example syntax definition for the new constraint flag:

| | Descriptor |
|---|---|
| general_constraint_info( ) { | |
| general_progressive_source_flag | u(1) |
| general_interlaced_source_flag | u(1) |
| general_non_packed_constraint_flag | u(1) |
| general_frame_only_constraint_flag | u(1) |
| general_non_projected_constraint_flag | u(1) |
| intra_only_constraint_flag | u(1) |
| max_bitdepth_constraint_idc | u(4) |
| max_chroma_format_constraint_idc | u(2) |
| no_res_change_in_clvs_constraint_flag | u(1) |
| one_tile_per_pic_constraint_flag | u(1) |
| one_slice_per_pic_constraint_flag | u(1) |
| one_subpic_per_pic_constraint_flag | u(1) |
| pic_header_in_slice_header_constraint_flag | u(1) |
| no_qtbtt_dual_tree_intra_constraint_flag | u(1) |
| no_partition_constraints_override_constraint_flag | u(1) |
| no_sao_constraint_flag | u(1) |
| no_alf_constraint_flag | u(1) |
| no_ccalf_constraint_flag | u(1) |
| no_joint_cbcr_constraint_flag | u(1) |
| no_ref_wraparound_constraint_flag | u(1) |
| no_temporal_mvp_constraint_flag | u(1) |

-continued

| | Descriptor |
|---|---|
| no_sbtmvp_constraint_flag | u(1) |
| no_amvr_constraint_flag | u(1) |
| no_bdof_constraint_flag | u(1) |
| no_dmvr_constraint_flag | u(1) |
| no_cclm_constraint_flag | u(1) |
| no_mts_constraint_flag | u(1) |
| no_sbt_constraint_flag | u(1) |
| no_affine_motion_constraint_flag | u(1) |
| no_bcw_constraint_flag | u(1) |
| no_ibc_constraint_flag | u(1) |
| no_ciip_constraint_flag | u(1) |
| no_fpel_mmvd_constraint_flag | u(1) |
| no_gpm_constraint_flag | u(1) |
| no_ladf_constraint_flag | u(1) |
| no_transform_skip_constraint_flag | u(1) |
| no_bdpcm_constraint_flag | u(1) |
| no_qp_delta_constraint_flag | u(1) |
| no_dep_quant_constraint_flag | u(1) |
| no_sign_data_hiding_constraint_flag | u(1) |
| no_mixed_nalu_types_in_pic_constraint_flag | u(1) |
| no_trail_constraint_flag | u(1) |
| no_stsa_constraint_flag | u(1) |
| no_rasl_constraint_flag | u(1) |
| no_radl_constraint_flag | u(1) |
| no_idr_constraint_flag | u(1) |
| no_cra_constraint_flag | u(1) |
| no_gdr_constraint_flag | u(1) |
| no_aps_constraint_flag | u(1) |
| while( !byte_aligned( ) ) | |
|   gci_alignment_zero_bit | f(1) |
| num_reserved_constraint_bytes | u(8) |
| for( i = 0; i < num_reserved_constraint_bytes; i++ ) | |
|   gci_reserved_constraint_byte[ i ] | u(8) |
| } | |

The following is an example semantics definition for the new constraint flag:

separate_colour_plane_flag equal to 1 specifies that the three colour components of the 4:4:4 chroma format are coded separately. separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value.

NOTE—There is no dependency in decoding processes between the colour planes having different colour_plane_id values. For example, the decoding process of a monochrome picture with one value of colour_plane_id does not use any data from monochrome pictures having different values of colour_plane_id for inter prediction.

Depending on the value of separate_colour_plane_flag, the value of the variable ChromaArrayType is assigned as follows:

If separate_colour_plane_flag is equal to 0, ChromaArrayType is set equal to chroma_format_idc.
Otherwise (separate_colour_plane_flag is equal to 1), ChromaArrayType is set equal to 0.

When pic_header_in_slice_header_constraint_flag is equal to 1, separate_colour_plane_flag shall be equal to 0.

subpic_info_present_flag equal to 1 specifies that subpicture information is present for the CLVS and there may be one or more than one subpicture in each picture of the CLVS. subpic_info_present_flag equal to 0 specifies that subpicture information is not present for the CLVS and there is only one subpicture in each picture of the CLVS.

When res_change_in_clvs_allowed_flag is equal to 1, the value of subpic_info_present_flag shall be equal to 0.

NOTE—When a bitstream is the result of a sub-bitstream extraction process and contains only a subset of the subpictures of the input bitstream to the sub-bitstream extraction process, it might be required to set the value of subpic_info_present_flag equal to 1 in the RBSP of the SPSs.

When pic_header_in_slice_header_constraint_flag is equal to 1, subpic_info_present_flag shall be equal to 0.

rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpic_info_present_flag is equal to 1, the value of rect_slice_flag shall be equal to 1.

When pic_header_in_slice_header_constraint_flag is equal to 1, rect_slice_flag shall be equal to 1.

qp_delta_info_in_ph_flag equal to 1 specifies that QP delta information is present in the PH syntax structure and not present in slice headers referring to the PPS that do not contain a PH syntax structure. qp_delta_info_in_ph_flag equal to 0 specifies that QP delta information is not present in the PH syntax structure and may be present in slice headers referring to the PPS that do not contain a PH syntax structure.

When pic_header_in_slice_header_constraint_flag is equal to 1, rpl_info_in_ph_flag, dbf_info_in_ph_flag, sao_info_in_ph_flag, wp_info_in_ph_flag, qp_delta_info_in_ph_flag shall be equal to 0.

one_subpic_per_pic_constraint_flag equal to 1 specifies that each picture shall contain only one subpicture. one_subpic_per_pic constraint flag equal to 0 does not impose such a constraint. When one slice_per_pic_constraint_flag is equal to 1, the value of one subpic_per_pic constraint flag shall be equal to 1.

pic_header_in_slice_header_constraint_flag equal to 1 specifies that PH syntax structure is present in slice header. pic_header_in_slice_header_constraint_flag equal to 0 does not impose such a constraint. When pic_header_in_slice_header_constraint_flag shall be equal to 1, the value of picture_header_in_slice_header flag shall be equal to 1.

2. Alignment on Subpic_Treated_as_Pic_Flag Value Across Layers

For subpicture extraction from a multilayer bitstream, when subpic_treated_as_pic flag[i] is equal to 1, for each output layer and its reference layers in an OLS, all pictures in the output layer and its reference layers shall have the value of subpic_treated_as_pic_flag[j] equal to 1 for each value of j in the range of 0 to sps_num_subpics_minus1. Therefore, according to embodiments of the present disclosure, the following constraint is added.

subpic_treated_as_pic_flag[i] equal to 1 specifies that the i-th subpicture of each coded picture in the CLVS is treated as a picture in the decoding process excluding in-loop filtering operations. subpic_treated_as_pic_flag[i] equal to 0 specifies that the i-th subpicture of each coded picture in the CLVS is not treated as a picture in the decoding process excluding in-loop filtering operations. When not present, the value of subpic_treated_as_pic_flag[i] is inferred to be equal to sps_independent_subpics_flag.

When subpic_treated_as_pic_flag[i] is equal to 1, it is a requirement of bitstream conformance that all of the following conditions are true for each output layer and its reference layers in an OLS that includes the layer containing the i-th subpicture as an output layer:

All pictures in the output layer and its reference layers shall have the same value of pic_width_in_luma_samples and the same value of pic_height_in_luma_samples.

All the SPSs referred to by the output layer and its reference layers shall have the same value of sps_num_subpics_minus1 and shall have the same values of subpic_ctu_top_left_x[j], subpic_ctu_top_left_y[j], subpic width minus1[j], subpic_height_minus1 [j], and loop_filter_across_subpic_enabled_flag[j], respectively, for each value of j in the range of 0 to sps_num_subpics_minus1, inclusive.

All pictures in each access unit in the output layer and its reference layers shall have the same value of SubpicIdVal[j] for each value of j in the range of 0 to sps_num_subpics_minus1, inclusive.

All pictures in the output layer and its reference layers shall have the value of subpic_treated_as_pic_flag[j] equal to 1 for each value of j in the range of 0 to sps_num_subpics_minus1, inclusive.

3. Constraint on the Number of Subpictures for Small Picture

In one embodiment, an additional constraint can be imposed such that the number of subpictures shall be equal to 1, when the picture size is not greater than CtbSizeY.

The following are example syntax and/or semantic definitions for the additional constraint:

When pic_width_max_in_luma_samples is not greater than CtbSizeY and pic_height_max_in_luma_samples is not greater than CtbSizeY, the value of sps_num_subpics_minus1 shall be equal to 0.

4. Correction on the Value Range of Sps_Subpic_Id_Len_Minus1

In one embodiment, the semantics of sps_subpic_id_len_minus1 can be modified as follows so that the syntax element can have more accurate value range.

sps_subpic_id_len_minus1 plus 1 specifies the number of bits used to represent the syntax element sps_subpic_id[i], the syntax elements pps_subpic_id[i], when present, and the syntax element slice_subpic_id, when present. The value of sps_subpic_id_len_minus1 shall be in the range of 0 to 15, inclusive. The value of 1<<(sps_subpic_id_len_minus1) shall be greater than or equal to sps_num_subpics_minus1+1.

The above-mentioned embodiments may be used separately or combined in any order. Further, each embodiment, encoder, and/or decoder may be implemented by processing circuitry (e.g., one or more processors or one or more integrated circuits). In one example, the one or more processors execute a program that is stored in a non-transitory computer-readable medium.

Figure 19:
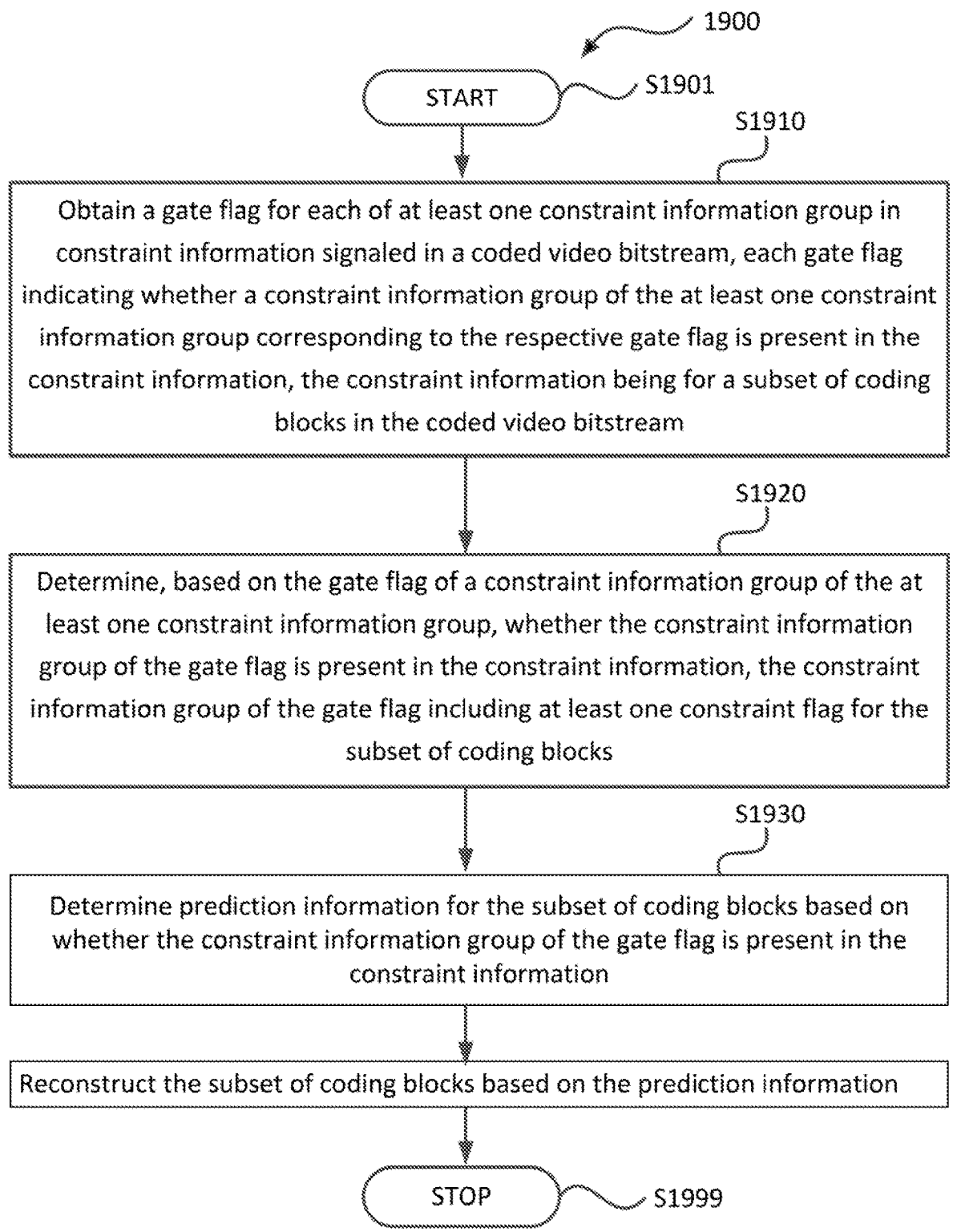
FIG. 19 shows a flow chart outlining a process according to an embodiment of the disclosure.

FIG. 19 shows a flow chart outlining a process (1900) according to an embodiment of the disclosure. The process (1900) can be used in the reconstruction of a block, so to generate a prediction block for the block under reconstruction. The term block in the disclosure may be interpreted as a prediction block, a CB, a CU, or the like. In various embodiments, the process (1900) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1900) is implemented in software instructions, thus when the processing circuitry executes the software instructions, the processing circuitry performs the process (1900). The process starts at (S1901) and proceeds to (S1910).

At (S1910), a gate flag for each of at least one constraint information group in constraint information signaled in a coded video bitstream can be obtained. Each gate flag can indicate whether a constraint information group of the at least one constraint information group corresponding to the respective gate flag is present in the constraint information. The constraint information can be for a subset of coding blocks in the coded video bitstream.

The constraint information can be present in a high level syntax (e.g., an SPS, a VPS, DCI, a DPS) for at least one picture, and the subset of coding blocks can include coding blocks in the at least one picture.

In an example, each gate flag indicates that the constraint information group corresponding to the respective gate flag is not present in the constraint information, and no constraint flags are present in the constraint information.

At (S1920), whether the constraint information group of the gate flag is present in the constraint information can be determined based on the gate flag of a constraint information group of the at least one constraint information group. The constraint information group of the gate flag can include at least one constraint flag for the subset of coding blocks.

At (S1930), prediction information for the subset of coding blocks can be determined based on whether the constraint information group of the gate flag is present in the constraint information.

In an example, the constraint information group of the gate flag is determined to be present in the constraint information. The prediction information for the subset of coding blocks can be determined based on the at least one constraint flag in the constraint information group of the gate flag.

In an example, the constraint information group of the gate flag is determined not to be present in the constraint information. The prediction information for the subset of coding blocks can be determined independent from the constraint information group of the gate flag.

At (S1940), the subset of coding blocks can be reconstructed based on the prediction information.

The process (1900) can be suitably adapted. Step(s) in the process (1900) can be modified and/or omitted. Additional step(s) can be added. Any suitable order of implementation can be used. For example, one or more of the at least one constraint information group are present in the coded video bitstream. A plurality of constraint flags in the one or more of the at least one constraint information group can be signaled according to a predetermined order. The plurality of constraint flags can be run-decoded, and thus the prediction information for the subset of coding blocks can be determined based on the plurality of constraint flags.

In an example, the at least one constraint flag in the constraint information group of the gate flag includes a plurality of constraint flags signaled according to a predetermined order, and the plurality of constraint flags in the constraint information group of the gate flag can be run-decoded.

In an example, an offset and a length are present in the constraint information indicating that the at least one constraint flag in the constraint information group of the gate flag is present in the constraint information.

In an example, one or more of the at least one constraint information group are present in the coded video bitstream. An offset and a length are present in the constraint information indicating that at least one constraint flag in each of the one or more of the at least one constraint information group is present in the constraint information. A number of the offsets can be signaled in the coded video bitstream.

In an example, one or more of the at least one constraint information group are present in the coded video bitstream. One or more syntax elements in the constraint information can be byte aligned. The one or more syntax elements can include the gate flag for each of the at least constraint information group and a plurality of constraint flags in the one or more of the at least one constraint information group.

In an example, the at least one gate flag includes a frame-only constraint flag (e.g., the general_frame_only_constraint_flag) indicating whether pictures in an output layer set is coded with field coding. The output layer set can include the subset of coding blocks. A field sequence flag (e.g., the sps_field_seq_flag) is false based on the frame-only constraint flag indicating that a subset of the pictures is not coded with field coding where the subset of the pictures is in one layer of the output layer set.

In an example, the field sequence flag is signaled in the coded video bitstream and the field sequence flag indicates whether pictures in an output layer are coded with field coding.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

Aspects of the disclosure relates to signaling field coding information in a coded video stream, for example, with multiple layers.

When pictures are encoded into a bitstream that includes multiple layers with different qualities, the bitstream may have syntax elements that specify which layers may be output at a decoder side. In certain video codec supporting multiple layers and scalabilities, one or more output layer sets can be signaled in a VPS. The syntax elements specifying output layer sets and their dependency, profile/tier/level and hypothetical decoder reference model parameters are to be efficiently signaled in a parameter set. When multilayered video sequences are coded as a field structure where two or more field pictures include one frame picture, the field coding information may be signaled in a high level syntax structure, such as SPS, a VPS, or an SEI message.

In some video coding technologies, an access unit (AU) can refer to coded picture(s), slice(s), tile(s), NAL Unit(s), and so forth, that are captured and composed into a the respective picture/slice/tile/NAL unit bitstream at a given instance in time. The given instance in time can be a composition time.

In some examples, such as in HEVC and certain other video coding technologies, a picture order count (POC) value can be used for indicating a selected reference picture among multiple reference picture stored in a decoded picture buffer (DPB). When an AU includes one or more pictures, slices, or tiles, each picture, slice, or tile belonging to a same AU may have a same POC value, from which it can be derived that the one or more pictures, slices, or tiles are created from content of the same composition time. Thus, two pictures/slices/tiles having the same given POC value can indicate that the two pictures/slices/tiles belong to the same AU and having the same composition time. Conversely, the two pictures/tiles/slices having different POC values, can indicate the two pictures/slices/tiles belonging to different AUs and having different composition times.

In an embodiment, aforementioned rigid relationship can be relaxed where an AU can comprise pictures, slices, or tiles with different POC values. By allowing different POC values within an AU, POC values can be used to identify potentially independently decodable pictures/slices/tiles with an identical presentation time. Thus, multiple scalable layers can be supported without a change of reference picture selection signaling (e.g. reference picture set signaling or reference picture list signaling), as described in more detail below.

In some examples, it is desirable to identify an AU that a picture/slice/tile belongs to, with respect to other picture/slices/tiles having different POC values, from the POC value alone. This can be achieved as described below.

In an embodiment, an access unit count (AUC) may be signaled in a high-level syntax structure, such as a NAL unit header, a slice header, a tile group header, an SEI message, a parameter set or an AU delimiter. A value of the AUC (or an AUC value) may be used to identify which NAL units, pictures, slices, or tiles belong to a given AU. The value of the AUC may correspond to a distinct composition time instance. The AUC value may be equal to a multiple of the POC value. By dividing the POC value by an integer value, the AUC value may be calculated. In some examples, division operations can place a certain burden on decoder implementations. Thus, small restrictions in the numbering space of the AUC values may allow for substitution of the division operations by shift operations. For example, the AUC value may be equal to a Most Significant Bit (MSB) value of the POC value range.

In an embodiment, a value of POC cycle per AU (e.g., a poc_cycle_au) may be signaled in a high-level syntax structure, such as a NAL unit header, a slice header, a tile group header, an SEI message, a parameter set, or an AU delimiter. The value of POC cycle per AU (e.g., the poc_cycle_au) may indicate how many different and consecutive POC values can be associated with a same AU. For example, if the value of POC cycle per AU (e.g., the poc_cycle_au) is equal to 4, the pictures, slices or tiles with the POC value equal to 0 to 3, inclusive, are associated with the AU with the AUC value equal to 0, and the pictures, slices or tiles with POC value equal to 4 to 7, inclusive, are associated with the AU with the AUC value equal to 1. Hence, the value of the AUC may be inferred by dividing the POC value by the value of the value of POC cycle per AU (e.g., the poc_cycle_au).

In an embodiment, the value of POC cycle per AU (e.g., the poc_cyle_au) may be derived from information located, for example, in a VPS, that identifies a number of spatial or SNR layers in a coded video sequence. While the derivation as described above may save a few bits in the VPS and hence may improves coding efficiency, it can be advantageous to explicitly code the value of POC cycle per AU (e.g., the poc_cycle_au) in an appropriate high-level syntax structure hierarchically below the VPS to minimize the value of POC cycle per AU (e.g., the poc_cycle_au) for a given small part of a bitstream (e.g., a picture). The optimization may save more bits than can be saved through the derivation process above because POC values (and/or values of syntax elements indirectly referring to POC) may be coded in low level syntax structures.

In an embodiment, FIG. 20 shows an example of syntax tables to signal a syntax element of vps_poc_cycle_au in a VPS (or an SPS), which indicates the poc_cycle_au used for all picture/slices in a coded video sequence, and a syntax element of slice_poc_cycle_au, which indicates the poc_cycle_au of a current slice, in a slice header.

If the POC value increases uniformly per AU, a syntax element vps_contant_poc_cycle_per_au in the VPS is set equal to 1 and the syntax element vps_poc_cycle_au is signaled in the VPS. Thus, a syntax element slice_poc_cycle_au is not explicitly signaled, and the value of AUC for each AU can be calculated by dividing the value of POC by the syntax element vps_poc_cycle_au.

If the POC value does not increase uniformly per AU, the syntax element vps_contant_poc_cycle_per_au in VPS is set equal to 0. Thus, a syntax element vps_access_unit_cnt is not signaled, while a syntax element slice_access_unit_cnt is signaled in the slice header for each slice or picture. Each slice or picture may have a different value of slice_access_unit_cnt. The value of AUC for each AU can be calculated by dividing the value of POC by the syntax element slice_poc_cycle_au.

Figure 21:
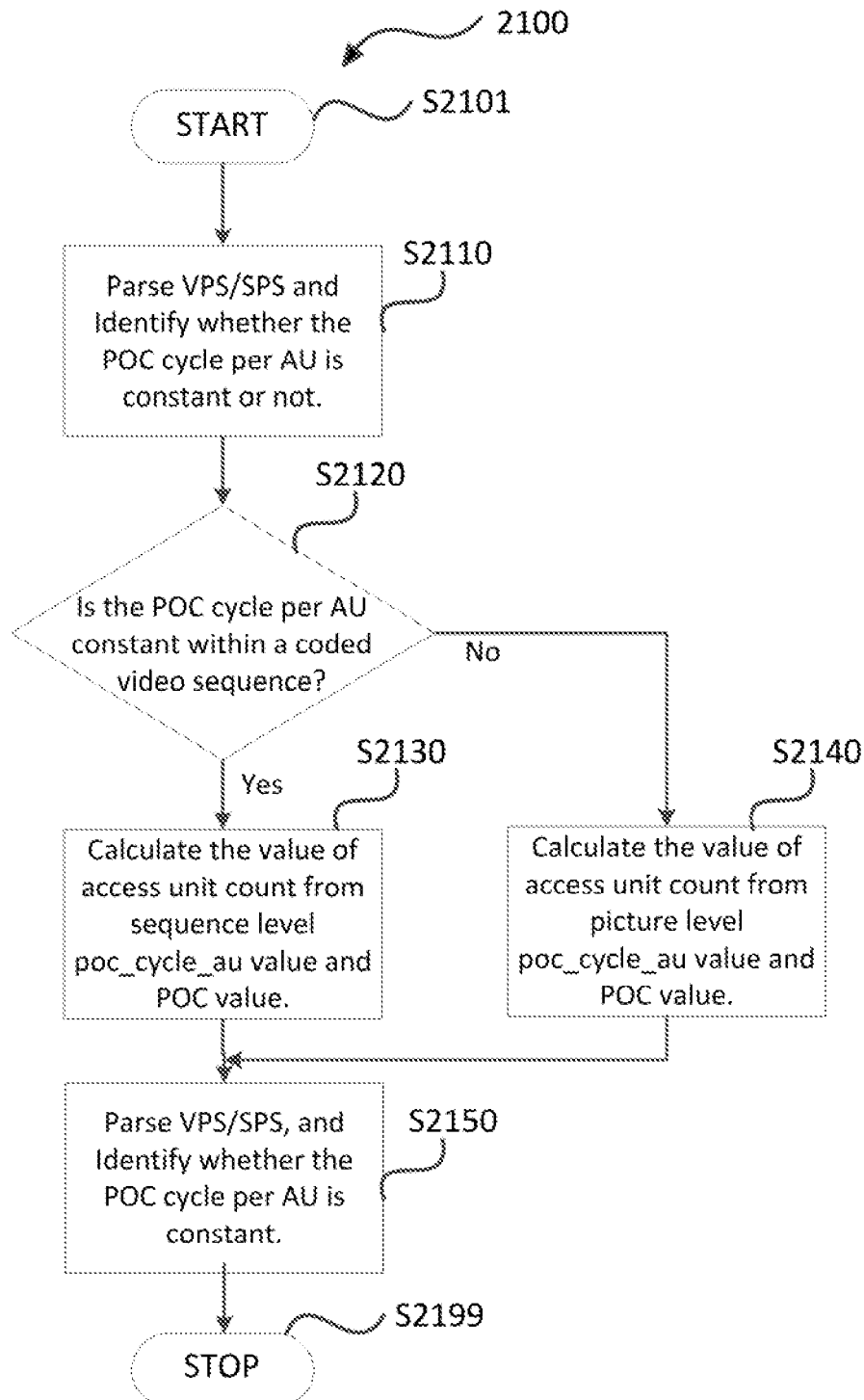
FIG. 21 shows a flow chart of parsing and decoding picture order count (POC) cycle per access unit and access unit count value according to an embodiment of the disclosure.

FIG. 21 shows a block diagram illustrating a relevant workflow described above. The workflow starts at (S2101) and proceeds to (S2110).

At (S2110), a VPS or an SPS can be parsed and whether the POC cycle per AU is constant or not can be identified.

At (S2120), whether the POC cycle per AU is constant within a coded video sequence can be determined. If the POC cycle per AU is determined to be constant within the coded video sequence, the workflow proceeds to (S2130). Otherwise, the workflow proceeds to (S2140).

At (S2130), the value of access unit count can be calculated from a sequence level poc_cycle_au value and a POC value. The workflow then proceeds to (S2150).

At (S2140), the value of access unit count can be calculated from a picture level poc_cycle_au value and a POC value. The workflow then proceeds to (S2150).

At (S2150), the VPS or the SPS can be parsed and whether the POC cycle per AU is constant can be identified.

In an embodiment, even though the value of POC of a picture, slice, or tile may be different, the picture, the slice, or the tile corresponding to an AU with a same AUC value may be associated with a same decoding or output time instance. Hence, without any inter-parsing/decoding dependency across pictures, slices or tiles in the same AU, all or subset of pictures, slices or tiles associated with the same AU may be decoded in parallel, and may be output at the same time instance In an embodiment, even though the value of POC of a picture, slice, or tile may be different, the picture, slice, or tile corresponding to an AU with the same AUC value may be associated with the same composition/display time instance. When the composition time is contained in a container format, even though pictures correspond to different AUs, if the pictures have the same composition time, the pictures can be displayed at the same timeinstance.

In an embodiment, each picture, slice, or tile may have a same temporal identifier (e.g., a temporal_id) in the same AU. All or a subset of pictures, slices or tiles corresponding to a time instance may be associated with the same temporal sub-layer. In an embodiment, each picture, slice, or tile may have a same or different spatial layer identification(s) (e.g., a layer_id) in the same AU. All or a subset of pictures, slices or tiles corresponding to a time instance may be associated with the same or a different spatial layer.

Figure 22:
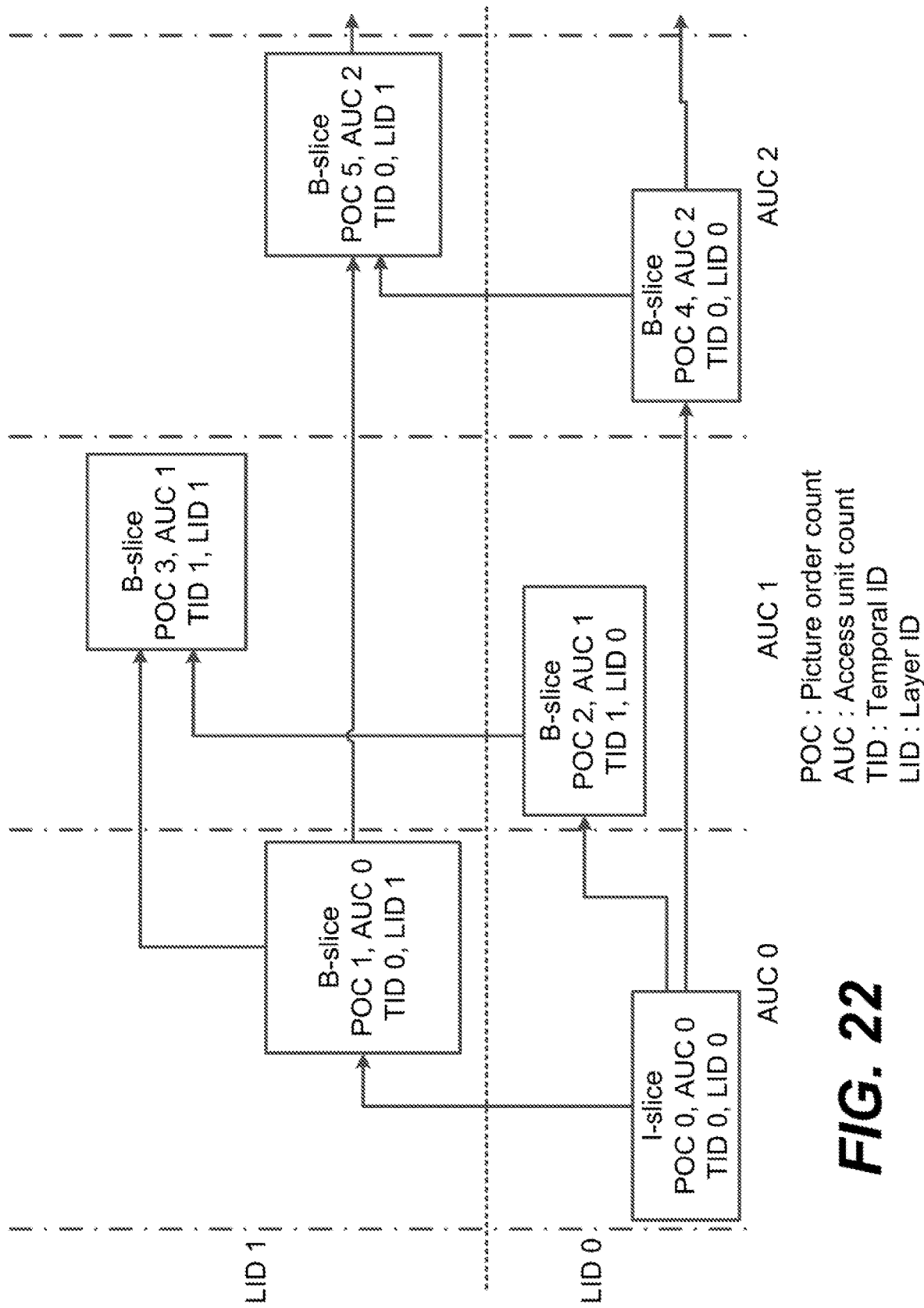
FIG. 22 shows an example of a prediction structure for scalability with adaptive resolution change according to an embodiment of the disclosure.

FIG. 22 shows an example of a video sequence structure with combination of temporal_id, layer_id, POC and AUC values with adaptive resolution change. In an example shown in FIG. 22, a picture, a slice or a tile in a first AU with AUC=0 may have temporal_id=0 and layer_id=0 or 1, while a picture, a slice or a tile in a second AU with AUC=1 may have temporal_id=1 and layer_id=0 or 1, respectively. The value of POC is increased by 1 per picture regardless of the values of temporal_id and layer_id. Referring to FIG. 22, the value of poc_cycle_au can be equal to 2. In an example, the value of poc_cycle_au may be preferably set equal to a number of (spatial scalability) layers. In this example, the value of POC is increased by 2, while the value of AUC is increased by 1.

In the above embodiments, all or a sub-set of inter-picture or inter-layer prediction structure and reference picture indication may be supported by using reference picture set (RPS) signaling in video standards, such as the HEVC or the reference picture list (RPL) signaling. In the RPS or the RPL, a selected reference picture can be indicated by signaling a value of POC or a delta value of POC between a current picture and the selected reference picture. In various examples, the RPS and the RPL can be used to indicate the inter-picture or inter-layer prediction structure without change of signaling and with the following restrictions. If the value of temporal_id of a reference picture is greater than the value of temporal_id of the current picture, the current picture may not use the reference picture for motion compensation or other predictions. If the value of layer_id of a reference picture is greater than the value of layer_id of the current picture, the current picture may not use the reference picture for motion compensation or other predictions.

In an embodiment, motion vector scaling based on a POC difference for temporal motion vector prediction may be disabled across multiple pictures within an AU. Hence, although each picture may have a different POC value within an AU, the motion vector is not scaled and used for temporal motion vector prediction within the AU because a reference picture with a different POC in the same AU is considered a reference picture having a same time instance. Therefore, the motion vector scaling function may return 1 when the reference picture belongs to the AU associated with the current picture.

In an embodiment, the motion vector scaling based on a POC difference for temporal motion vector prediction may be optionally disabled across multiple pictures, when the spatial resolution of the reference picture is different from the spatial resolution of the current picture. When the motion vector scaling is allowed, the motion vector is scaled based on both the POC difference and the spatial resolution ratio between the current picture and the reference picture.

In an embodiment, the motion vector may be scaled based on an AUC difference instead of the POC difference, for temporal motion vector prediction, especially when the poc_cycle_au has a non-uniform value (e.g., when vps_contant_poc_cycle_per_au=0). Otherwise (e.g., when vps_contant_poc_cycle_per_au=1), the motion vector scaling based on the AUC difference may be identical to the motion vector scaling based on the POC difference.

In an embodiment, when the motion vector is scaled based on the AUC difference, the reference motion vector in the same AU (with the same AUC value) with the current picture is not scaled based on the AUC difference and used for motion vector prediction without scaling or with scaling based on spatial resolution ratio between the current picture and the reference picture.

In an embodiment, the AUC value is used for identifying a boundary of an AU and used for a hypothetical reference decoder (HRD) operation, which may need input and output timing with an AU granularity. In various examples, a decoded picture with a highest layer in an AU may be output for display. The AUC value and the layer_id value can be used for identifying the output picture.

In an embodiment, a picture may include one or more sub-pictures. Each sub-picture may cover a local region or the entire region of the picture. A region supported by a sub-picture may or may not be overlapped with a region supported by another sub-picture. The region composed by one or more sub-pictures may or may not cover the entire region of the picture. If a picture includes a sub-picture, the region supported by the sub-picture can be identical to the region supported by the picture.

In an embodiment, a sub-picture may be coded by a coding method similar to the coding method used for the coded picture. A sub-picture may be independently coded or may be coded dependent on another sub-picture or a coded picture. A sub-picture may or may not have any parsing dependency from another sub-picture or a coded picture.

In an embodiment, a coded sub-picture may be contained in one or more layers. A coded sub-picture in a layer may have a different spatial resolution. The original sub-picture may be spatially re-sampled (e.g., up-sampled or down-sampled), coded with different spatial resolution parameters, and contained in a bitstream corresponding to a layer.

In an embodiment, a sub-picture with (W, H) may be coded and contained in the coded bitstream corresponding to a layer 0. W indicates a width of the sub-picture and H indicates a height of the sub-picture, respectively. An up-sampled (or a down-sampled) sub-picture can be up-sampled (or down-sampled) from the sub-picture with the original spatial resolution. The up-sampled (or a down-sampled) sub-picture can have a spatial resolution ($W*S_{w,k}$, $H*S_{h,k}$) and may be coded and contained in the coded bitstream corresponding to a layer k. Parameters $S_{w,k}$ and $S_{h,k}$ can indicate the horizontal and vertical resampling ratios, respectively. If the values of $S_{w,k}$, $S_{h,k}$ are greater than 1, the resampling is the up-sampling. If the values of $S_{w,k}$, $S_{h,k}$ are smaller than 1, the resampling is the down-sampling.

In an embodiment, a coded sub-picture in a layer may have a different visual quality from that of the coded sub-picture in another layer in the same sub-picture or a different subpicture. For example, a sub-picture i in a layer n is coded with a quantization parameter (e.g., $Q_{i,n}$) while a sub-picture j in a layer m is coded with a quantization parameter (e.g., $Q_{j,m}$).

In an embodiment, a coded sub-picture in a layer may be independently decodable, without any parsing or decoding dependency from a coded sub-picture in another layer of the same local region. The sub-picture layer which can be independently decodable without referencing another sub-picture layer of the same local region is the independent sub-picture layer. A coded sub-picture in the independent sub-picture layer may or may not have a decoding or parsing dependency from a previously coded sub-picture in the same sub-picture layer. The coded sub-picture may not have any dependency from a coded picture in another sub-picture layer.

In an embodiment, a coded sub-picture in a layer may be dependently decodable, with any parsing or decoding dependency from a coded sub-picture in another layer of the same local region. The sub-picture layer, which can be dependently decodable with referencing another sub-picture layer of the same local region, is the dependent sub-picture layer. A coded sub-picture in the dependent sub-picture may reference a coded sub-picture belonging to the same sub-picture, a previously coded sub-picture in the same sub-picture layer, or both reference sub-pictures.

In an embodiment, a coded sub-picture includes one or more independent sub-picture layers and one or more dependent sub-picture layers. However, at least one independent sub-picture layer may be present for a coded sub-picture. The independent sub-picture layer may have the value of the layer identifier (layer_id), which may be present in a NAL unit header or another high-level syntax structure, equal to 0. The sub-picture layer with the layer_id equal to 0 is the base sub-picture layer.

In an embodiment, a picture may include one or more foreground sub-pictures and one background sub-picture. The region supported by the background sub-picture may be equal to the region of the picture. The region supported by a foreground sub-picture may be overlapped with the region supported by a background sub-picture. The background sub-picture may be a base sub-picture layer, while the foreground sub-picture may be a non-base sub-picture layer (e.g., an enhancement sub-picture layer). One or more non-base sub-picture layers may reference the same base layer for decoding. Each non-base sub-picture layer with a layer_id equal to a may reference a non-base sub-picture layer with layer_id equal to b, where a is greater than b.

In an embodiment, a picture may include one or more foreground sub-pictures with or without a background sub-picture. Each sub-picture may have its own base sub-picture layer and one or more non-base (enhancement) layers. Each base sub-picture layer may be referenced by one or more non-base sub-picture layers. Each non-base sub-picture layer with a layer_id equal to a may reference a non-base sub-picture layer with layer_id equal to b, where a is greater than b.

In an embodiment, a picture may include one or more foreground sub-pictures with or without a background sub-picture. Each coded sub-picture in a (base or non-base) sub-picture layer may be referenced by one or more non-base layer sub-pictures belonging to the same sub-picture and one or more non-base layer sub-pictures, which are not belonging to the same sub-picture.

In an embodiment, a picture may include one or more foreground sub-pictures with or without a background sub-picture. A sub-picture in a layer a may be further partitioned into multiple sub-pictures in the same layer. One or more coded sub-pictures in a layer b may reference the partitioned sub-picture in the layer a.

In an embodiment, a coded video sequence (CVS) may be a group of the coded pictures. The CVS may include one or more coded sub-picture sequences (CSPS), where the CSPS may be a group of coded sub-pictures covering the same local region of the picture. A CSPS may have the same or a different temporal resolution than that of the coded video sequence.

In an embodiment, a CSPS may be coded and contained in one or more layers. A CSPS may include one or more CSPS layers. Decoding one or more CSPS layers corresponding to a CSPS may reconstruct a sequence of sub-pictures corresponding to the same local region.

In an embodiment, a number of CSPS layers corresponding to a CSPS may be identical to or different from a number of CSPS layers corresponding to another CSPS.

In an embodiment, a CSPS layer may have a different temporal resolution (e.g. a frame rate) from that of another CSPS layer. The original (e.g., uncompressed) sub-picture sequence may be temporally re-sampled (e.g., up-sampled or down-sampled), coded with different temporal resolution parameters, and contained in a bitstream corresponding to a layer.

In an embodiment, a sub-picture sequence with a frame rate F may be coded and contained in the coded bitstream corresponding to a layer 0, while the temporally up-sampled (or down-sampled) sub-picture sequence from the original sub-picture sequence, with $F*S_{t,k}$, may be coded and contained in the coded bitstream corresponding to a layer k. $S_{t,k}$ indicates a temporal sampling ratio for the layer k. If the value of $S_{t,k}$ is greater than 1, the temporal resampling process corresponds to a frame rate up conversion. If the value of $S_{t,k}$ is smaller than 1, the temporal resampling process corresponds to the frame rate down conversion.

In an embodiment, when a sub-picture with a CSPS layer a is reference by a sub-picture with a CSPS layer b for motion compensation or any inter-layer prediction, if the spatial resolution of the CSPS layer a is different from the spatial resolution of the CSPS layer b, decoded pixels in the CSPS layer a are resampled and used for reference. The resampling process may need an up-sampling filtering or a down-sampling filtering.

Figure 23:
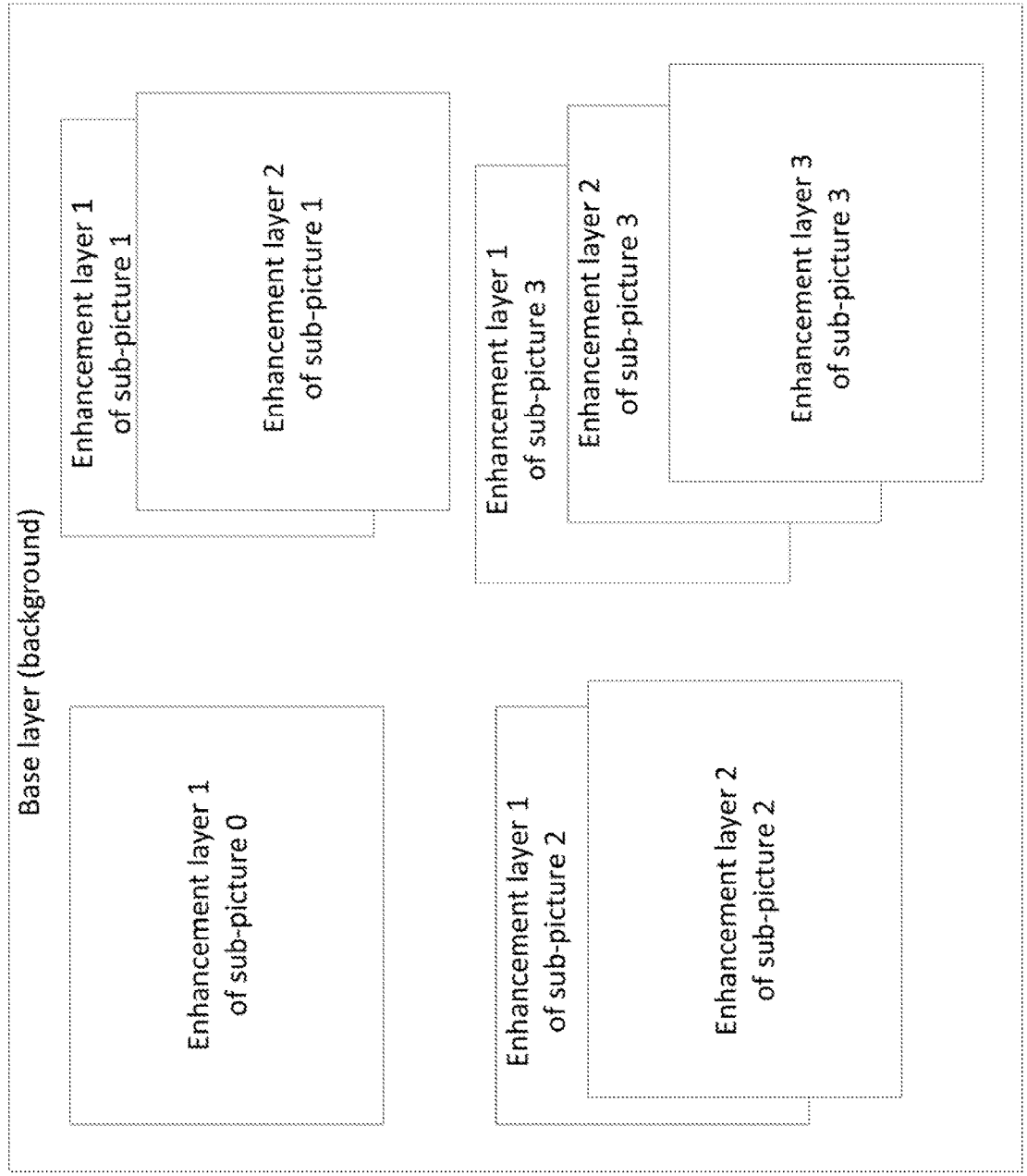
FIG. 23 shows an example of a video bitstream structure comprising multi-layered sub-pictures according to an embodiment of the disclosure.

FIG. 23 shows an example of a video stream including a background video CSPS with a layer_id equal to 0 and multiple foreground CSPS layers. While a coded sub-picture may include one or more CSPS layers, a background region, which does not belong to any foreground CSPS layer, may include a base layer. The base layer may contain a background region and foreground regions. An enhancement CSPS layer can contain a foreground region. An enhancement CSPS layer may have a better visual quality than the base layer at the same region. The enhancement CSPS layer may reference the reconstructed pixels and the motion vectors of the base layer, corresponding to the same region.

In an embodiment, the video bitstream corresponding to a base layer is contained in a track, while the CSPS layers corresponding to each sub-picture are contained in a separated track, in a video file.

In an embodiment, the video bitstream corresponding to a base layer is contained in a track, while CSPS layers with the same layer_id are contained in a separated track. In an example, a track corresponding to a layer k includes only CSPS layers corresponding to the layer k.

In an embodiment, each CSPS layer of each sub-picture is stored in a separate track. Each trach may or may not have any parsing or decoding dependency from one or more other tracks.

In an embodiment, each track may contain bitstreams corresponding to a layer i to a layer j of CSPS layers of all or a subset of sub-pictures, where 0<i≤j≤k, and k is the highest layer of the CSPS.

In an embodiment, a picture includes one or more associated media data including a depth map, an alpha map, 3D geometry data, an occupancy map, and the like. Such associated and timed media data can be divided to one or multiple data sub-stream each of which corresponds to one sub-picture.

Figure 24:
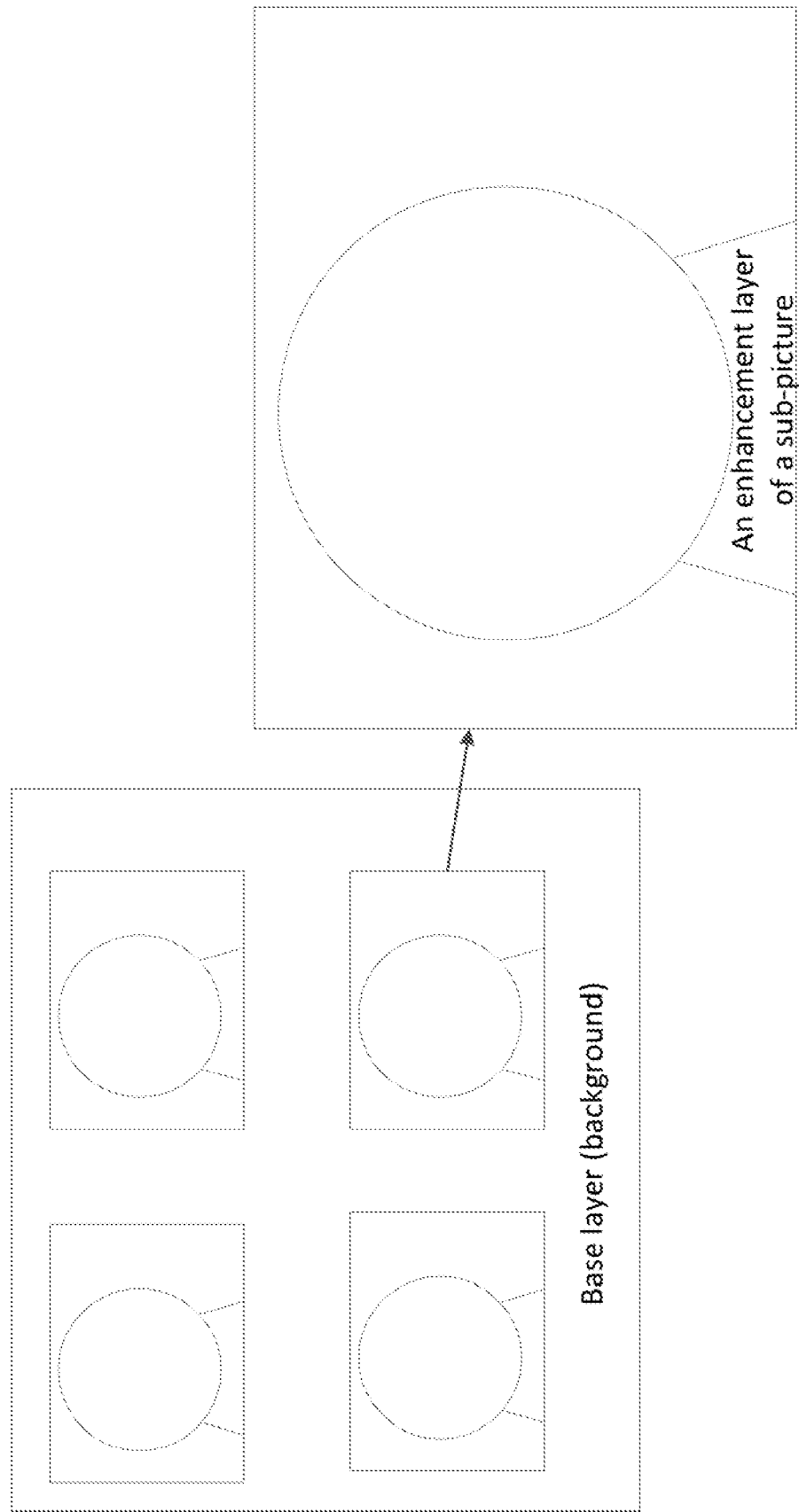
FIG. 24 shows a schematic illustration of a display of a selected sub-picture with an enhanced resolution according to an embodiment of the disclosure.

In an embodiment, FIG. 24 shows an example of a video conference based on the multi-layered sub-picture method. In a video stream, one base layer video bitstream corresponding to the background picture and one or more enhancement layer video bitstreams corresponding to foreground sub-pictures are contained. Each enhancement layer vide bitstream corresponds to a CSPS layer. In a display, the picture corresponding to the base layer is displayed by default. t contains one or more user's picture in a picture (PIP). When a specific user is selected by a client's control, the enhancement CSPS layer corresponding to the selected user is decoded and displayed with an enhanced quality or spatial resolution.

Figure 25:
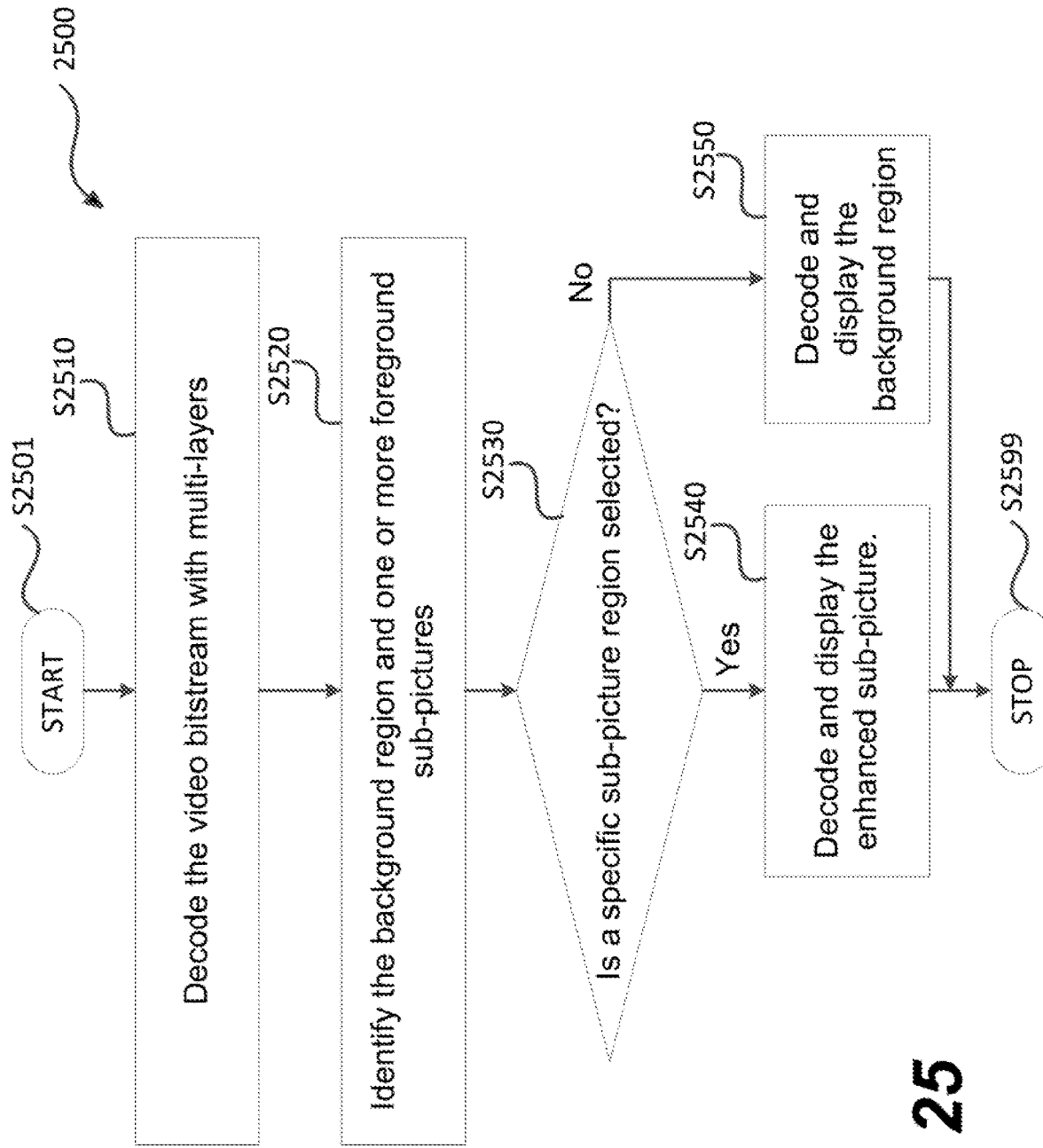
FIG. 25 shows a block diagram of a decoding and a display process for a video bitstream comprising multi-layered sub-pictures according to an embodiment of the disclosure.

FIG. 25 shows a diagram for the operation described above. The operation starts at (S2501) and proceeds to (S2510).

At (S2510), the video bitstream with multi-layers can be decoded.

At (S2520), the background region and one or more foreground sub-pictures can be identified.

At (S2530), whether a specific sub-picture region is selected can be determined. If the specific sub-picture region is determined to be selected, the operation proceeds to (S2540). Otherwise, the operation proceeds to (S2550).

At (S2540), the enhanced sub-picture can be decoded and displayed. The operation then proceeds to (S2599), and terminates.

At (S2550), the background region can be decoded and displayed. The operation then proceeds to (S2599), and terminates.

In an embodiment, a network middle box (such as a router) may select a subset of layers to send to a user depending on its bandwidth. The picture/subpicture organization may be used for a bandwidth adaptation. For example, if the user does not have the bandwidth, the router strips layers or selects some subpictures due to their importance or based on a used setup and the operation can be done dynamically to adopt to bandwidth.

Figure 26:
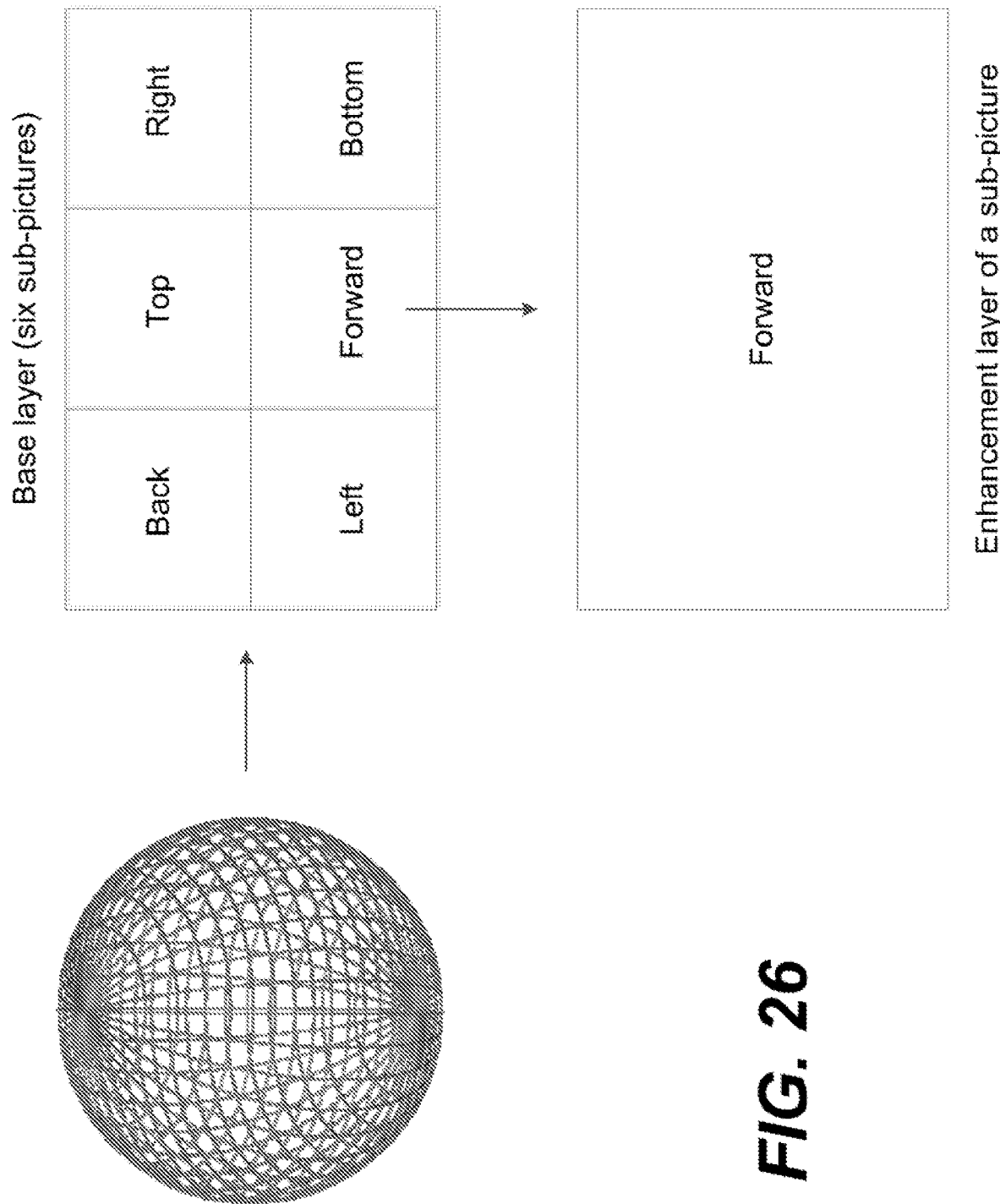
FIG. 26 shows a schematic illustration of a 360 video display with an enhancement layer of a sub-picture according to an embodiment of the disclosure.

FIG. 26 shows a use case of 360 video. When a spherical 360 picture is projected onto a planar picture, the projection 360 picture may be partitioned into multiple sub-pictures as a base layer. An enhancement layer of a specific sub-picture may be coded and transmitted to a client. A decoder may be able to decode both the base layer including all sub-pictures and an enhancement layer of a selected sub-picture. When the current viewport is identical to the selected sub-picture, the displayed picture may have a higher quality with the decoded sub-picture with the enhancement layer. Otherwise, the decoded picture with the base layer can be displayed with a low quality.

In an embodiment, any suitable layout information for display may be present in a file, as supplementary information (such as an SEI message or metadata). One or more decoded sub-pictures may be relocated and displayed depending on the signaled layout information. The layout information may be signaled by a streaming server or a broadcaster, or may be regenerated by a network entity or a cloud server, or may be determined by a user's customized setting.

Figure 27:
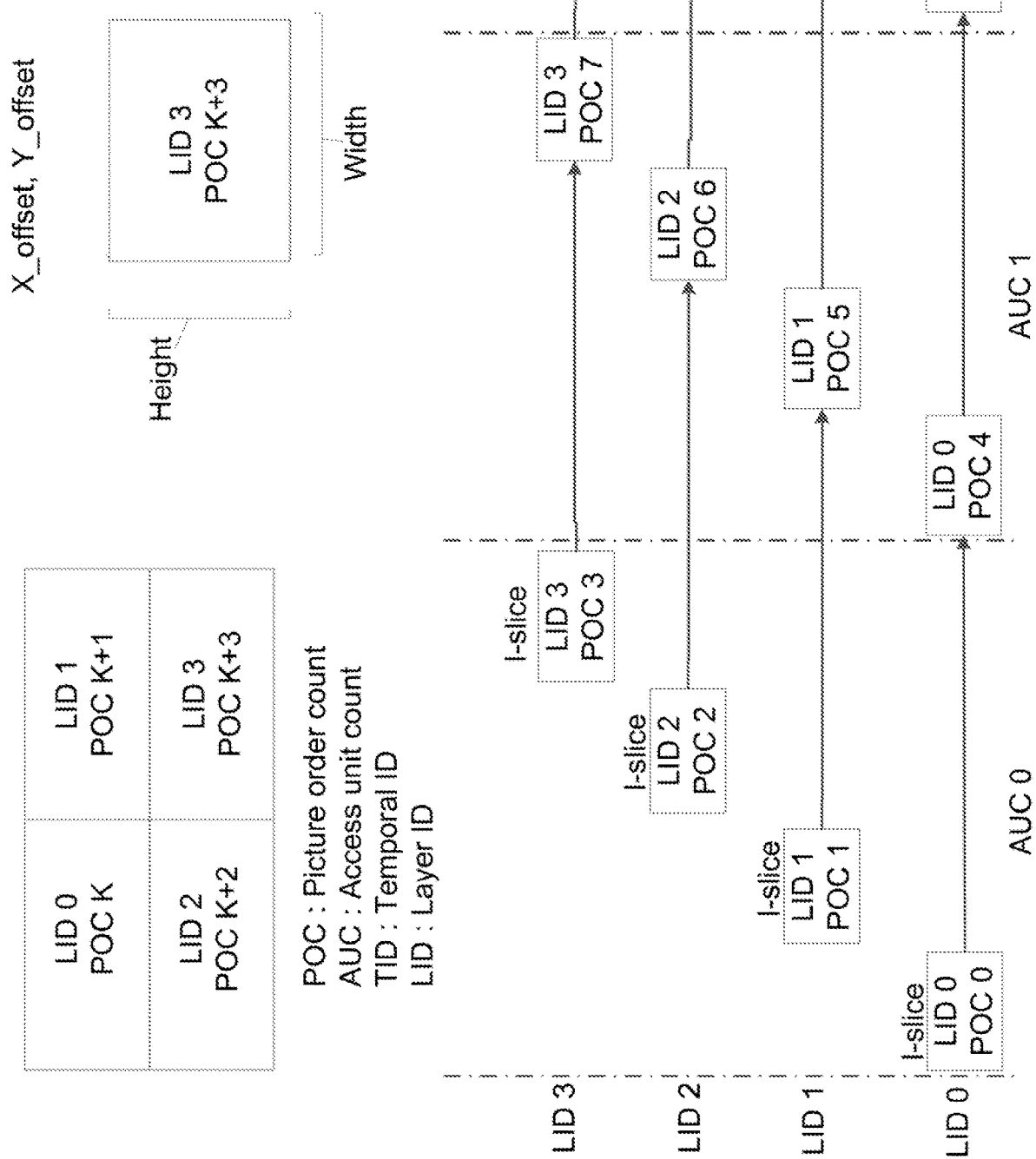
FIG. 27 shows an example of layout information of sub-pictures and corresponding layer and picture prediction structure according to an embodiment of the disclosure.

In an embodiment, when an input picture is divided into one or more sub-region(s) (e.g., rectangular sub-regions(s)), each sub-region may be coded as an independent layer. Each independent layer corresponding to a local region may have a unique layer_id value. For each independent layer, the sub-picture size and location information may be signaled. For example, a picture size (e.g., a width and/or a height of the picture), the offset information of a left-top corner (e.g., an x_offset, a y_offset). FIG. 27 shows an example of the layout of divided sub-pictures, a sub-picture size, position information, and a corresponding picture prediction structure. The layout information including the sub-picture size(s) and the sub-picture position(s) may be signaled in a high-level syntax structure, such as parameter set(s), a header of a slice or a tile group, or an SEI message.

In an embodiment, each sub-picture corresponding to an independent layer may have a unique POC value within an AU. When a reference picture among pictures stored in a DPB is indicated by using syntax element(s) in a RPS or a RPL structure, the POC value(s) of each sub-picture corresponding to a layer may be used.

In an embodiment, in order to indicate the prediction structure (e.g., an inter-layer prediction structure), the layer_id may not be used and the POC value (e.g., the POC delta value) may be used.

In an embodiment, a sub-picture with a POC vale equal to N corresponding to a layer (or a local region) may or may not be used as a reference picture of a sub-picture with a POC value equal to N+K, corresponding to the same layer (or the same local region) for motion compensated prediction. In various examples, the value of the number K may be equal to the maximum number of layers (e.g., independent layes), which may be identical to a number of sub-regions.

In an embodiment, FIG. 28 shows an extended case of FIG. 27. When an input picture is divided into multiple (e.g. four) sub-regions, each local region may be coded with one or more layers. Referring to FIG. 28, the number of independent layers may be equal to the number of sub-regions, and one or more layers may correspond to a sub-region. Thus, each sub-region may be coded with one or more independent layer(s) and zero or more dependent layer(s).

In an embodiment, in FIG. 28, the input picture may be divided into four sub-regions. The right-top sub-region may be coded as two layers (e.g., a layer 1 and a layer 4), and the right-bottom sub-region may be coded as two layers (e.g., a layer 3 and a layer 5). In FIG. 28, the layer 4 may reference the layer 1 for motion compensated prediction, and the layer 5 may reference the layer 3 for motion compensation.

In an embodiment, in-loop filtering (such as deblocking filtering, adaptive in-loop filtering, re-shaper, bilateral filtering or any deep-learning based filtering) across layer boundary may be (optionally) disabled.

In an embodiment, motion compensated prediction or intra-block copy across layer boundary may be (optionally) disabled.

In an embodiment, boundary padding for motion compensated prediction or in-loop filtering at a boundary of sub-picture may be processed optionally. A flag indicating whether the boundary padding is processed or not may be signaled in a high-level syntax structure, such as parameter set(s) (a VPS, an SPS, a PPS, or an APS), a slice or a tile group header, or an SEI message.

In an embodiment, the layout information of sub-region(s) (or sub-picture(s)) may be signaled in VPS or SPS. FIGS. 29A-29B show an example of syntax elements in a VPS and an SPS. Referring to FIG. 29A, a flag (e.g., a vps_sub_picture_dividing_flag) is signaled in the VPS. The flag (e.g., the vps_sub_picture_dividing_flag) may indicate whether input picture(s) are divided into multiple sub-regions or not. When the value of the flag (e.g., the vps_sub_picture_dividing_flag) is equal to 0, the input picture(s) in the coded video sequence(s) corresponding to the current VPS may not be divided into multiple sub-regions. Thus, the input picture size may be equal to the coded picture size (e.g., a pic_width_in_luma_samples, a pic_height_in_luma_samples) that is signaled in an SPS. When the value of the flag (e.g., the vps_sub_picture_dividing_flag) is equal to 1, the input picture(s) may be divided into multiple sub-regions. Thus, the syntax elements vps_full_pic_width_in_luma_samples and vps_full_pic_height_in_luma_samples are signaled in the VPS. The values of vps_full_pic_width_in_luma_samples and vps_full_pic_height_in_luma_samples may be equal to the width and height of the input picture(s), respectively.

In an embodiment, the values of vps_full_pic_width_in_luma_samples and vps_full_pic_height_in_luma_samples may not be used for decoding, but may be used for composition and display.

In an embodiment, when the value of the flag (e.g., the vps_sub_picture_dividing_flag) is equal to 1, syntax elements pic_offset_x and pic_offset_y may be signaled in the SPS, which corresponds to (a) specific layer(s). Thus, the coded picture size (e.g., the pic_width_in_luma_samples, the pic_height_in_luma_samples) signaled in the SPS may be equal to the width and height of the sub-region corresponding to a specific layer. The position (e.g., the syntax elements pic_offset_x and pic_offset_y) of a left-top corner of the sub-region may be signaled in the SPS.

In an embodiment, the position information (e.g., the syntax elements pic_offset_x, pic_offset_y) of the left-top corner of the sub-region may not be used for decoding, but may be used for composition and display.

In an embodiment, the layout information (e.g., a size and a position) of all or a sub-set sub-region(s) of (an) input picture(s) and the dependency information between layer(s) may be signaled in a parameter set or an SEI message. FIG. 30 shows an example of syntax elements to indicate the information of a layout of sub-regions, the dependency between layers, and the relation between a sub-region and one or more layers. Referring to FIG. 30, the syntax element num_sub_region can indicate the number of (rectangular) sub-regions in the current coded video sequence. The syntax element num_layers can indicate the number of layers in the current coded video sequence. The value of num_layers may be equal to or greater than the value of num_sub_region. When any sub-region is coded as a single layer, the value of num_layers may be equal to the value of num_sub_region. When one or more sub-regions are coded as multiple layers, the value of num_layers may be greater than the value of num_sub_region. The syntax element direct_dependency_flag [i][j] can indicate the dependency from the j-th layer to the i-th layer. The syntax element num_layers_for_region [i] can indicate the number of layers associated with the i-th sub-region. The syntax element sub_region_layer_id [i][j] can indicate the layer_id of the j-th layer associated with the i-th sub-region. The sub_region_offset_x [i] and sub_region_ offset_y [i] can indicate a horizontal and a vertical location of the left-top corner of the i-th sub-region, respectively. The sub_region_width [i] and sub_region_height [i] can indicate the width and height of the i-th sub-region, respectively.

In an embodiment, one or more syntax elements that specify the output layer set to indicate one of more layers to be output with or without PTL information may be signaled in a high-level syntax structure, e.g. a VPS, a DPS, an SPS, a PPS, an APS or an SEI message.

Referring to FIG. 31, a syntax element num_output_layer_sets indicating a number of an output layer set (OLS) in a coded vide sequence referring to a VPS may be signaled in the VPS. For each output layer set, a flag (e.g., an output_layer_flag) may be signaled for each of the output layers.

In an embodiment, the output_layer_flag [i] being equal to 1 can specify that the i-th layer is an output. The vps_output_layer_flag [i] being equal to 0 can specify that the i-th layer is not an output.

In an embodiment, one or more syntax elements that specify the PTL information for each output layer set may be signaled in a high-level syntax structure, e.g. a VPS, a DPS, an SPS, a PPS, an APS or an SEI message. Referring to FIG. 31, the syntax element num_profile_tile_level indicating the number of profile tier level information per OLS in the coded vide sequence referring to the VPS may be signaled in the VPS. For each output layer set, a set of syntax elements for PTL information or an index indicating specific PTL information among entries in the PTL information may be signaled for each output layer.

In an embodiment, profile_tier_level_idx [i][j] specifies the index, into the list of profile_tier_level ( ) syntax structures in the VPS, of the profile_tier_level ( ) syntax structure that applies to the j-th layer of the i-th OLS.

In an embodiment, referring to FIG. 32, the syntax elements num_profile_tile_level and/or num_output_layer_sets may be signaled when the number of maximum layers is greater than 1 (vps_max_layers_minus1>0).

In an embodiment, referring to FIG. 32, the syntax element vps_output_layers_mode [i] indicating the mode of output layer signaling for the i-th output layer set may be present in VPS.

In an embodiment, vps_output_layers_mode [i] equal to 0 specifies that only the highest layer is an output with the i-th output layer set. vps_output_layer_mode [i] equal to 1 specifies that all layers are outputs with the i-th output layer set. vps_output_layer_mode [i] equal to 2 specifies that the layers that are outputs are the layers with vps_output_layer_flag [i][j] equal to 1 with the i-th output layer set. More values may be reserved.

In an embodiment, the output_layer_flag [i][j] may or may not be signaled depending on the value of vps_output_layers_mode [i] for the i-th output layer set.

In an embodiment, referring to FIG. 32, the flag vps_ptl_signal_flag [i] may be present for the i-th output layer set. Depending on the value of vps_ptl_signal_flag [i], the PTL information for the i-th output layer set may or may not be signaled.

In an embodiment, referring to FIG. 33, a number of subpictures (e.g., a max_subpics_minus1) in a current CVS may be signaled in a high-level syntax structure, e.g. a VPS, a DPS, an SPS, a PPS, an APS or an SEI message.

In an embodiment, referring to FIG. 33, the subpicture identifier (e.g., sub_pic_id [i]) for the i-th subpicture may be signaled when a number of subpictures is greater than 1 (max_subpics_minus1>0).

In an embodiment, one or more syntax elements indicating the subpicture identifier belonging to each layer of each output layer set may be signaled in a VPS. Referring to FIG. 34, the sub_pic_id_layer[i][j][k], which indicates the k-th subpicture present in the j-th layer of the i-th output layer set. With the above information, a decoder may recognize which sub-picture may be decoded and outputted for each layer of a specific output layer set.

In an embodiment, a picture header (PH) is a syntax structure containing syntax elements that apply to all slices of a coded picture. A slice header can be a part of a coded slice containing the data elements pertaining to all tiles or CTU rows within a tile represented in the slice. A picture unit (PU) is a set of NAL units that are associated with each other according to a specified classification rule, are consecutive in a decoding order, and contain, for example, exactly one coded picture. A PU may contain a picture header (PH) and one or more VCL NAL units composing a coded picture.

In an embodiment, an SPS (RBSP) may be available to a decoding process prior to the SPS being referenced, included in at least one AU with a TemporalId equal to 0 or provided through external means.

In an embodiment, an SPS (RBSP) may be available to the decoding process prior to the SPS being referenced, included in at least one AU with the TemporalId equal to 0 in the CVS, which contains one or more PPS referring to the SPS, or provided through external means.

In an embodiment, an SPS (RBSP) may be available to the decoding process prior to the SPS being referenced by one or more PPS, included in at least one PU with nuh_layer_id equal to the lowest nuh_layer_id value of the PPS NAL units that refer to the SPS NAL unit in the CVS, which contains one or more PPS referring to the SPS, or provided through external means.

In an embodiment, an SPS (RBSP) may be available to the decoding process prior to the SPS being referenced by one or more PPS, included in at least one PU with TemporalId equal to 0 and nuh_layer_id equal to the lowest nuh_layer_id value of the PPS NAL units that refer to the SPS NAL unit or provided through external means.

In an embodiment, an SPS (RBSP) may be available to the decoding process prior to the SPS being referenced by one or more PPS, included in at least one PU with TemporalId equal to 0 and nuh_layer_id equal to the lowest nuh_layer_id value of the PPS NAL units that refer to the SPS NAL unit in the CVS, which contains one or more PPS referring to the SPS, or provided through external means or provided through external means.

In an embodiment, a pps_seq_parameter_set_id specifies a value of sps_seq_parameter_set_id for the referenced SPS. In an example, the value of pps_seq_parameter_set_id may be the same in all PPSs that are referred to by coded pictures in a CLVS.

In an embodiment, all SPS NAL units with a particular value of sps_seq_parameter_set_id in a CVS may have the same content.

In an embodiment, regardless of the nuh_layer_id values, SPS NAL units may share the same value space of sps_seq_parameter_set_id.

In an embodiment, the nuh_layer_id value of a SPS NAL unit may be equal to the lowest nuh_layer_id value of the PPS NAL units that refer to the SPS NAL unit.

In an embodiment, when an SPS with nuh_layer_id equal to m is referred to by one or more PPSs with nuh_layer_id equal to n. the layer with nuh_layer_id equal to m may be the same as the layer with nuh_layer_id equal to n or a (direct or indirect) reference layer of the layer with nuh_layer_id equal to m.

In an embodiment, a PPS (RBSP) may be available to the decoding process prior to the PPS being referenced, included in at least one AU with a TemporalId equal to the TemporalId of the PPS NAL unit or provided through external means.

In an embodiment, a PPS (RBSP) may be available to the decoding process prior to the PPS being referenced, included in at least one AU with a TemporalId equal to the TemporalId of the PPS NAL unit in the CVS, which contains one or more PHs (or coded slice NAL units) referring to the PPS, or provided through external means.

In an embodiment, a PPS (RBSP) may be available to the decoding process prior to the PPS being referenced by one or more PHs (or coded slice NAL units), included in at least one PU with nuh_layer_id equal to the lowest nuh_layer_id value of the coded slice NAL units that refer to the PPS NAL unit in the CVS, which contains one or more PHs (or coded slice NAL units) referring to the PPS, or provided through external means.

In an embodiment, a PPS (RBSP) may be available to the decoding process prior to the PPS being referenced by one or more PHs (or coded slice NAL units), included in at least one PU with a TemporalId equal to the TemporalId of the PPS NAL unit and nuh_layer_id equal to the lowest nuh_layer_id value of the coded slice NAL units that refer to the PPS NAL unit in the CVS, which contains one or more PHs (or coded slice NAL units) referring to the PPS, or provided through external means.

In an embodiment, a ph_pic_parameter_set_id in a PH specifies the value of pps_pic_parameter_set_id for the referenced PPS in use. The value of the pps_seq_parameter_set_id may be the same in all PPSs that are referred to by coded pictures in a CLVS.

In an embodiment, all PPS NAL units with a particular value of pps_pic_parameter_set_id within a PU may have the same content.

In an embodiment, regardless of the nuh_layer_id values, PPS NAL units may share the same value space of the pps_pic_parameter_set_id.

In an embodiment, the nuh_layer_id value of a PPS NAL unit may be equal to the lowest nuh_layer_id value of the coded slice NAL units that refer to the NAL unit. The NAL unit refers to the PPS NAL unit.

In an embodiment, when a PPS with nuh_layer_id equal to m is referred to by one or more coded slice NAL units with a nuh_layer_id equal to n, the layer with the nuh_layer_id equal to m may be the same as the layer with nuh_layer_id equal to n or a (direct or indirect) reference layer of the layer with the nuh_layer_id equal to n.

In an embodiment, a PPS (RBSP) may be available to the decoding process prior to the PPS being referenced, included in at least one AU with the TemporalId equal to the TemporalId of the PPS NAL unit or provided through external means.

In an embodiment, a PPS (RBSP) may be available to the decoding process prior to the PPS being referenced, included in at least one AU with the TemporalId equal to the TemporalId of the PPS NAL unit in the CVS, which contains one or more PHs (or coded slice NAL units) referring to the PPS, or provided through external means.

In an embodiment, a PPS (RBSP) may be available to the decoding process prior to the PPS being referenced by one or more PHs (or coded slice NAL units), included in at least one PU with the nuh_layer_id equal to the lowest nuh_layer_id value of the coded slice NAL units that refer to the PPS NAL unit in the CVS, which contains one or more PHs (or coded slice NAL units) referring to the PPS, or provided through external means.

In an embodiment, a PPS (RBSP) may be available to the decoding process prior to the PPS being referenced by one or more PHs (or coded slice NAL units), included in at least one PU with the TemporalId equal to the TemporalId of the PPS NAL unit and the nuh_layer_id equal to the lowest nuh_layer_id value of the coded slice NAL units that refer to the PPS NAL unit in the CVS, which contains one or more PHs (or coded slice NAL units) referring to the PPS, or provided through external means.

In an embodiment, ph_pic_parameter_set_id in a PH specifies the value of the pps_pic_parameter_set_id for the referenced PPS in use. The value of pps_seq_parameter_set_id may be the same in all PPSs that are referred to by coded pictures in a CLVS.

In an embodiment, all PPS NAL units with a particular value of pps_pic_parameter_set_id within a PU may have the same content.

In an embodiment, regardless of the nuh_layer_id values, PPS NAL units may share the same value space of pps_pic_parameter_set_id.

In an embodiment, the nuh_layer_id value of a PPS NAL unit may be equal to the lowest nuh_layer_id value of the coded slice NAL units that refer to the NAL unit that refer to the PPS NAL unit.

In an embodiment, when a PPS with nuh_layer_id equal to m is referred to by one or more coded slice NAL units with the nuh_layer_id equal to n, the layer with the nuh_layer_id equal to m may be the same as the layer with nuh_layer_id equal to n or a (direct or indirect) reference layer of the layer with nuh_layer_id equal to m.

An output layer indicates a layer of an output layer set that is an output. An output layer set (OLS) indicates a set of layers including a specified set of layers, where one or more layers in the set of layers are specified to be output layers. An OLS layer index is an index of a layer in an OLS. The OLS layer index can point to the list of layers in the OLS.

A sublayer indicates a temporal scalable layer of a temporal scalable bitstream including VCL NAL units with a particular value of the TemporalId variable and the associated non-VCL NAL units. Sublayer representation indicates a subset of the bitstream including NAL units of a particular sublayer and the lower sublayers.

A VPS RBSP may be available to the decoding process prior to the VPS RBSP being referenced, included in at least one AU with a TemporalId equal to 0 or provided through external means. All VPS NAL units with a particular value of vps_video_parameter_set_id in a CVS may have the same content.

A vps_video_parameter_set_id provides an identifier for the VPS for reference by other syntax elements. The value of vps_video_parameter_set_id may be greater than 0.

A vps_max_layers_minus1 plus 1 specifies the maximum allowed number of layers in each CVS referring to the VPS.

A vps_max_sublayers_minus1 plus 1 specifies the maximum number of temporal sublayers that may be present in a layer in each CVS referring to the VPS. The value of vps_max_sublayers_minus1 may be in the range of 0 to 6, inclusive.

In an example, a flag (e.g., a vps_all_layers_same_num_sublayers_flag) equal to 1 specifies that the number of temporal sublayers is the same for all the layers in each CVS referring to the VPS. The flag (e.g., the vps_all_layers_same_num_sublayers_flag) equal to 0 specifies that the layers in each CVS referring to the VPS may or may not have the same number of temporal sublayers. When not present, the value of the flag (e.g., the vps_all_layers_same_num_sublayers_flag) is inferred to be equal to 1.

A flag (e.g., a vps_all_independent_layers_flag) equal to 1 specifies that all layers in the CVS are independently coded without using inter-layer prediction. The flag (e.g., the vps_all_independent_layers_flag) equal to 0 specifies that one or more of the layers in the CVS may use inter-layer prediction. When not present, the value of the flag (e.g., the vps_all_independent_layers_flag) is inferred to be equal to 1.

vps_layer_id [i] can specify the nuh_layer_id value of the i-th layer. For any two non-negative integer values of m and n, the value of vps_layer_id [m] may be less than vps_layer_id [n] when m is less than n.

vps_independent_layer_flag[i] equal to 1 can specify that the layer with index i does not use inter-layer prediction. vps_independent_layer_flag [i] equal to 0 can specify that the layer with index i may use inter-layer prediction and the syntax elements vps_direct_ref_layer flag [i][j] for j in the range of 0 to i−1, inclusive, are present in VPS. When not present, the value of vps_independent_layer_flag [i] is inferred to be equal to 1.

vps_direct_ref layer_flag[i][j] equal to 0 can specify that the layer with index j is not a direct reference layer for the layer with index i. vps_direct_ref layer_flag [i][j] equal to 1 can specify that the layer with index j is a direct reference layer for the layer with index i. When vps_direct_ref_layer_flag [i][j] is not present for i and j in the range of 0 to vps_max_layers_minus1, inclusive, it is inferred to be equal to 0. When vps_independent_layer_flag [i] is equal to 0, there may be at least one value of j in the range of 0 to i−1, inclusive, such that the value of vps_direct_ref_layer_flag [i][j] is equal to 1.

The variables NumDirectRefLayers [i], DirectRefLayerIdx [i][d], NumRefLayers [i], RefLayerIdx [i][r], and LayerUsedAsRefLayerFlag[j] can be derived as follows

```
for( i = 0; i <= vps_max_layers_minus1; i++ ) {
  for( j = 0; j <= vps_max_layers_minus1; j++ ) {
    dependencyFlag[ i ][ j ] = vps_direct_ref_layer_flag[ i ][ j ]
    for( k = 0; k < i; k++ )
      if( vps_direct_ref_layer_flag[ i ][ k ] && dependencyFlag[ k ][ j ])
        dependencyFlag[ i ][ j ] = 1
  }
  LayerUsedAsRefLayerFlag[ i ] = 0
}
for( i = 0; i <= vps_max_layers_minus1; i++ ) {
  for( j = 0, d = 0, r = 0; j <= vps_max_layers_minus1; j++ ) {
    if( vps_direct_ref_layer_flag[ i ][ j ] ) {
      DirectRefLayerIdx[ i ][ d++ ] = j
      LayerUsedAsRefLayerFlag[ j ] = 1
    }
    if( dependencyFlag[ i ][ j ] )
      RefLayerIdx[ i ][ r++ ] = j
  }
  NumDirectRefLayers[ i ] = d
  NumRefLayers[ i ] = r
}
```

The variable GeneralLayerIdx [i], specifying the layer index of the layer with nuh_layer_id equal to vps_layer_id [i], can be derived as follows:

for(i=0; i<=vps_max_layers_minus1; i++)

GeneralLayerIdx[vps_layer_id[i] ]=i

In an example, for any two different values of i and j, both in the range of 0 to vps_max_layers_minus1, inclusive, when a flag (e.g., a dependencyFlag [i][j]) equals to 1. A requirement of bitstream conformance can be that the values of chroma_format_idc and bit_depth_minus8 that apply to the i-th layer may be equal to the values of chroma_format_idc and bit_depth_minus8, respectively, that apply to the j-th layer.

max_tid_ref_present_flag [i] equal to 1 can specify that the syntax element max_tid_il_ref_pics_plus1[i] is present. max_tid_ref_present_flag[i] equal to 0 can specify that the syntax element max_tid_il_ref_pics_plus1[i] is not present.

max_tid_il_ref_pics_plus1[i] equal to 0 can specify that inter-layer prediction is not used by non-IRAP pictures of the i-th layer. max_tid_il_ref_pics_plus1 [i] greater than 0 can specify that, for decoding pictures of the i-th layer, no picture with TemporalId greater than max_tid_il_ref_pics_plus1 [i]−1 is used as ILRP. When not present, the value of max_tid_il_ref_pics_plus1 [i] is inferred to be equal to 7.

each_layer_is_an_ols_flag equal to 1 can specify that each OLS contains only one layer and each layer itself in a CVS referring to the VPS is an OLS with the single included layer being the only output layer. each_layer_is_an_ols_flag equal to 0 can specify that an OLS may contain more than one layer. If vps_max_layers_minus1 is equal to 0, the value of each_layer_is_an_ols_flag is inferred to be equal to 1. Otherwise, when vps_all_independent_layers_flag is equal to 0, the value of each_layer_is_an_ols_flag is inferred to be equal to 0.

ols_mode_idc equal to 0 can specify that the total number of OLSs specified by the VPS is equal to vps_max_layers_minus1+1, the i-th OLS includes the layers with layer indices from 0 to i, inclusive, and for each OLS only the highest layer in the OLS is output.

ols_mode_idc equal to 1 can specify that the total number of OLSs specified by the VPS is equal to vps_max_layers_minus1+1, the i-th OLS includes the layers with layer indices from 0 to i, inclusive. For each OLS, all layers in the OLS are outputs.

ols_mode_idc equal to 2 can specify that the total number of OLSs specified by the VPS is explicitly signaled and for each OLS, the output layers are explicitly signaled and other layers are the layers that are direct or indirect reference layers of the output layers of the OLS.

The value of ols_mode_idc may be in the range of 0 to 2, inclusive. The value 3 of ols_mode_idc can be reserved for certain video coding technologies or standards, for example, by ITU-T or ISO/IEC.

When a flag (e.g., a vps_all_independent_layers_flag) is equal to 1 and a flag (e.g., a each_layer_is_an_ols_flag) is equal to 0, the value of ols_mode_idc is inferred to be equal to 2.

num_output_layer_sets_minus1 plus 1 can specify the total number of OLSs specified by the VPS when ols_mode_idc is equal to 2.

The variable TotalNumOlss, specifying the total number of OLSs specified by the VPS, can be derived as follows:

```
if( vps_max_layers_minus1 = = 0 )
  TotalNumOlss = 1
else if( each_layer_is_an_ols_flag | | ols_mode_idc = = 0 | | ols_mode_idc = = 1 )
  TotalNumOlss = vps_max_layers_minus1 + 1
else if( ols_mode_idc = = 2 )
  TotalNumOlss = num_output_layer_sets_minus1 + 1
``` ols_output_layer_flag [i][j] equal to 1 can specify that the layer with nuh_layer_id equal to vps_layer_id [is an output layer of the i-th OLS when ols_mode_idc is equal to 2. ols_output_layer_flag [i][j] equal to 0 specifies that the layer with nuh_layer_id equal to vpslayerid] is not an output layer of the i-th OLS when ols_mode_idc is equal to 2.

The variable NumOutputLayersInOls [i], specifying the number of output layers in the i-th OLS, the variable NumSubLayersInLayerInOLS [i][j], specifying the number of sublayers in the j-th layer in the i-th OLS, the variable OutputLayerIdInOls [i][j], specifying the nuh_layer_id value of the j-th output layer in the i-th OLS, and the variable LayerUsedAsOutputLayerFlag [k], specifying whether the k-th layer is used as an output layer in at least one OLS, can be derived as follows:

```
NumOutputLayersInOls[ 0 ] = 1
OutputLayerIdInOls[ 0 ][ 0 ] = vps_layer_id[ 0 ]
NumSubLayersInLayerInOLS[ 0 ][ 0 ] = vps_max_sub_layers_minus1 + 1
LayerUsedAsOutputLayerFlag[ 0 ] = 1
for( i = 1, i <= vps_max_layers_minus1; i++ ) {
    if( each_layer_is_an_ols_flag || ols_mode_idc < 2 )
        LayerUsedAsOutputLayerFlag[ i ] = 1
    else /*( !each_layer_is_an_ols_flag && ols_mode_idc = = 2 ) */
        LayerUsedAsOutputLayerFlag[ i ] = 0
}
for( i = 1; i < TotalNumOlss; i++ )
    if( each_layer_is_an_ols_flag || ols_mode_idc = = 0 ) {
        NumOutputLayersInOls[ i ] = 1
        OutputLayerIdInOls[ i ][ 0 ] = vps_layer_id[ i ]
        for( j = 0, j < i && ( ols_mode_idc = = 0 ); j++ )
            NumSubLayersInLayerInOLS[ i ][ j ] = max_tid_il_ref_pics_plus1[ i ]
        NumSubLayersInLayerInOLS[ i ][ i ] = vps_max_sub_layers_minus1 + 1
    } else if( ols_mode_idc = = 1 ) {
        NumOutputLayersInOls[ i ] = i + 1
        for( j = 0; j < NumOutputLayersInOls[ i ]; j++ ) {
            OutputLayerIdInOls[ i ][ j ] = vps_layer_id[ j ]
            NumSubLayersInLayerInOLS[ i ][ j ] = vps_max_sub_layers_minus1 + 1
        }
    } else if( ols_mode_idc = = 2 ) {
        for( j = 0; j <= vps_max_layers_minus1; j++ ) {
            layerIncludedInOlsFlag[ i ][ j ] = 0
            NumSubLayersInLayerInOLS[ i ][ j ] = 0
        }
        for( k = 0, j = 0; k <= vps_max_layers_minus1; k++ )
            if( ols_output_layer_flag[ i ][ k ] ) {
                layerIncludedInOlsFlag[ i ][ k ] = 1
                LayerUsedAsOutputLayerFlag[ k ] = 1
                OutputLayerIdx[ i ][ j ] = k
                OutputLayerIdInOls[ i ][ j++ ] = vps_layer_id[ k ]
                NumSubLayersInLayerInOLS[ i ][ j ] = vps_max_sub_layers_minus1 + 1
            }
        NumOutputLayersInOls[ i ] = j
        for( j = 0; j < NumOutputLayersInOls[ i ]; j++ ) {
            idx = OutputLayerIdx[ i ][ j ]
            for( k = 0; k < NumRefLayers[ idx ]; k++ ) {
                layerIncludedInOlsFlag[ i ][ RefLayerIdx[ idx ][ k ] ] = 1
                if( NumSubLayersInLayerInOLS[ i ][ RefLayerIdx[ idx ][ k ] ] <
                    max_tid_il_ref_pics_plus1[ OutputLayerIdInOls[ i ][ j ] ] )
                    NumSubLayersInLayerInOLS[ i ][ RefLayerIdx[ idx ][ k ] ] =
                        max_tid_il_ref_pics_plus1[ OutputLayerIdInOls[ i ][ j ] ]
            }
        }
    }
```

For each value of i in the range of 0 to vps_max_layers_minus1, inclusive, the values of LayerUsedAsRefLayerFlag [i] and LayerUsedAsOutputLayerFlag [i] may not be both equal to 0. Thus, there may be no layer that is neither an output layer of at least one OLS nor a direct reference layer of any other layer.

For each OLS, there may be at least one layer that is an output layer. Thus, for any value of i in the range of 0 to TotalNumOlss−1, inclusive, the value of NumOutputLayersInOls [i] may be greater than or equal to 1.

The variable NumLayersInOls[i], specifying the number of layers in the i-th OLS, and the variable LayerIdInOls[i][j], specifying the nuh_layer_id value of the j-th layer in the i-th OLS, are derived as follows:

```
NumLayersInOls[ 0 ] = 1
LayerIdInOls[ 0 ][ 0 ] = vps_layer_id[ 0 ]
for( i = 1; i < TotalNumOlss; i++ ) {
    if( each_layer_is_an_ols_flag ) {
        NumLayersInOls[ i ] = 1
        LayerIdInOls[ i ][ 0 ] = vps_layer_id[ i ]
    } else if( ols_mode_idc = = 0 || ols_mode_idc = = 1 ) {
        NumLayersInOls[ i ] = i + 1
        for( j = 0; j < NumLayersInOls[ i ]; j++ )
            LayerIdInOls[ i ][ j ] = vps_layer_id[ j ]
    } else if( ols_mode_idc = = 2 ) {
```

```
for( k = 0, j = 0; k <= vps_max_layers_minus1; k++ ) if( layerIncludedInOlsFlag[ i ][ k
] )
        LayerIdInOls[ i ][ j++ ] = vps_layer_id[ k ]
    NumLayersInOls[ i ] = j
    }
}
```

The variable OlsLayerIdx [i][j], specifying the OLS layer index of the layer with nuh_layer_id equal to LayerIdInOls [i][j], can be derived as follows:
for(i=0; i<TotalNumOlss; i++)
for j=0; j<NumLayersInOls[i]; j++)
OlsLayerIdx[i][LayerIdInOls[i][j]]=j The lowest layer in each OLS may be an independent layer. Thus, for each i in the range of 0 to TotalNumOlss−1, inclusive, the value of vps_independent_layer_flag[GeneralLayerIdx[LayerIdInOls [i][0]]] may be equal to 1.

Each layer may be included in at least one OLS specified by the VPS. Thus, for each layer with a particular value of nuh_layer_id nuhLayerId equal to one of vps_layer_id [k] for k in the range of 0 to vps_max_layers_minus1, inclusive, there may be at least one pair of values of i and j, where i is in the range of 0 to TotalNumOlss−1, inclusive, and j is in the range of NumLayersInOls [i]−1, inclusive, such that the value of LayerIdInOls [i][j] is equal to nuhLayerId.

In an embodiment, the decoding process operates as follows for the current picture CurrPic:
PictureOutputFlag is set as follows:
If one of the following conditions is true, PictureOutputFlag is set equal to 0:
the current picture is a RASL picture and NoOutputBeforeRecoveryFlag of the associated IRAP picture is equal to 1.
gdr_enabled_flag is equal to 1 and the current picture is a GDR picture with NoOutputBeforeRecoveryFlag equal to 1.
gdr_enabled_flag is equal to 1, the current picture is associated with a GDR picture with NoOutputBeforeRecoveryFlag equal to 1, and PicOrderCntVal of the current picture is less than RpPicOrderCntVal of the associated GDR picture.
sps_video_parameter_set_id is greater than 0, ols_mode_idc is equal to 0 and the current AU contains a picture picA that satisfies all of the following conditions:
PicA has PictureOutputFlag equal to 1.
PicA has nuh_layer_id nuhLid greater than that of the current picture.
PicA belongs to the output layer of the OLS (i.e., OutputLayerIdInOls[TargetOlsIdx][0] is equal to nuhLid).
sps_video_parameter_set_id is greater than 0, ols_mode_idc is equal to 2, and
ols_output_layer_flag[TargetOlsidx][GeneralLayerIdx[nuh_layer_id] ] is equal to 0.
Otherwise, PictureOutputFlag is set equal to pic_output_flag.

After all slices of the current picture are decoded, the current decoded picture is marked as "used for short-term reference", and each ILRP entry in RefPicList [0] or RefPicList [1] is marked as "used for short-term reference".

In an embodiment, when each layer is an output layer set, a PictureOutputFlag is set equal to a pic_output_flag, regardless of the value of ols_mode_idc.

In an embodiment, PictureOutputFlag is set equal to 0 when sps_video_parameter_set_id is greater than 0, each_layer_is_an_ols_flag is equal to 0, ols_mode_idc is equal to 0 and the current AU contains a picture picA that satisfies all of the following conditions: PicA has PictureOutputFlag equal to 1, PicA has nuh_layer_id nuhLid greater than that of the current picture and PicA belongs to the output layer of the OLS (i.e., OutputLayerIdInOls [TargetOlsIdx][0] is equal to nuhLid).

In an embodiment, PictureOutputFlag is set equal to 0 when sps_video_parameter_set_id is greater than 0, each_layer_is_an_ols_flag is equal to 0, ols_mode_idc is equal to 2, and ols_output_layer_flag [TargetOlsIdx][GeneralLayerIdx[nuh_layer_id]] is equal to 0.

FIG. 35 shows an example of a syntax structure of a VPS RBSP.

The syntax structure shown in FIG. 35 is similar to the syntax structure shown in FIG. 34, and thus detailed descriptions are omitted for purposes of brevity.

The techniques described above (e.g., the techniques for signaling constraints flags, adaptive resolution parameters, and/or the like) can be implemented as computer software using computer-readable instructions and physically stored in one or more computer-readable media. For example, FIG. 36 shows a computer system (3600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 36:
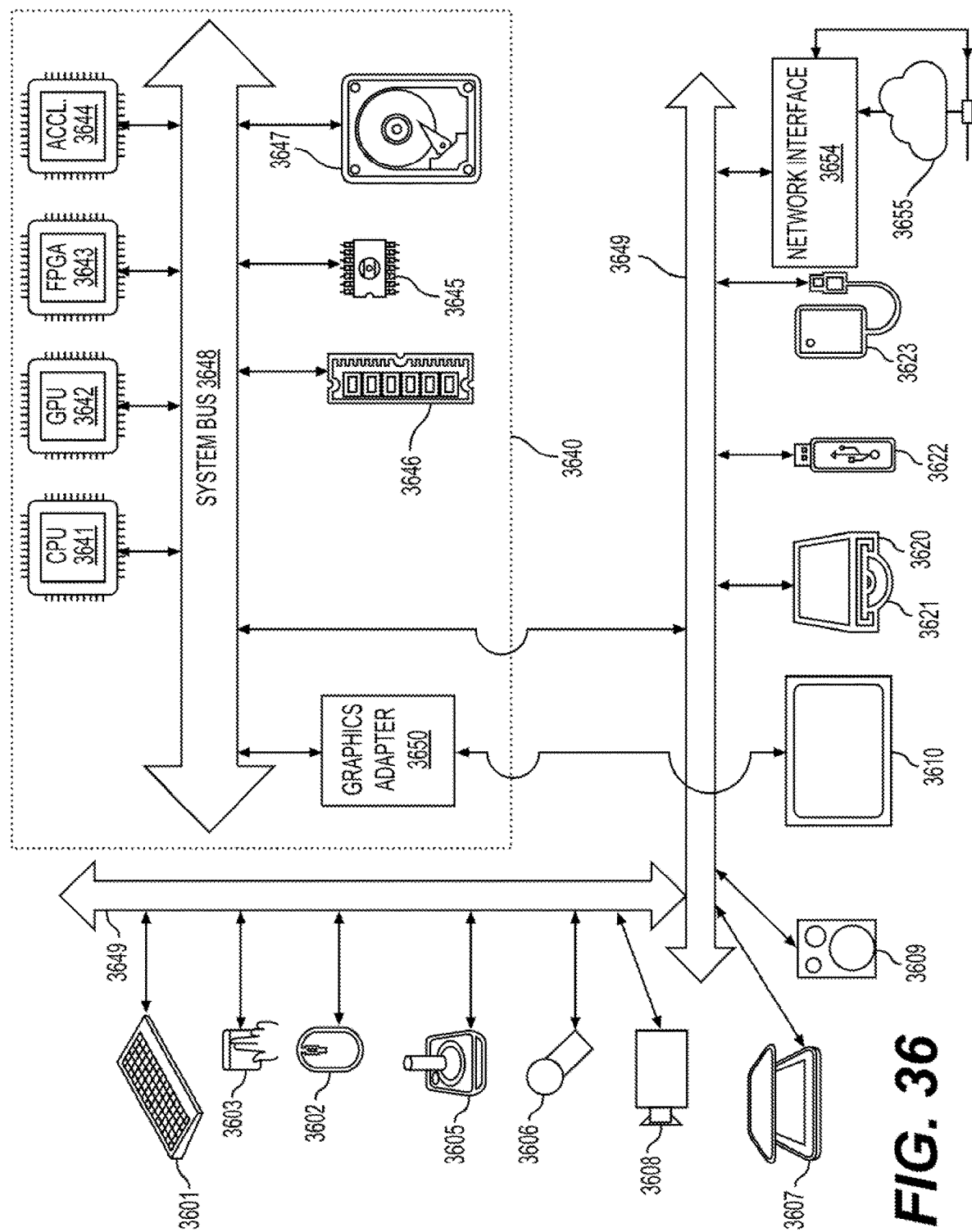
FIG. 36 is a schematic illustration of a computer system in accordance with an embodiment.

The components shown in FIG. 36 for computer system (3600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (3600).

Computer system (3600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (3601), mouse (3602), trackpad (3603), touch screen (3610), data-glove (not shown), joystick (3605), microphone (3606), scanner (3607), camera (3608).

Computer system (3600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (3610), data-glove (not shown), or joystick (3605), but there can also be tactile feedback devices that do not serve as input devices), audio output devices (such as: speakers (3609), headphones (not depicted)), visual output devices (such as screens (3610) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (3600) can also include human accessible storage devices and their associated media such as optical media including CD/DVD ROM/RW (3620) with CD/DVD or the like media (3621), thumb-drive (3622), removable hard drive or solid state drive (3623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (3600) can also include an interface (3654) to one or more communication networks (3655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (3649) (such as, for example USB ports of the computer system (3600)); others are commonly integrated into the core of the computer system (3600) by attachment to a system bus as described below (for example Ethernet interface into a PC computer system or cellular network interface into a smartphone computer system). Using any of these networks, computer system (3600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (3640) of the computer system (3600).

The core (3640) can include one or more Central Processing Units (CPU) (3641), Graphics Processing Units (GPU) (3642), specialized programmable processing units in the form of Field Programmable Gate Areas (FPGA) (3643), hardware accelerators for certain tasks (3644), graphics adapters (~~50), and so forth. These devices, along with Read-only memory (ROM) (3645), Random-access memory (3646), internal mass storage such as internal non-user accessible hard drives, SSDs, and the like (3647), may be connected through a system bus (3648). In some computer systems, the system bus (3648) can be accessible in the form of one or more physical plugs to enable extensions by additional CPUs, GPU, and the like. The peripheral devices can be attached either directly to the core's system bus (3648), or through a peripheral bus (3649). In an example, the screen (3610) can be connected to the graphics adapter (3650). Architectures for a peripheral bus include PCI, USB, and the like.

CPUs (3641), GPUs (3642), FPGAs (3643), and accelerators (3644) can execute certain instructions that, in combination, can make up the aforementioned computer code. That computer code can be stored in ROM (3645) or RAM (3646). Transitional data can be also be stored in RAM (3646), whereas permanent data can be stored for example, in the internal mass storage (3647). Fast storage and retrieve to any of the memory devices can be enabled through the use of cache memory, that can be closely associated with one or more CPU (3641), GPU (3642), mass storage (3647), ROM (3645), RAM (3646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (3600), and specifically the core (3640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (3640) that are of non-transitory nature, such as core-internal mass storage (3647) or ROM (3645). The software implementing various embodiments of the present disclosure can be stored in such devices and executed by core (3640). A computer-readable medium can include one or more memory devices or chips, according to particular needs. The software can cause the core (3640) and specifically the processors therein (including CPU, GPU, FPGA, and the like) to execute particular processes or particular parts of particular processes described herein, including defining data structures stored in RAM (3646) and modifying such data structures according to the processes defined by the software. In addition or as an alternative, the computer system can provide functionality as a result of logic hardwired or otherwise embodied in a circuit (for example: accelerator (3644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC))

storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video encoding in an encoder, comprising:
   determining whether a plurality of constraint flags of a constraint information group are to be signaled for a subset of coding blocks;
   signaling a gate flag indicating whether the plurality of constraint flags of the constraint information group are signaled, wherein the gate flag is signaled in a general constraint information syntax structure of a coded video bitstream;
   in accordance with the signaled gate flag indicating that the plurality of constraint flags of the constraint information group are signaled, signaling the plurality of constraint flags of the constraint information group in the general constraint information syntax structure of the coded video bitstream;
   based on the signaled plurality of constraint flags of the constraint information group, signaling one or more offsets and one or more corresponding lengths, wherein each offset indicates a position of a set of contiguous constraint flags in the general constraint information syntax structure and a corresponding length indicates a number of constraint flags in the set of contiguous constraint flags in the general constraint information syntax structure; and
   in accordance with the plurality of constraint flags being signaled in the general constraint information syntax structure, encoding the subset of coding blocks based on the plurality of constraint flags.

2. The method of claim 1, wherein
   the plurality of constraint flags of the constraint information group is determined to be signaled in the general constraint information syntax structure; and
   the method further includes generating prediction information for the subset of coding blocks based on the plurality of constraint flags in the constraint information group.

3. The method of claim 1, wherein
   the plurality of constraint flags of the constraint information group is determined not to be signaled in the general constraint information syntax structure.

4. The method of claim 1, wherein the gate flag indicates that the constraint flags of the constraint information group are not signaled, and the constraint flags are not signaled in the general constraint information syntax structure.

5. The method of claim 1, wherein the general constraint information syntax structure is a high level syntax structure for at least one picture, and the subset of coding blocks includes coding blocks in the at least one picture.

6. The method of claim 1, wherein
   the plurality of constraint flags of the constraint information group are determined to be signaled,
   the plurality of constraint flags of the constraint information group are signaled according to a predetermined order, and
   the method further includes
      run-encoding the plurality of constraint flags; and
      generating prediction information for the subset of coding blocks based on the plurality of constraint flags.

7. The method of claim 2, wherein
   the plurality of constraint flags of the constraint information group are signaled according to a predetermined order, and
   the generating the prediction information further includes run-encoding the plurality of constraint flags.

8. The method of claim 2, wherein
   the general constraint information syntax structure includes plural constraint information groups and plural corresponding gate flags indicating presence of each of the plural constraint information groups, and
   an offset and a length are signaled in the general constraint information syntax structure for each of the plural constraint information groups indicating a position of and a number of contiguous constraint flags in the respective one of the plural constraint information groups.

9. The method of claim 8, wherein
   a syntax element indicating a number of offsets included in the general constraint information syntax structure is signaled in the general constraint information syntax structure.

10. The method of claim 1, wherein
one or more constraint information groups are signaled in the coded video bitstream, and
one or more syntax elements in the general constraint information syntax structure are byte aligned, the one or more syntax elements including a gate flag for each of the one or more constraint information groups and including a plurality of constraint flags in the one or more constraint information groups.

11. An apparatus for video encoding, comprising:
processing circuitry configured to:
determine whether a plurality of constraint flags of a constraint information group is to be signaled for a subset of coding blocks,
signal a gate flag indicating whether the plurality of constraint flags of the constraint information group are signaled, wherein the gate flag is signaled in a general constraint information in a syntax structure of a coded video bitstream;
in accordance with the signaled gate flag indicating that the plurality of constraint flags of the constraint information group are signaled, signal the plurality of constraint flags of the constraint information group in the general constraint information syntax structure of the coded video bitstream;
based on the signaled plurality of constraint flags of the constraint information group, signal one or more offsets and one or more corresponding lengths, wherein each offset indicates a position of a set of contiguous constraint flags in the general constraint information syntax structure and a corresponding length indicates a number of constraint flags in the set of contiguous constraint flags in the general constraint information syntax structure; and
in accordance with the plurality of constraint flags being signaled in the general constraint information syntax structure, encode the subset of coding blocks based on the plurality of constraint flags.

12. The apparatus of claim 11, wherein
the plurality of constraint flags of the constraint information group is determined to be signaled in the general constraint information syntax structure; and
the processing circuitry is configured to generate prediction information for the subset of coding blocks based on the plurality of constraint flags in the constraint information group.

13. The apparatus of claim 11, wherein
the plurality of constraint flags of the constraint information group is determined not to be signaled in the general constraint information syntax structure.

14. The apparatus of claim 11, wherein the gate flag indicates that the constraint flags of the constraint information group are not signaled, and the constraint flags are not signaled in the general constraint information syntax structure.

15. The apparatus of claim 11, wherein the general constraint information syntax structure is a high level syntax structure for at least one picture, and the subset of coding blocks includes coding blocks in the at least one picture.

16. The apparatus of claim 11, wherein
the plurality of constraint flags of the constraint information group are determined to be signaled,
the plurality of constraint flags of the constraint information group are signaled according to a predetermined order, and
the processing circuitry is configured to:
run-encode the plurality of constraint flags; and
generate prediction information for the subset of coding blocks based on the plurality of constraint flags.

17. The apparatus of claim 12, wherein
the plurality of constraint flags of the constraint information group are signaled according to a predetermined order, and
the processing circuitry is configured to run-encode the plurality of constraint flags.

18. The apparatus of claim 12, wherein
the general constraint information syntax structure includes plural constraint information groups and plural corresponding gate flags indicating presence of each of the plural constraint information groups, and
an offset and a length are signaled in the general constraint information syntax structure for each of the plural constraint information groups indicating a position of and a number of contiguous constraint flags in the respective one of the plural constraint information groups.

19. The apparatus of claim 11, wherein
one or more constraint information groups are signaled in the coded video bitstream, and
one or more syntax elements in the general constraint information syntax structure are byte aligned, the one or more syntax elements including a gate flag for each of the one or more constraint information groups and including a plurality of constraint flags in the one or more constraint information groups.

20. A non-transitory computer-readable storage medium storing instructions executable by at least one processor to perform:
determining whether a plurality of constraint flags of a constraint information group are to be signaled for a subset of coding blocks;
signaling a gate flag indicating whether the plurality of constraint flags of the constraint information group are signaled, wherein the gate flag is signaled in a general constraint information syntax structure of a coded video bitstream;
in accordance with the signaled gate flag indicating that the plurality of constraint flags of the constraint information group are signaled, signaling the plurality of constraint flags of the constraint information group in the general constraint information syntax structure of the coded video bitstream;
based on the signaled plurality of constraint flags of the constraint information group, signaling one or more offsets and one or more corresponding lengths, wherein each offset indicates a position of a set of contiguous constraint flags in the general constraint information syntax structure and a corresponding length indicates a number of constraint flags in the set of contiguous constraint flags in the general constraint information syntax structure; and
in accordance with the plurality of constraint flags being signaled in the general constraint information syntax structure, encoding the subset of coding blocks based on the plurality of constraint flags.

* * * * *